US007003079B1

(12) United States Patent
McCarthy et al.

(10) Patent No.: US 7,003,079 B1
(45) Date of Patent: Feb. 21, 2006

(54) APPARATUS AND METHOD FOR MONITORING PERFORMANCE OF AN AUTOMATED RESPONSE SYSTEM

(75) Inventors: Daniel McCarthy, Natick, MA (US); Patrick Peterson, Cambridge, MA (US)

(73) Assignees: BBNT Solutions LLC, Cambridge, MA (US); Verizon Corporate Services Group Inc., New York, NY (US)

( * ) Notice: Subject to any disclaimer, the term of this patent is extended or adjusted under 35 U.S.C. 154(b) by 638 days.

(21) Appl. No.: 10/090,234

(22) Filed: Mar. 4, 2002

Related U.S. Application Data

(60) Provisional application No. 60/273,710, filed on Mar. 5, 2001, provisional application No. 60/276,266, filed on Mar. 15, 2001.

(51) Int. Cl.
*H04M 3/22* (2006.01)
*H04M 11/00* (2006.01)
*H04M 3/00* (2006.01)

(52) U.S. Cl. .............................. 379/32.01; 379/88.18; 379/256.02; 379/265.06

(58) Field of Classification Search ............. 379/32.01, 379/265.02, 88.18, 265.06
See application file for complete search history.

(56) References Cited

U.S. PATENT DOCUMENTS

| | | | | |
|---|---|---|---|---|
| 5,822,401 A | * | 10/1998 | Cave et al. | 379/32.02 |
| 6,606,598 B1 | * | 8/2003 | Holthouse et al. | 704/275 |
| 6,879,685 B1 | * | 4/2005 | Peterson et al. | 379/265.11 |

OTHER PUBLICATIONS

D. Stallard, "Talk'N'Travel: A Conversational System for Air Travel Planning," Applied Natural Language Processing ANLP 2000, Seattle, WA.
E. Levin et al., "CHRONUS, The Next Generation," ARPA Workshop on Spoken Language Technology, 1995, Austin, TX.
C.H. Lee et al., "On Natural Language Call Routing," Speech Communications, vol. 31, pp. 309-320, 2000.
H. Chang et al., "An Automated Performance Evaluation System For Speech Recognizers Used In The Telephone Network," International Conference On World Prosperity Through Communications, 1989.
D.S. Pallett et al., "1993 Benchmark Test For The ARPA Spoken Language Program," ARPA Workshop on Spoken Language Technology, 1994, Princeton, NJ.
K. Edwards et al., "Evaluating Commercial Speech Recognition and DTMF Technology for Automated Telephone Banking Services," IEEE Colloquium on Advances in Interactive Voice Technologies for Telecommunication Services, 1997.
U.S. Appl. No. 10/090,205, Pending, Patrick Peterson et al.

(Continued)

*Primary Examiner*—Barry W. Taylor

(57) ABSTRACT

An apparatus and method for monitoring the performance of an interactive voice response (IVR) system used by an automated call processing center generates logs of call activity, determines routing information from the logs, notes predetermined significant activity in agent-caller dialog portions of calls routed to an agent in the logs, and determines at least one quantity correlated to a true intention of callers. A performance model of the IVR system is generated from the logs. The logs, the routing information, the quantity correlated to the true intention of the callers, and the performance model are analyzed to determine a performance value of the IVR system, which is used to monitor the IVR system.

30 Claims, 43 Drawing Sheets

TRUE CALL TYPE (FROM AGENT INTERACTION)

| CALLER'S TT MENU CHOICE | SPECIALTY 1 | SPECIALTY 2 | SPECIALTY 3 | FLOOR | CALLS BY ROUTING | CORRECTLY ROUTED |
|---|---|---|---|---|---|---|
| SPECIALTY 1 | 33 | 0 | 16 | 16 | 65 | 51% |
| SPECIALTY 2 | 0 | 24 | 0 | 0 | 24 | 100% |
| SPECIALTY 3 | 0 | 2 | 8 | 0 | 10 | 80% |
| FLOOR | 22 | 10 | 26 | 150 | 208 | 72% |
| CALLS BY TRUE TOPIC | 55 | 36 | 50 | 166 | 307 | |
| TOPIC VOLUME | 18% | 12% | 16% | 54% | 100% | |
| CORRECTLY IDENTIFIED | 60% | 67% | 16% | 90% | | 70% OVERALL ACCURACY |

DIAGONAL = CORRECTLY ROUTED
OTHERS = MISROUTED

OTHER PUBLICATIONS

U.S. Appl. No. 10/090,579, Pending, Patrick Peterson et al.
U.S. Appl. No. 10/090,546, Pending, Katherine Godfrey et al.
U.S. Appl. No. 10/090,369, Pending, Bernhard Suhm et al.
U.S. Appl. No. 10/090,264, Pending, Patrick Peterson et al.
U.S. Appl. No. 10/090,395, Pending, Patrick Peterson et al.
U.S. Appl. No. 10/090,210, Pending, Patrick Peterson et al.
U.S. Appl. No. 10/090.522, Pending, Patrick Peterson et al.
U.S. Appl. No. 10/090,524, Pending, Marie Meteer et al.
C.A. Kamm et al., Design and Evaluation of Spoken Dialog Systems, Proc. Of IEEE Workshop on Automatic Speech Recognition and Understanding, 1997 pp. 11-18.
Jeremy Peckham, A New Generation of Spoken Dialogue Systems: Results and Lessons from the Sundial Project, Proc. Of the 3$^{rd}$ European Conference on Speech Communication and Technology, Berlin, Sep. 1993, pp. 33-40.
S. Bennacef et al., Dialog in the RailTel Telephone-Based System, Intl. Conf. On Speech and Language Processing, Philadelphia 1996, pp. 550-553.
M. Walker et al., PARADISE: A Framework for Evaluating Spoken Dialogue Agents, Proc. Of the 35$^{th}$ Annual Meeting of The ACL and 8$^{th}$ European Conf. Of the European Chapter of the ACL, Jul. 7-12, 1997, Madrid, pp. 271-280.
M. Cohen, Universal Commands for Telephony-Based Spoken Language Systems, Telephone Speech Standards Committee, Common Dialog Tasks Subcommittee, SIGCHI Bulletin, vol. 32, No. 2, Apr. 2000, pp. 25-29.
Bruce Balentine and David P. Morgan, How to Build a Speech Recognition Application, Enterprise Integration Group, Inc., San Ramon, CA, 1999.

* cited by examiner

| FIG. 3C-1 | FIG. 3C-2 |

*FIG. 3B*

| STATE | TIME | OUTCOME |
|---|---|---|
| CALL ARRIVAL | ##.##:## | DATE; CALLER IDENTIFICATION |
| INITIAL MENU | ##.##:## | TOUCH TONE SELECTION, E.G., 3 |
| TELEPHONE NUMBER PROMPT | ##.##:## | TOUCH TONE NUMBERS PRESSED, E.G., 617-555-1212 |
| VALIDATE TELEPHONE NUMBER | ##.##:## | INVALID NUMBER |
| TELEPHONE NUMBER RE-PROMPT | ##.##:## | TOUCH TONE NUMBERS PRESSED |
| VALIDATE TELEPHONE NUMBER | ##.##:## | VALID NUMBER |
| MENU 1 | ##.##:## | TOUCH TONE SELECTION |
| QUERY A | ##.##:## | TOUCH TONE NUMBERS PRESSED |
| QUERY B | ##.##:## | TOUCH TONE NUMBERS PRESSED |
| MENU 2 | ##.##:## | TOUCH TONE SELECTION |
| TRANSFER TO AGENT | ##.##:## | TRANSFER QUEUE (CALLER ON HOLD) |
| IVR END | ##.##:## | TRANSFER COMPLETED |

FIG. 3E

| UNIQUE ID | TIME | STATE | OUTCOME |
|---|---|---|---|
| 212-123-4567 | ##,##,## | CALL ARRIVAL | DATE |
| 212-123-4567 | ##,##,## | INITIAL MENU | TOUCH TONE SELECTION |
| 212-123-4567 | ##,##,## | ACCOUNT NO. PROMPT | TOUCH TONE NUMBERS PRESSED |
| 212-123-4567 | ##,##,## | VALIDATE NUMBER | INVALID |
| 212-123-4567 | ##,##,## | ACCOUNT NO. RE-PROMPT | CALL TERMINATED BY CALLER |
| 201-321-4567 | ##,##,## | CALL ARRIVAL | DATE |
| 201-321-4567 | ##,##,## | INITIAL MENU | TOUCH TONE SELECTION |
| 201-321-4567 | ##,##,## | ACCOUNT NO. PROMPT | TOUCH TONE NUMBERS PRESSED |
| 201-321-4567 | ##,##,## | VALIDATE NUMBER | VALID |
| 201-321-4567 | ##,##,## | MENU 1 | TOUCH TONE SELECTION |
| 201-321-4567 | ##,##,## | TRANSFER TO AGENT | TRANSFER COMPLETED |
| 617-987-6543 | ##,##,## | CALL ARRIVAL | DATE |
| 617-987-6543 | ... | ... | ... |
| 617-987-6543 | ##,##,## | ACCOUNT BALANCE | INFORMATION DELIVERED |
| 617-987-6543 | ##,##,## | MENU 3 | TOUCH TONE ELECTION |
| 617-987-6543 | ##,##,## | TRANSFER TO AGENT | TRANSFER QUEUE (CALLER ON HOLD) |
| 617-987-6543 | ##,##,## | IVR END | CALL TERMINATED BY CALLER |

| | 10 | 38 | 53 | 64 | M-10 | M-33 | M-71 | M-130 | M-178 | M-215 |
|---|---|---|---|---|---|---|---|---|---|---|
| CALL NUMBER | 10 | 38 | 53 | 64 | M-10 | M-33 | M-71 | M-130 | M-178 | M-215 |
| TRANSCRIBER | YJT | YJT | YJT | 64 | MJW | MJW | MJW | MJW | MJW | MJW |
| DATE: | 12/14/1996 | 12/17/1996 | 12/19/1996 | 27-DEC | | | | | | |
| PHONE #: | | 2121234567 | 2011234567 | 9141234567 | 9731234567 | 9181234567 | 7321234567 | 5161234567 | 2021234567 | 7181234567 |
| SEX OF CALLER: | | | M | F | M | | F | F | M | M |
| CLOCK TIME (END OF INTERACTION) | 11:58 PM | 12:03 PM | 2:40 PM | 2:21 PM | 12:41 PM | 14:50:41 | 14:30:57 | 9:46:48 | 12:10:21 | 12:01:11 |
| DURATION OF INTERACTION (WHOLE MIN) | | 6 | 12 | 10 | 4 | 0 | 1 | 4 | 9 | 3 |
| DURATION OF ENTIRE CALL (WHOLE MIN) | | 6 | 12 | 11 | 5 | 3 | 3 | 12 | 68 | 5 |
| WAS THIS A FULLY AUTOMATED CALL? | 0 | 0 | 0 | 0 | 0 | 0 | 0 | 0 | 0 | 1 |
| DID CALL INVOLVE AN AGENT? | 0 | 1 | 1 | 1 | 1 | 1 | 1 | 1 | 1 | 0 |
| DEBUG | | 0 | | 0 | | 0 | | | 0 | 0 |
| IVR SUMMARY: (MENU CHOICES) | 4 | 3,1 | | 4,0 | INVALID | BILLING, OTHER | ADD/CHANGE | REPAIR | NEW,0 | NEW | BILLING, OTHER |
| (USE WORDS: "PHONE #" "RING" "FAST BUSY") | 3 | PHONE NO | | 3 | OTHER | | ADD/CHANGE | | INPUT NUMBER 2,2 | OTHER |
| "HANG UP" "ROTARY" | HANG UP | RING | | 3 | 4,3,3 | 3,1, 973-622-3626 | | | | 4,3,3 |
| DID CALLER TRY 0 AND FAIL? | 0 | 0 | | 1 | 0 | 0 | 0 | 1 | 0 | 0 |
| WAS CALL INCOMPLETE (0 FUNCTIONS?) | 0 | 0 | | 0 | 0 | 1 | 0 | 0 | 0 | 0 |
| (IF 1. INDICATE WHICH ONE APPLIES) | | | | | | | | | | |
| ABANDON AT START OF IVR (RINGING OR INTRO) | | | | | | | | | | |
| ABANDON AT # PHONE # PROMPT | | | | | | | | | | |
| ABANDON AT CUSTOMER ID PROMPT | | | | | | | | | | |
| ABANDON AT OTHER PROMPT | 1 | | | | | 1 | | | | |
| ABANDON WHILE RINGING FOR AGENT | | | | | | | | | | |
| ABANDON AT "ALL OUR AGENTS ARE CURRENTLY" | | | | | | | | | | |
| ABANDON AT FAST BUSY OR SYSTEM BUG | | | | | | | | | | |
| UNUSUALLY HEAVY CALL VOLUMES | | | | | | | | | | |
| WHERE IN IVR DID THEY ABANDON | | | | | | 1 | | | | |
| 1 MASTERKEY | | | | | | | | | | |
| 2 NEW SERVICE | | | | | | | | | | |
| 3 ADD/CHANGE | | 1 | 1 | | | | | | | |
| 4 BILLING/OTHER | 1 | | | 1 | 1 | | | | 1 | |
| 5 REPAIR | | | | | | | | | | |
| (IF CALLER GOT TO AN AGENT, HOW?) | | | | | | | | | | |
| BY ROTARY PHONE (0 TONES PRESSED?) | | | | | | | | | | |
| BY AUTO TRANSFER BASED ON PHONE NUMBER? | | | | | | | | | | |
| THROUGH INTRODUCTION BY PREVIOUS AGENT? | | | | | | | | | | |
| IN IVR THROUGH INVALID/TIMEOUT? | | | | | | 0 | 1 | 1 | | |
| IN IVR THROUGH A VALID NONZERO TRANSFER? | 0 | 1 | 1 | 1 | 1 | | 0 | 0 | 1 | |
| BY PRESSING "0" | | | | | | | | | | |
| OTHER (DIDN'T CATCH IT) | | | | | | | | | | |
| INDICATE MENU CHOICES MADE IN IVR | | | | | | | | | | |
| 1 PAY ARRANGEMENTS (MASTER KEY) | | | | | | | | | | |
| 2-1 ORDER NEW SERVICE (WELCOME CENTER) | | | | | | | | | | |

*FIG. 6B-1*

| | | | | | | | |
|---|---|---|---|---|---|---|---|
| 2-2 NEW SERVICE - FOLLOW-UP | | | | | | | |
| 3-1 ADD/ADD | | | | | | | |
| 3-2 ADD/REMOVE | | | | | | | |
| 3-3 DISCONNECT | | | | | | | |
| 4-1 BILLING/PHONE DIRECTORY | | | | | | | |
| 4-2 BILLING/UNAUTHORIZED CALLS | | | | | | | |
| 4-3-1 BILLING/OTHER/PAYMASTER K | | | | | | | |
| 4-3-2 BILLING/OTHER/MASTER KEY | | | | | | | |
| 4-3-3 BILLING/OTHER/OTHER | | | | | | | |
| 5 REPAIR (REPAIR CENTER) | | | | | 1 | | |
| 1-2 (SPANISH) | | | | | | | |
| (INDICATE FUNCTIONS COMPLETED IN IVR) | | | | | | | |
| PAYMENT CENTER LOCATION | | | | | | | |
| PAYMENT CENTER HOURS | | | | | | | |
| PAYMENT MAILING ADDRESS | | | | | | | |
| ACCOUNT INFORMATION | | | | | | | |
| ESTABLISH ACCT USING PIN | | | | | | | |
| PAYMENT ARRANGEMENTS | | | | | | | |
| ENTER DETAILS OF LAST PAYMENT | | | | | | | |
| COPY OF BILL | | | | | | | |
| AGENT CALL SUMMARY: (PROBLEM + SOLUTION) | WANTS TO ADD LONG DISTANCE TO MOTHER'S PHONE AND DROP FREE 30-DAY-TRIAL FEATURES | ANGRY LANDLORD CALLING FOR TENANTS. WARM TRANSFER IN AT START. TENANT IN APT 3 MOVING TO APT 4. WAS UNABLE TO GET THROUGH ON A MONDAY AFTER 45 MINUTES. | CUSTOMER UNHAPPY WITH XYZ WANTS TO SWITCH TO VERIZON REGIONAL: 3-AREA SELECTIVE CALLING. | RECEIVED VZ TELEMARKETING CALL NOT A VZ CUST AND JUST WANTS TO BE REMOVED FROM TELEMARKETING LIST. BLOCK ADDED TO LINE FOR VZ TELEMRK | CALLER THOUGHT IT WAS A VOICE-RECO SYSTEM AND WHEN PROMPTED FOR PHONE NUMBER, SPOKE IT AND DIDN'T PUT IT IN. NEEDS REPAIR DONE ON THE JACK IN HER ROOM. SCHEDULED AN APPT FOR BET. 12-7 TOMORROW | LEASING A PHONE COSTS MONEY WORRIED THAT SHE THREW A PHONE OUT AND SOMEONE IS USING IT. SHE'S STILL GETTING A BILL FOR IT. PHONE LEASED THROUGH XYZ AND SO IS TRANSFERRED TO XYZ LEASING. W/O HAVING REALISED THAT PHONE IS NOT CONNECTED TO NUMBER AND SHE'S NOT GETTING BILLED FOR OTHER CALLS. | NEW SVC ORDER ASSIGNED A NEW # AND T-> WELCOME CTR. | SON CHECKING ON CALLS THAT HE DOESN'T RECOGNIZE SISTER DIALING ID NUMBER FOR INTERNET ACCESS AND SHE'LL HAVE TO PAY FOR THE CALLS. |
| COULD THIS HAVE BEEN DONE IN MKTB | 0 | 0 | 0 | 0 | 0 | 0 | 0 | 1 |
| AGENT PERFORM AUTOMATED FUNCTIONS? | | | | | | | |
| INDICATE WHICH ONES! | | | | | | | |
| PAYMENT CENTER LOCATION | | | | | | | |
| PAYMENT CENTER HOURS | | | | | | | |
| PAYMENT MAILING ADDRESS | | | | | | | |
| ACCOUNT INFORMATION | | | | | | | |
| ESTABLISH ACCT USING PIN | | | | | | | |
| PAYMENT ARRANGEMENTS | | | | | | | |
| ENTER DETAILS OF LAST PAYMENT | | | | | | | |
| COPY OF BILL | | | | | | | |
| II. AGENT DO POTENTIALLY AUTO FUNCTIONS? | 0 | 0 | 0 | 0 | 0 | 0 | 0 | 0 |

FIG. 6B-2

| | | | | | | | | | | |
|---|---|---|---|---|---|---|---|---|---|---|
| INDICATE WHICH ONES! | | | | | | | | | | |
| REQUEST CALLING CARD | | | | | | | | | | |
| GET VOICE MAIL ACCESS # | | | | | | | | | | |
| GET 3 + 2 DIGIT NUMBER ON BILL | | | | | | | | | | |
| GET INFO ON RATES- BY MAIL OR SEE DIRECT. | | | | | | | | | | |
| GET ADDRESS FOR WRITING TO REFUTE BILL | | | | | | | | | | |
| OTHER: (POTENTIALLY AUTOMATABLE) | 0 | | 1 | | 1 | | 0 | 1 | 0 | 0 |
| II. DID AGENT DO NON-AUTOMATED FUNCTIONS? | | | | | | | | | | |
| INDICATE WHICH ONES! | | | | | | | | | | |
| PAYMENT ARRANGEMENTS | | | | | | | | | | |
| NEW SERVICE- EXPLAINS 2 PARTS NEEDED | | 1 | | | 1 | | | | | |
| NEW SERVICE FOLLOW UP (NOT DISCONNECT) | | | | | | | | | | |
| CHECK ON STATUS OF PENDING ORDER | | | | | | | | | | |
| SALES (PKGS, SERVICES, LINES, JACKS, ETC) | | | 1 | | | 1 | | | | |
| REMOVE FEATURE- AGENT AKS WHY | | | | | 1 | | | | | |
| DISCONNECT (AND FORWARD CALLS) | | | | | | | | | | |
| EXPLAIN BILL | | | | | | | | | | |
| REMOVE UNAUTHORIZED CALL FROM BILL | | | | | | | | | | |
| REMOVE OTHER CHARGES FROM BILL | | | | | | 1 | | | | |
| CONFIRM TODAY'S REPAIR SCHEDULE | | | | | | | | | | |
| SCHEDULE A VISIT WITH REPAIRMAN | | | | | | | | | | |
| TELL HOW/WHEN TO USE FEATURES THEY OWN | | | | S | | | | | | |
| OTHER | 0 | 2 | 2 | | 2 | 2 | 0 | 3 | 1 | 2 |
| WAS THIS CALL CODED ABOVE? | | 0 | 0 | | 0 | 1 | 0 | 0 | 1 | 0 |
| DID AGENT SEE CALL AS MISDIRECTED? | | | | | | | | | 1 | |
| DID AGENT TRANSFER THE CALL? | | | | | | | | | | |
| IV. IF TRANSFERRED, TO WHAT DESTINATION? | | | | | | | | | | |
| 800-281-8584 MASTER KEY | | | | | | | | | | |
| 800-775-2355 REPAIR | | | | | | | | | | |
| 800-287-9933 COLLECTION CENTER | | | | | | | | | | |
| 800-370-01000 SERVICE SOLUTIONS | | | | | | | | | | |
| TPV | | | | | | | | | | |
| 888-243-9733 TOLL BILLING | | | | | | | | | | |
| 800-246-2800 UNLAWFUL CALL SOL CTR | | | | | | | | | | |
| 800-585-6127 INSTALLATION HOTLINE | | | | | | | | | | |
| 877-525-2375 DSL | | | | | | | | | | |
| 800-427-9977 "BUSINESS OFFICE" | | | | | | | | | | |
| DMC | | | | | | | | | | |
| NEW SERVICE FOLLOWUP | | | | | | | | | | |
| DISCONNECT | | | | | | | | | | |
| TELL HOW TO USE FEATURES | | | | | | | | | | |
| WELCOME CENTER | | | | | | | | | | |
| BUSINESS ACCOUNTS | | | | | | | | | 1 | |

FIG. 6B-3

| | | | | | | | | | | |
|---|---|---|---|---|---|---|---|---|---|---|
| DIFFERENT CARRIER | | | | | | | | | | |
| SUPERVISOR | | | | | | | | | | |
| TRANSFER TO SPANISH AGENT | | | | | | | 1 | | | |
| WAS TRANSFER WARM (AGENT STAYED)? | | | | | | | 1 | | 7 | |
| DURATION WITH SECOND AGENT? | | | | | | | | | 58 | |
| FURTHER TRANSFERS? | | | | | | | | | 0 | |
| IF YES | | | | | | | | | | |
| TOTAL NUMBER OF AGENTS INVOLVED | | | | | 2 | | | | 2 | 2 |
| EXPLAIN: | | | | | | | | | XYZ EXPLAINED THAT LEASING IS ENDED AND THE PHONE ISN'T CONNECTED TO HER BILLING NUMBER. | 2ND AGENT ASSIGNS RATE PLAN, ETC. |
| TOPIC SUMMARY | | | | | | | | | | |
| PAYMENT ARRANGEMENT | 0 | 0 | 0 | 0 | 0 | 0 | 0 | 0 | 0 | 0 |
| NEW SERVICE | 0 | 0 | 0 | 0 | 0 | 0 | 0 | 0 | 0 | 0 |
| ORDER FOLLOW-UP | 0 | 1 | 0 | 1 | 0 | 0 | 0 | 0 | 0 | 0 |
| SALES - ADD | 0 | 0 | 0 | 0 | 0 | 0 | 0 | 0 | 0 | 0 |
| SALES-REMOVE | 0 | 0 | 0 | 0 | 0 | 0 | 0 | 0 | 0 | 0 |
| DISCONNECT | 0 | 0 | 0 | 0 | 0 | 0 | 0 | 0 | 0 | 0 |
| BALANCE/COPY... | 0 | 0 | 1 | 0 | 1 | 0 | 1 | 0 | 0 | 0 |
| OTHER | 0 | 0 | 0 | 0 | 0 | 0 | 0 | 1 | 1 | 0 |
| REPAIR | 0 | 0 | 0 | 0 | 0 | 0 | 0 | 0 | 0 | 0 |
| SPANISH | 0 | 0 | 0 | 0 | 0 | 0 | 0 | 0 | 0 | 1 |
| REROUTE | 0 | 0 | 0 | 0 | 0 | 0 | 0 | 0 | 0 | 0 |
| ROUTING SUMMARY | | | | | | | | | | |
| 1 OR 4-3-1 PAY ARRANGEMENTS (MASTER KEY) | 0 | 0 | 0 | 0 | 0 | 0 | 0 | 0 | 0 | 0 |
| 2-1 ORDER NEW SERVICE (WELCOME CENTER) | 0 | 0 | 0 | 0 | 0 | 0 | 0 | 0 | 0 | 0 |
| 2-2 NEW SERVICE - FOLLOW-UP | 0 | 1 | 0 | 1 | 0 | 0 | 0 | 0 | 0 | 0 |
| 3-1 ADD/ADD | 0 | 0 | 0 | 0 | 0 | 0 | 0 | 0 | 0 | 0 |
| 3-2 ADD/REMOVE | 0 | 0 | 0 | 0 | 0 | 0 | 0 | 0 | 0 | 0 |
| 3-3 DISCONNECT | 0 | 0 | 0 | 0 | 0 | 0 | 0 | 0 | 0 | 0 |
| 4-1 BILLING/PHONE DIRECTORY | 0 | 0 | 0 | 0 | 0 | 0 | 0 | 0 | 0 | 0 |
| 4-2 BILLING/UNAUTHORIZED CALLS | 0 | 0 | 0 | 0 | 0 | 0 | 0 | 0 | 0 | 0 |
| 4-3-2 BALANCE/COPY/LOCATIONS/LAST PAYMENT | 0 | 0 | 1 | 0 | 1 | 0 | 1 | 0 | 0 | 0 |
| 4-3-3 OTHER | 0 | 0 | 0 | 0 | 0 | 0 | 0 | 1 | 1 | 0 |
| 5 REPAIR (REPAIR CENTER) | 0 | 0 | 0 | 0 | 0 | 0 | 0 | 0 | 0 | 0 |
| 1-2 (SPANISH) | 0 | 0 | 0 | 0 | 0 | 0 | 0 | 0 | 0 | 1 |
| ROTARY (INITIAL TIMEOUT) | 0 | 0 | 0 | 0 | 0 | 0 | 0 | 0 | 0 | 0 |
| INVALID, TIMEOUT, OR "0" ONCE IN IVR | 0 | 0 | 0 | 0 | 0 | 0 | 0 | 0 | 0 | 0 |
| OTHER (UNKNOWN) | 0 | 0 | 0 | 0 | 0 | 0 | 0 | 0 | 0 | 1 |

|   | A | C | D | E |
|---|---|---|---|---|
| 1 | CALL NUMBER | ALL CALLS STATISTICS | | |
| 2 | TRANSCRIBER | | | |
| 3 | DATE: | | | |
| 4 | PHONE #: | | | |
| 5 | SEX OF CALLER: | | | |
| 6 | CLOCK TIME (END OF INTERACTION) | | | |
| 7 | DURATION OF INTERACTION (WHOLE MIN) | 5.123042506 | 0% | |
| 8 | DURATION OF ENTIRE CALL (WHOLE MIN) | 7.548098434 | 0% | |
| 9 | WAS THIS A FULLY AUTOMATED CALL? | 14 | 3% | |
| 10 | DID CALL INVOLVE AN AGENT? | 339 | 447 | |
| 11 | | | | |
| 12 | IVR SUMMARY: (MENU CHOICES) | 0 | 0% | |
| 13 | (USE WORDS: "PHONE #" "RING" "FAST BUSY" | 0 | 0% | |
| 14 | "HANG UP" "ROTARY" | 0 | 0% | |
| 15 | | | | |
| 16 | DID CALLER TRY 0 AND FAIL? | 30 | 7% | |
| 17 | WAS CALL INCOMPLETE (O FUNCTIONS?) | 94 | 21% | |
| 18 | [IF 1, INDICATE WHICH ONE APPLIES] | 0 | 0% | |
| 19 | ABANDON AT START OF IVR (RINGING OR INTRO) | 0 | 0% | |
| 20 | ABANDON AT PHONE # PROMPT | 4 | 1% | |
| 21 | ABANDON AT CUSTOMER ID PROMPT | 2 | 0% | |
| 22 | ABANDON AT PROMPT | 22 | 5% | |
| 23 | ABANDON WHILE RINGING FOR AGENT | 2 | 0% | |
| 24 | ABANDON AT "ALL OUR AGENTS ARE CURRENTLY" | 4 | 1% | |
| 25 | ABANDON AT FAST BUSY OR SYSTEM BUG | 14 | 3% | |
| 26 | UNUSUALLY HEAVY CALL VOLUMES | 17 | 4% | |
| 27 | OTHER: | 29 | 6% | |
| 28 | WHERE IN IVR DID THEY ABANDON | | | |
| 29 | 1 MASTERKEY | 20 | 4% | |
| 30 | 2 NEW SERVICE | 3 | 1% | |
| 31 | 3 ADD/CHANGE | 13 | 3% | |
| 32 | 4 BILLING/OTHER | 12 | 3% | |
| 33 | 5 REPAIR | 2 | 0% | |
| 34 | OTHER | 18 | 4% | |
| 35 | | | | |
| 36 | [IF CALLER GOT TO AN AGENT, HOW?] | 0 | 0% | |
| 37 | BY ROTARY PHONE (0 TONES PRESSED)? | 62 | 14% | |
| 38 | BY AUTO TRANSFER BASED ON PHONE NUMBER? | 0 | 0% | |
| 39 | THROUGH INTRODUCTION BY PREVIOUS AGENT? | 0 | 0% | |
| 40 | IN IVR THROUGH IVALID/TIMEOUT? | 28 | 6% | |
| 41 | IN IVR, THROUGH A VALID NONZERO TRANSFER? | 228 | 51% | |
| 42 | BY PRESSING "0" | 19 | 4% | |
| 43 | OTHER (DIDN'T CATCH IT) | 2 | 0% | |
| 44 | INDICATE MENU CHOICES MADE IN IVR | 0 | 0% | |
| 45 | 1. PAY ARRANGMENTS (MASTER KEY) | 12 | 3% | |
| 46 | 2-1 ORDER NEW SERVICE (WELCOME CENTER) | 28 | 6% | |
| 47 | 2-2 NEW SERVICE - FOLLOW -UP | 37 | 8% | |
| 48 | 3-1 ADD/ADD | 64 | 14% | |
| 49 | 3-2 ADD/REMOVE | 12 | 3% | |

*FIG. 6C-1*

| | A | C | D | E |
|---|---|---|---|---|
| 50 | 3-3 DISCONNECT | 11 | 2% | |
| 51 | 4-1 BILLING/PHONE DIRECTORY | 1 | 0% | |
| 52 | 4-2 BILLING/ UNAUTHOURIZED CALLS | 11 | 2% | |
| 53 | 4-3-1 BILLING/OTHER/PAY/MASTER K | 3 | 1% | |
| 54 | 4-3-2 BILLING/OTHER/MASTER KEY | 11 | 2% | |
| 55 | 4-3-3 BILLING/OTHER/OTHER | 71 | 16% | |
| 56 | 5 REPAIR (REPAIR CENTER) | 14 | 3% | |
| 57 | 1-2 (SPANISH) | 1 | 0% | |
| 58 | [INDICATE FUNCTIONS COMPLETED IN IVR] | 0 | 0% | |
| 59 | PAYMENT CENTER LOCATION | 3 | 1% | |
| 60 | PAYMENT CENTER HOURS | 0 | 0% | |
| 61 | PAYMENT MAILING ADDRESS | 2 | 0% | |
| 62 | ACCOUNT INFORMATION | 14 | 3% | |
| 63 | ESTABLISH ACCT USING PIN | 0 | 0% | |
| 64 | PAYMENT ARRANGEMENTS | 1 | 0% | |
| 65 | ENTER DETAILS OF LAST PAYMENT | 0 | 0% | |
| 66 | COPY OF BILL | 0 | 0% | |
| 67 | ORDER PHONE DIRECTORY | 0 | 0% | |
| 68 | IDENTIFY UNAUTH CALL | 4 | 1% | |
| 69 | GET 800 # TO IDENTIFY UNAUTH CALLS-ETC. | 3 | 1% | |
| 70 | | | | |
| 71 | AGENT CALL SUMMARY: (PROBLEM + SOLUTION) | | | |
| 72 | | | | |
| 73 | | | | |
| 74 | COULD THIS HAVE BEEN DONE IN MK/TB | 24 | 5% | |
| 75 | | | | |
| 76 | I. DID AGENT PERFORM AUTOMATED FUNCTIONS? | 25 | 6% | |
| 77 | [INDICATE WHICH ONES] | | | |
| 78 | PAYMENT CENTER LOCATION | 0 | 0% | |
| 79 | PAYMENT CENTER HOURS | 0 | 0% | |
| 80 | PAYMENT MAILING ADDRESS | 0 | 0% | |
| 81 | ACCOUNT INFORMATION | 9 | 2% | |
| 82 | ESTABLISH ACCT USING PIN | 0 | 0% | |
| 83 | PAYMENT ARRANGEMENTS | 5 | 1% | |
| 84 | ENTER DETAILS OF LAST PAYMENT | 0 | 0% | |
| 85 | COPY OF BILL | 5 | 1% | |
| 86 | ORDER PHONE DIRECTORY | 1 | 0% | |
| 87 | IDENTIFY ABC UNAUTH CALL | 5 | 1% | |
| 88 | IDENTIFY XYZ ETC. UNAUTH CALL | 0 | 0% | |
| 89 | | | | |
| 90 | II. DID AGENT DO POTENTIALLY AUTO FUNCTIONS? | 16 | 4% | |
| 91 | [INDICATE WHICH ONES] | | | |
| 92 | FIND TOLL CALL RANGE | 8 | 0% | |
| 93 | REQUEST CALLING CARD | | | |
| 94 | GET VOICE MAIL ACCESS # | 3 | 0% | |
| 95 | GET 3+2 DIGIT NUMBER ON BILL | 2 | 0% | |
| 96 | GET INFO ON RATES-BY MAIL OR SEE DIRECT | 0 | 0% | |
| 97 | GET ADDRESS FOR WRITING TO REFUTE BILL | 0 | 0% | |

*FIG. 6C-2*

|  | A | C | D | E |
|---|---|---|---|---|
| 98 | OTHER: (POTENTIALLY AUTOMATABLE) | 3 | 0% | |
| 99 | | | | |
| 100 | III. DID AGENT DO NON-AUTOMATED FUNCTIONS? | 220 | 49% | |
| 101 | [INDICATE WHICH ONES] | | | |
| 102 | PAYMENT ARRANGEMENTS | 5 | 1% | |
| 103 | NEW SERVICE- EXPLAINS 2 PARTS NEEDED | 21 | 5% | |
| 104 | NEW SERVICE FOLLOW UP (NOT DISCONNECT) | 10 | 2% | |
| 105 | CHECK ON STATUS OF PENDING ORDER | 6 | 0% | |
| 106 | SALES (PKGS, SERVICES, LINES, JACKS, ETC) | 65 | 15% | |
| 107 | SALES (REMOVE FEATURE- AGENT ASKS WHY) | 16 | 4% | |
| 108 | DISCONNECT (AND FORWARD CALLS) | 9 | 2% | |
| 109 | EXPLAIN BILL | 25 | 6% | |
| 110 | REMOVE UNAUTHORIZED CALL FROM BILL | 4 | 1% | |
| 111 | REMOVE OTHER CHARGES FROM BILL | 2 | 0% | |
| 112 | CONFIRM TODAY'S REPAIR SCHEDULE | 3 | 1% | |
| 113 | SCHEDULE A VISIT WIHT REPAIRMAN | 8 | 2% | |
| 114 | TELL HOW/WHEN TO USE FEATURES THEY OWN | 12 | 3% | |
| 115 | OTHER | 34 | 8% | |
| 116 | WAS THIS CALL CODED ABOVE? | 675 | 579 | |
| 117 | DID AGENT SEE CALL AS MISDIRECTED? | 81 | 18% | |
| 118 | DID AGENT TRANSFER THE CALL? | 82 | 18% | |
| 119 | IV. IF TRANSFERRED, TO WHAT DESTINATION? | 0 | 0% | |
| 120 | 800-281-8584 MASTER KEY | 0 | 0% | |
| 121 | 800-275-2355 REPAIR | 12 | 3% | |
| 122 | 800-287-9933 COLLECTION CENTER | 10 | 2% | |
| 123 | 800-870-0000 SERVICE SOLUTIONS | 0 | 0% | |
| 124 | TPV | 1 | 0% | |
| 125 | 888-243-9733 TOLL BILLING | 9 | 2% | |
| 126 | 800-246-2800 UNLAWFUL CALL SOL CTR | 0 | 0% | |
| 127 | 800-585-6127 INSTALLATION HOTLINE | 11 | 2% | |
| 128 | 877-525-2375 DSL | 2 | 0% | |
| 129 | 800-427-9977 "BUSINESS OFFICE" | 1 | 0% | |
| 130 | DMC | 1 | 0% | |
| 131 | NEW SERVICE FOLLOWUP | 1 | 0% | |
| 132 | DISCONNECT | 1 | 0% | |
| 133 | TELL HOW TO USE FEATURES | 1 | 0% | |
| 134 | WELCOME CENTER | 10 | 2% | |
| 135 | BUSINESS ACCOUNTS | 2 | 0% | |
| 136 | ISP CALL/VERIZON ONLINE | 2 | 0% | |
| 137 | WIRELESS | 3 | 1% | |
| 138 | DIFFERENT CARRIER | 2 | 0% | |
| 139 | SUPERVISOR | 0 | 0% | |
| 140 | OTHER | 3 | 1% | |
| 141 | TRANSER TO SPANISH AGENT | 6 | 1% | |
| 142 | WAS TRANSER WARM (AGENT STAYED)? | 34 | 8% | |
| 143 | DURATION WITH SECOND AGENT? | 663 | 0.292715232 | |
| 144 | FURTHER TRANSFERS? | 14 | 3% | |
| 145 | [IF YES] | | | |
| 146 | TOTAL NUMBER OF AGENTS INVOLVED | 205 | 9% | |

FIG. 6C-3

|     | A | C | D | E |
|-----|---|---|---|---|
| 147 | | | | |
| 148 | EXPLAIN: | | | |
| 149 | | | | |
| 150 | TOPIC SUMMARY | | | |
| 151 | PAYMENT ARRANGEMENT | 10 | | |
| 152 | NEW SERVICE | 21 | | |
| 153 | ORDER FOLLOW-UP | 16 | | |
| 154 | SALES-ADD | 65 | | |
| 155 | SALES-REMOVE | 16 | | |
| 156 | DISCONNECT | 9 | | |
| 157 | PHONE DIRECTORY | 1 | | |
| 158 | UNAUTHORIZED CALLS | 9 | | |
| 159 | BALANCE/COPY... | 14 | | |
| 160 | OTHER | 89 | | |
| 161 | REPAIR | 11 | | |
| 162 | SPANISH | 6 | | |
| 163 | REROUTE | | | |
| 164 | | 267 | | |
| 165 | | | | |
| 166 | | | | |
| 167 | | | | |
| 168 | | | | |
| 169 | | | | |
| 170 | | | | |
| 171 | | | | |
| 172 | | | | |
| 173 | | | | |
| 174 | ROUTING SUMMARY | | | |
| 175 | 1 OR 4-3-1 PAY ARRANGMENTS (MASTER KEY) | | | |
| 176 | 2-1 ORDER NEW SERVICE (WELCOME CENTER) | | | |
| 177 | 2-2 NEW SERVICE-FOLLOW-UP | | | |
| 178 | 3-1 ADD/ADD | | | |
| 179 | 3-2 ADD/REMOVE | | | |
| 180 | 3-3 DISCONNECT | | | |
| 181 | 4-1 BILLING/PHONE DIRECTORY | | | |
| 182 | 4-2 BILLING/UNAUTHORIZED CALLS | | | |
| 183 | 4-3-2 BALANCE/COPY/LOCATIONS/LAST PAYMENT | | | |
| 184 | 4-3-3 OTHER | | | |
| 185 | 5 REPAIR (REPAIR CENTER) | | | |
| 186 | 1-2 (SPANISH) | | | |
| 187 | ROTARY (INITIAL TIMEOUT) | | | |
| 188 | INVALID, TIMEOUT, OR "0" ONCE IN IVR | | | |
| 189 | OTHER (UNKNOWN) | | | |

FIG. 6C-4

| DATA | CONCLUSION |
|---|---|
| 1. CUSTOMER ROUTES SELF IN IVR TO WRONG AGENT<br>2. AGENT TRANSFERS CUSTOMER IN RESPONSE TO CUSTOMER NEED. | MISROUTING (2 OR MORE AGENTS INVOLVED INSTEAD OF 1) |
| 1. CUSTOMER ROUTES SELF IN IVR TO WRONG AGENT<br>2. AGENT PERFORMS FUNCTION ANYWAY. | MISROUTING (WRONG AGENT INVOLVED) |
| 1. AGENT PERFORMS FUNCTION.<br>2. FUNCTION IS AVAILABLE IN IVR. | UNDERUTILIZATION OF IVR FUNCTIONALITY. |
| 1. AGENT PERFORMS FUNCTION<br>2. FUNCTION NOT CURRENTLY AVAILABLE IN IVR.<br>3. FUNCTION COULD POTENTIALLY BE ADDED | IVR MISSING CRUCIAL FUNCTIONALITY |
| 1. CUSTOMERS OPTING OUT OF IVR AT FEW POPULAR POINTS.<br>2. IVR DOES NOT PROMPT FOR ID AT THE POINT. | MISSED OPPORTUNITY FOR AUTOMATED CUSTOMER DATA INPUT |
| 1. AGENT STAYS ON THE LINE DURING TRANSER<br>2. POLICY DOES NOT ADVOCATE A "WARM TRANSFER" | POSSIBLE POLICY VIOLATION (REGARDING WARM TRANSFERS) |
| 1. AGENT STAYS ON THE LINE DURING TRANSFER<br>2. TIME ON HOLD WITH CUSTOMER SUGGESTS AGENT NOT USING SPECIAL QUEUE FOR TRANSFER | POSSIBLE POLICY VIOLATION (REGARDING USE OF FAST QUEUE FOR AGENT TRANSFERS) |
| 1. # CUSTOMERS REMAINING SILENT IN IVR<br>2. PERCENTAGE OF ROTARY USERS KNOWN<br>3. IF 1 SUBSTANTIALLY EXCEEDS 2 | CUSTOMERS REFUSING TO PLAY THE GAME |
| 1. # COSTUMERS COOPERATING IN IVR<br>2. # CUSTOMERS GETTING READOUT BEFORE ABANDONING<br>IF 1 SUBSTANTIALLY EXCEEDS 2 | CUSTOMERS RECEIVING NO BENEFIT FROM IVR THOUGH WILLING TO TRY |
| 1. # CALLS<br>2. # CALLERS COMPLETING AT LEAST 1 FUNCTIONS IN IVR (INCLUDING GETTING READOUT) AND NOT GOING TO AGENT<br>IF 1 SUBSTANTIALLY EXCEEDS 2 | LOW "COMPLETE-SELF-SERVE" RATE |

*FIG. 6D*

| CALL PROFILE ($P_i$) | TRAFFIC ($f_i$) | | AUTOMATION ($B_{ji}$) | | | BENEFIT (AGENT SECS) | |
|---|---|---|---|---|---|---|---|
| | CALLS | % CALLS | ACCOUNT # | ROUTING | INFO DELIVERY | ONE CALL | AVERAGE |
| FULLY-AUTOMATED CALLS | 72 | 2.0% | A | R | I | 105 | 2.1 |
| TRANSFERS TO SPECIALIST AFTER INFORMATION READOUT | 1 | 0.0% | A | R | I | 105 | 0.0 |
| TRANSFERS TO FLOOR AFTER INFO READOUT | 38 | 1.0% | A | | I | 55 | 0.6 |
| TRANSFERS TO SPECIALIST W/ ID | 849 | 23.4% | A | R | | 40 | 9.3 |
| TRANSFERS TO FLOOR W/ ID | 1008 | 27.7% | A | | | 15 | 4.2 |
| TRANSFERS TO FLOOR W/O ID | 591 | 16.3% | | | | | |
| MISROUTED TO SPECIALIST W/ ID | 389 | 10.7% | A | -R | | -25 | -2.7 |
| MISROUTED TO SPECIALIST W/O ID | 6 | 0.2% | | -R | | -40 | -0.1 |
| ABANDONS | 681 | 18.7% | | | 3.1% | | |
| TOTAL | 3636 | 100.0% | 41.5% | 14.5% | | | 13.4 |

FIG. 8

| AUTOMATION CATEGORY | CALLER IDENTIFICATION ("A") | INFORMATION DELIVERY ("I") | ROUTING ("R") |
|---|---|---|---|
| ASSUMED BENEFIT [AGENT SECS] | 15 | 40 | 40 |

FIG. 9

| AUTOMATABLE TRANSACTIONS | #OCCURRENCES | TIME SPENT | FREQUENCY | SAVINGS POTENTIAL | AUTOMATION CATEGORY |
|---|---|---|---|---|---|
| ACCOUNT_BALANCE | 88 | 27.31 | 21.5% | 5.9 | I |
| NEW_PAYMENT_ARRANGEMENT | 56 | 20.94 | 13.7% | 2.9 | T |
| CURRENT_PAYMENT_ARRANGEMENT | 9 | 22.08 | 2.2% | 0.5 | I |
| ZIP_CODE | 2 | 9.48 | 0.5% | 0.0 | A |
| PAYMENT_LOCATION | 18 | 21.3 | 4.4% | 0.9 | I |
| BALANCED_PAYMENT_PLAN_AMOUNT | 6 | 21.8 | 1.5% | 0.3 | I |
| RULES_12_AND_22 | 11 | 13.5 | 2.7% | 0.4 | I |
| NEW_APPOINTMENT_DATE_TIME | 84 | 14.51 | 20.5% | 3.0 | A |
| IS_GAS_APPLIANCE | 3 | 24.75 | 0.7% | 0.2 | A |
| IS_NOT_GAS_APPLIANCE | 3 | 9.22 | 0.7% | 0.1 | A |
| NEW_APPOINTMENT_CONFIRMATION_TELEP | 82 | 18.26 | 20.0% | 3.7 | A |
| NEW_APPOINTMENT_LOCATION | 66 | 15.19 | 16.1% | 2.5 | A |
| NEW_APPOINTMENT_DOG | 57 | 11.72 | 13.9% | 1.6 | A |
| NEW_APPOINTMENT_MULTI_OR_SINGLE | | 0 | 0.0% | 0.0 | A |
| NEW_APPOINTMENT_ADULT_PRESENT | 5 | 5.29 | 1.2% | 0.1 | A |
| APPOINTMENT_DETAILS_CONFIRMATION | 13 | 36.14 | 3.2% | 1.1 | T |
| | 409 | | | 23.1 | |

TOTAL NUMBER OF ANNOTATED CALLS    WEIGHTED OPPORTUNITY: 16.6

%HANDLED BY AGENT 72%

FIG. 10

AUTOMATION CATEGORIES

| CUSTOMER CONTACT TYPE | % CALLS | CUSTOMER ID | ROUTING | INFO DELIVERY | TRANSACTION |
|---|---|---|---|---|---|
| CUSTOMER SERVICE | 8.7% | X | | | |
| BALANCE BILLING | 36.7% | X | X | X | |
| PAYMENT ARRANGEMENTS | 13.0% | X | X | X | X |
| PAYMENT OPTIONS | 4.0% | X | | X | |
| TURN ON | 3.0% | | | | |
| RATES | 1.3% | X | X | X | |
| STOP SERVICE | 3.5% | X | X | | |
| SERVICE | 11.5% | X | | | |
| APPOINTMENT | 16.5% | | X | X | |
| EMERGENCY | 1.8% | X | | | X |
| TOTAL/UPPER BOUNDS | 100.0% | 95.7% | 71.5% | 71.5% | 29.5% |

HOW TO TRANSFORM UPPER BOUNDS ON AUTOMATION TO AGENT TIME SAVING OPPORTUNITIES:

| | | | | |
|---|---|---|---|---|
| BENEFIT ASSUMPTION [AGENT SECS PER CALL] | 15 | 5 | 40 | 40 |
| BENEFIT [AGENT SECS] | 14.355 | 3.575 | 28.6 | 11.8 |
| TOTAL OPPORTUNITY | 58.33 | | | |

| CALLER'S TT MENU CHOICE | TRUE CALL TYPE (FROM AGENT INTERACTION) | | | | CALLS BY ROUTING | CORRECTLY ROUTED |
| --- | --- | --- | --- | --- | --- | --- |
| | SPECIALTY 1 | SPECIALTY 2 | SPECIALTY 3 | FLOOR | | |
| SPECIALTY 1 | 33 | 0 | 16 | 16 | 65 | 51% |
| SPECIALTY 2 | 0 | 24 | 0 | 0 | 24 | 100% |
| SPECIALTY 3 | 0 | 2 | 8 | 0 | 10 | 80% |
| FLOOR | 22 | 10 | 26 | 150 | 208 | 72% |
| CALLS BY TRUE TOPIC | 55 | 36 | 50 | 166 | 307 | |
| TOPIC VOLUME | 18% | 12% | 16% | 54% | 100% | 70% |
| CORRECTLY IDENTIFIED | 60% | 67% | 16% | 90% | | OVERALL ACCURACY |

DIAGONAL = CORRECTLY ROUTED
OTHERS = MISROUTED

| | A | B | C | D | E | F | G | H |
|---|---|---|---|---|---|---|---|---|
| 1 | FILENAME | IVR EXIT | IVR ROUTING | IVR INFORMATION | IVR ROUTING DEST | FIRST AGENT | FIRST AGENT | FIRST TOPIC |
| 2 | /D4M/TRANS/ | INCOMPLETE | P-AGT_STARTHOMESERVICE | RULES_12_AND_22_READOUT | TURNON | | | STRT |
| 3 | /D4M/TRANS/ | INCOMPLETE | P-AGT_CSRFROMNEWPAY | CALLING_FROM_SERVICE_LOCATION,CONFIRM_ADDR | PAYMENTX | | | PAY-CHG |
| 4 | /D4M/TRANS/ | INCOMPLETE | P-AGT_NEWPAYMENTARRAN | CALLING_FROM_SERVICE_LOCATION,TELEPHONE,CO | PAYMENTX | | | PAY-MAK |
| 5 | /D4M/TRANS/ | INCOMPLETE | P-AGT_XFERFROMTELEPHON | CALLING_FROM_SERVICE_LOCATION,CONFIRM | BALANCEBILLING | | | PAY-MAK |
| 6 | /D4M/TRANS/ | INCOMPLETE | P-AGT_CSRFROMBILLING | | BALANCEBILLING | | | ECI |
| 7 | /D4M/TRANS/ | INCOMPLETE | P-AGT_CSRFROMBILLING | | BALANCEBILLING | | | RSTR |
| 8 | /D4M/TRANS/ | INCOMPLETE | P-AGT_DUPSTATFAILURE | CALLING_FROM_SERVICE_LOCATION,TELEPHONE | BALANCEBILLING | | | OTH |
| 9 | /D4M/TRANS/ | INCOMPLETE | P-AGT_CSRFROMMAIN | | CUSTOMERSERVICE | | | PAY-MAK |
| 10 | /D4M/TRANS/ | INCOMPLETE | P-AGT_CSRFROMMAIN | | CUSTOMERSERVICE | | | PAY-REV |
| 11 | /D4M/TRANS/ | INCOMPLETE | P-AGT_XFERFROMCONFIRMA | CALLING_FROM_SERVICE_LOCATION,CONFIRM_ADDR | PAYMENTX | | | PAY-MAK |
| 12 | /D4M/TRANS/ | INCOMPLETE | P-AGENT_START_COMM | RULES_12_AND_22_READOUT | TURNON | | | CHNG |
| 13 | /D4M/TRANS/ | INCOMPLETE | P-AGT_NEWPAYMENTARRAN | CALLING_FROM_SERVICE_LOCATION,CONFIRM_ADDR | PAYMENTX | | | PAY-MAK |
| 14 | /D4M/TRANS/ | INCOMPLETE | P-AGT_STARTCLEANANDSHO | RULES_12_AND22_READOUT | TURNON | | | CHNG |
| 15 | /D4M/TRANS/ | INCOMPLETE | P-AGT_CSRFROMBILLING | | BALANCEBILLING | | | PAY-MAK |
| 16 | /D4M/TRANS/ | INCOMPLETE | P-AGT_CSRFROMMAIN | CALLING_FROM_SERVICE_LOCATION,CONFIRM_ADDR | PAYMENTX | | | PAY-MAK |
| 17 | /D4M/TRANS/ | INCOMPLETE | P-AGT_CSRFROMMAIN | | CUSTOMERSERVICE | | | PAY-MAK |
| 18 | /D4M/TRANS/ | INCOMPLETE | P-AGT_CSRFROMDUPLICATE | CALLING_FROM_SERVICE_LOCATION,TELEPHONE,CO | BALANCEBILLING | | | ECI |
| 19 | /D4M/TRANS/ | INCOMPLETE | P-AGT_STARTGASHOME | RULES_12_AND_22_READOUT | TURNON | | | STRT |
| 20 | /D4M/TRANS/ | INCOMPLETE | P-AGT_XFERFROMTELEPHON | CALLING_FROM_SERVICE_LOCATION,CONFIRM_ADDR | PAYMENTX | | | BAL |
| 21 | /D4M/TRANS/ | INCOMPLETE | P-AGT_NEWPAYMENTARRAN | CALLING_FROM_SERVICE_LOCATION,CONFIRM_ADDR | PAYMENTX | | | PAY-MAK |
| 22 | /D4M/TRANS/ | INCOMPLETE | P-AGT_XFERFROMTELEPHON | CALLING_FROM_SERVICE_LOCATION,TELEPHONE | BALANCEBILLING | | | PAY-MAK |
| 23 | /D4M/TRANS/ | INCOMPLETE | P-AGT_XFERFROMCONFIRMA | CALLING_FROM_SERVICE_LOCATION,TELEPHONE,CO | PAYMENTX | | | PAY |
| 24 | /D4M/TRANS/ | INCOMPLETE | P-AGT_CSRFROMMAIN | | CUSTOMERSERVICE | | | OTH |
| 25 | /D4M/TRANS/ | INCOMPLETE | P-AGT_CSRFROMMAIN | | CUSTOMERSERVICE | | | PAY-MAK |
| 26 | /D4M/TRANS/ | INCOMPLETE | P-AGENT-ID-MAKE-APPOINTM | | APPOINTMENT | | | RSTR |
| 27 | /D4M/TRANS/ | INCOMPLETE | P-AGT_CSRFROMMAIN | | CUSTOMERSERVICE | | | RSTR |
| 28 | /D4M/TRANS/ | INCOMPLETE | P-AGT_STARTHOMESERVICE | RULES_12_AND_22_READOUT | TURNON | | | STRT |
| 29 | /D4M/TRANS/ | INCOMPLETE | P-AGT_CSRFROMMAIN | | CUSTOMERSERVICE | | | PAY-MAK |
| 30 | /D4M/TRANS/ | INCOMPLETE | P-AGEND-MAIL_ELEC_R | RULES_12_AND_22_READOUT | RATES | | | STRT |
| 31 | /D4M/TRANS/ | INCOMPLETE | P-AGT_CSRFROMMAIN | | CUSTOMERSERVICE | | | PAY-MAK |
| 32 | /D4M/TRANS/ | INCOMPLETE | P-AGT_REFUSEDNEWPAY_M | CALLING_FROM_SERVICE_LOCATION,CONFIRM_ADDR | PAYMENTX | | | PAY-MAK |
| 33 | /D4M/TRANS/ | INCOMPLETE | P-AGT_INCORRECTNOCURRE | CALLING_FROM_SERVICE_LOCATION,CONFIRM_ADDR | PAYMENTX | | | PAY-REV |
| 34 | /D4M/TRANS/ | INCOMPLETE | P-AGT_XFERFROMTELEPHON | CALLING_FROM_SERVICE_LOCATION,TELEPHONE | PAYMENTX | | | PAY-MAK |
| 35 | /D4M/TRANS/ | INCOMPLETE | P-AGT_CSRFROMBILLING | | BALANCEBILLING | | | BIL |
| 36 | /D4M/TRANS/ | INCOMPLETE | P-AGT_CSRFROMMAIN | | CUSTOMERSERVICE | | | PAY-MAK |

APPARATUS AND METHOD FOR MONITORING PERFORMANCE OF AN AUTOMATED RESPONSE SYSTEM

CROSS REFERENCE TO RELATED APPLICATIONS

This application claims benefit of U.S. Provisional Appln. No. 60/273,710, filed Mar. 5, 2001, and U.S. Provisional Appln. No. 60/276,266, filed Mar. 15, 2001, which are each hereby incorporated herein by reference.

BACKGROUND OF THE INVENTION

1. Field of the Invention

The present invention relates to systems and methods for assessing call center performance and, in particular, to systems and methods that allow the performance and current and potential levels of automation of a call center to be quantified.

2. Discussion of the Related Art

Telephone user interfaces are the most widespread class of human-computer interfaces. Introduced more than a decade ago, touch-tone interactive voice response (IVR) systems were adopted enthusiastically in many call-centers and promised to provide customer service efficiently. However, calling customers (callers) have exhibited antipathy towards touch-tone IVR systems, viewing them as difficult to use. Further aggravating the callers is the fact that they often endure long waiting times before they can speak to live agents. This dichotomy is not surprising considering that most call-centers focus on minimizing operating costs and that usability and its impact on call-center operations are poorly understood.

Since touch-tone IVR systems have been deployed for more than a decade, a significant body of know-how on IVR systems has accumulated in the industry. Except for recent attempts to define a style guide for (telephone) speech applications, as in Balentine, B. and D. P. Morgan, *How to Build A Speech Recognition Application*, 1999, San Ramon, Calif., Enterprise Integration Group, and to introduce universal commands in speech-enabled IVR systems, as in Cohen, M., *Universal Command for Telephony-Based Spoken Language Systems*, SIG-CHI Bulletin, 2000, 32(2), pp. 25–30, this body of knowledge is not well documented. The prevalence of usability problems in deployed IVR systems suggests that designing good telephone interfaces is difficult and usability engineering methods for telephone interfaces are not well developed.

Another area of related work is research on spoken dialog systems, an important application of speech recognition technology. Spoken dialog systems allow the caller to communicate with a system in a spoken dialog, not necessarily over the telephone. Many research articles on spoken dialog systems have been published, e.g., Stallard, D., Talk'N'Travel: *A Conversational System for Air Travel Planning*, in Applied Natural Language Processing ANLP, 2000, Seattle, Wash.; Peckham, J., *A new generation of spoken language systems: recent results and lessons from the SUNDIAL project*, in European Conference on Speech Communication and Technology EUROSPEECH, 1993, Berlin (Germany): European Speech Communication Association; Levin, E. and R. Pieraccini, CHRONUS: The Next Generation, in ARPA Workshop on Spoken Language Technology, 1995, Austin (TX): Morgan Kaufmann Publishers, Inc.; Bennacef, S., et al., *Dialog in the RIALTEL telephone-based system*, in International Conference on Spoken Language Systems ICSLP, 1996, Philadelphia, Pa.; and Lee, C. H., et al., *On Natural Language Call Routing*, in Speech Communications, 2000, 31, pp. 309–320.

Previous work on spoken-dialog system evaluation focused on quantifying the performance of the underlying technologies, e.g., Chang, H., A. Smith, and G. Vysotsky, *An automated performance evaluation system for speech recognizers used in the telephone network*, in International Conference on World Prosperity Through Communications, 1989; and Pallett, D. S., et al., 1993 *Benchmark Tests for the ARPA Spoken Language Program*, in ARPA Workshop on Spoken Language Technology, 1994, Princeton (NJ): Morgan Kaufmann Publishers, Inc.

Some studies have evaluated the usability of telephone interfaces based on task completion rates and post-experimental questionnaires, e.g., Edwards, K., et al., *Evaluating Commercial Speech Recognition and DTMF Technology for Automated Telephone Banking Services*, in IEEE Colloquium on Advances in Interactive Voice Technologies for Telecommunication Services, 1997. More recently, PARADISE was introduced as a "consistent integrative framework for evaluation" of spoken language systems, as described in Walker, M. A., et al., *PARADISE: A Framework for evaluating spoken dialogue agents*, in 35th Annual Meeting of the Association of Computational Linguistics, 1997, Madrid: Morgan Kaufmann Publishers, Inc. Basically, PARADISE provides a method to identify measures that predict user satisfaction well, from the large set of measures that have been used in the field. However, this work does not address the cost for the call center, nor does it provide any guidance for telephone interface redesign.

SUMMARY OF THE INVENTION

The present invention overcomes the deficiencies of earlier systems by presenting a methodology for evaluating both usability and cost-effectiveness of telephone user interfaces. The assessment methodology of the present invention, and the various inventive techniques utilized within that methodology, provide usability practitioners with tools to identify and quantify usability problems in telephone interfaces, and provide call-center managers with the business justification for the cost of usability-improvement engineering.

The present invention relates to monitoring the performance of an automated response system of a call center. Of course, although the descriptions herein relate to call centers that process telephone calls, other types of contact centers other than call centers are within the realm of the present invention, including (but not limited to) Internet-based contact centers where customers contact a company's contact center via the Internet using known ways for transmitting messages and information via the Internet.

According to an aspect of the present invention, there is provided a method of monitoring performance of an interactive voice response (IVR) system used by an automated call processing center. A call from a caller to the call processing centering includes an initial IVR portion of the call, and, at the caller's option, an agent-caller dialog portion of the call. The method comprises: generating logs of call activity within the IVR system for a plurality of calls; determining, from the logs of call activity, routing information related to the plurality of calls within the IVR system, including routing of calls out of the IVR system to an agent; noting, in the logs of call activity, predetermined significant activity in agent-caller dialog portions of calls routed to an agent; determining at least one quantity correlated to a true intention of callers utilizing the IVR system; generating a performance model of the IVR system from the logs of call activity; and analyzing the logs of call activity, the determined routing information, the at least one determined quantity correlated to the true intention of the callers, and the performance model to determine a performance value of the IVR system. The performance value is used to monitor the IVR system.

According to another aspect of the present invention, there is provided an apparatus for monitoring performance of an interactive voice response (IVR) system used by an automated call processing center. A call from a caller to the call processing centering includes an initial IVR portion of the call, and, at the caller's option, an agent-caller dialog portion of the call. The apparatus comprises: means for generating logs of call activity within the IVR system for a plurality of calls; means for determining, from the logs of call activity, routing information related to the plurality of calls within the IVR system, including routing of calls out of the IVR system to an agent; means for noting, in the logs of call activity, predetermined significant activity in agent-caller dialog portions of calls routed to an agent; means for determining at least one quantity correlated to a true intention of callers utilizing the IVR system; means for generating a performance model of the IVR system from the logs of call activity; and means for analyzing the logs of call activity, the determined routing information, the at least one determined quantity correlated to the true intention of the callers, and the performance model to determine a performance value of the IVR system. The performance value is used to monitor the IVR system.

According to yet another aspect of the present invention, there is provided an apparatus for monitoring performance of an interactive voice response (IVR) system used by an automated call processing center. A call from a caller to the call processing centering includes an initial IVR portion of the call, and, at the caller's option, an agent-caller dialog portion of the call. The apparatus comprises: a log generation unit adapted to generate logs of call activity within the IVR system for a plurality of calls; a routing information determination unit adapted to determine, from the logs of call activity, routing information related to the plurality of calls within the IVR system, including routing of calls out of the IVR system to an agent; a significant activity notation unit adapted to note, in the logs of call activity, predetermined significant activity in agent-caller dialog portions of calls routed to an agent; a true-intention determination unit adapted to determine at least one quantity correlated to a true intention of callers utilizing the IVR system; a performance model generation unit adapted to generate a performance model of the IVR system from the logs of call activity; and an analysis unit adapted to analyze the logs of call activity, the determined routing information, the at least one determined quantity correlated to the true intention of the callers, and the performance model to determine a performance value of the IVR system. The performance value is used to monitor the IVR system.

According to still another aspect of the present invention, there is provided a system for monitoring performance of an interactive voice response (IVR) system used by an automated call processing center. A call from a caller to the call processing centering includes an initial IVR portion of the call, and, at the caller's option, an agent-caller dialog portion of the call. The system is operable to: generate logs of call activity within the IVR system for a plurality of calls; determine, from the logs of call activity, routing information related to the plurality of calls within the IVR system, including routing of calls out of the IVR system to an agent; note, in the logs of call activity, predetermined significant activity in agent-caller dialog portions of calls routed to an agent; determine at least one quantity correlated to a true intention of callers utilizing the IVR system; generate a performance model of the IVR system from the logs of call activity; and analyze the logs of call activity, the determined routing information, the at least one quantity correlated to the true intention of the callers, and the performance model to determine a performance value of the IVR system. The performance value is used to monitor the IVR system.

According to another aspect of the present invention, there is provided a computer program product embodying a program for implementing a method of monitoring performance of an interactive voice response (IVR) system used by an automated call processing center. A call from a caller to the call processing centering includes an initial IVR portion of the call, and, at the caller's option, an agent-caller dialog portion of the call. The program product comprises: code for generating logs of call activity within the IVR system for a plurality of calls; code for determining, from the logs of call activity, routing information related to the plurality of calls within the IVR system, including routing of calls out of the IVR system to an agent; code for noting, in the logs of call activity, predetermined significant activity in agent-caller dialog portions of calls routed to an agent; code for determining at least one quantity correlated to a true intention of callers utilizing the IVR system; code for generating a performance model of the IVR system from the logs of call activity; and code for analyzing the logs of call activity, the determined routing information, the at least one determined quantity correlated to the true intention of the callers, and the performance model to determine a performance value of the IVR system. The performance value is used to monitor the IVR system.

According to yet another aspect of the present invention, there is provided a method of monitoring performance of an automated response system used by an automated contact processing center. A contact from a contactor to the contact processing centering includes an initial automated portion of the contact, and, at the contactor's option, an agent-contactor dialog portion of the contact. The method comprises: generating logs of contact activity within the automated response system for a plurality of contacts; determining, from the logs of contact activity, routing information related to the plurality of contacts within the automated response system, including routing of contacts out of the automated response system to an agent; noting, in the logs of contact activity, predetermined significant activity in agent-contactor dialog portions of contacts routed to an agent; determining at least one quantity correlated to a true intention of contactors utilizing the automated response system; generating a performance model of the automated response system from the logs of contact activity; and analyzing the logs of contact activity, the determined routing information, the at least one determined quantity correlated to the true intention of the contactors, and the performance model to determine a performance value of the automated response system. The performance value is used to monitor the automated response system.

According to still another aspect of the present invention, there is provided an apparatus for monitoring performance of an automated response system used by an automated contact processing center. A contact from a contactor to the contact processing centering includes an initial automated portion of the contact, and, at the contactor's option, an agent-contactor dialog portion of the contact. The apparatus comprises: means for generating logs of contact activity within the automated response system for a plurality of contacts; means for determining, from the logs of contact activity, routing information related to the plurality of contacts within the automated response system, including routing of contacts out of the automated response system to an agent; means for noting, in the logs of contact activity, predetermined significant activity in agent-contactor dialog portions of contacts routed to an agent; means for determining at least one quantity correlated to a true intention of contactors utilizing the automated response system; means for generating a performance model of the automated response system from the logs of contact activity; and means for analyzing the logs of contact activity, the determined routing information, the at least one determined quantity correlated to the true intention of the contactors, and the performance model to determine a performance value of the automated response system. The performance value is used to monitor the automated response system.

According to another aspect of the present invention, there is provided an apparatus for monitoring performance of an automated response system used by an automated contact processing center. A contact from a contactor to the contact processing centering includes an initial automated portion of the contact, and, at the contactor's option, an agent-contactor dialog portion of the contact. The apparatus comprises: a log generation unit adapted to generate logs of contact activity within the automated response system for a plurality of contacts; a routing information determination unit adapted to determine, from the logs of contact activity, routing information related to the plurality of contacts within the automated response system, including routing of contacts out of the automated response system to an agent; a significant activity notation unit adapted to note, in the logs of contact activity, predetermined significant activity in agent-contactor dialog portions of contacts routed to an agent; a true-intention determination unit adapted to determine at least one quantity correlated to a true intention of contactors utilizing the automated response system; a performance model generation unit adapted to generate a performance model of the automated response system from the logs of contact activity; and an analysis unit adapted to analyze the logs of contact activity, the determined routing information, the at least one determined quantity correlated to the true intention of the contactors, and the performance model to determine a performance value of the automated response system. The performance value is used to monitor the automated response system.

According to yet another aspect of the present invention, there is provided a system for monitoring performance of an automated response system used by an automated response processing center. A contact from a contactor to the contact processing centering includes an initial automated portion of the contact, and, at the contactor's option, an agent-contactor dialog portion of the contact. The system is operable to: generate logs of contact activity within the automated response system for a plurality of contacts; determine, from the logs of contact activity, routing information related to the plurality of contacts within the automated response system, including routing of contacts out of the automated response system to an agent; note, in the logs of contact activity, predetermined significant activity in agent-contactor dialog portions of contacts routed to an agent; determine at least one quantity correlated to a true intention of contactors utilizing the automated response system; generate a performance model of the automated response system from the logs of contact activity; and analyze the logs of contact activity, the determined routing information, the at least one quantity correlated to the true intention of the contactors, and the performance model to determine a performance value of the automated response system. The performance value is used to monitor the automated response system.

According to still another aspect of the present invention, there is provided a computer program product embodying a program for implementing a method of monitoring performance of an automated response system used by an automated contact processing center. A contact from a contactor to the contact processing centering includes an initial automated portion of the contact, and, at the contactor's option, an agent-contactor dialog portion of the contact. The program product comprises: code for generating logs of contact activity within the automated response system for a plurality of contacts; code for determining, from the logs of contact activity, routing information related to the plurality of contacts within the automated response system, including routing of contacts out of the automated response system to an agent; code for noting, in the logs of contact activity, predetermined significant activity in agent-r contactor dialog portions of contacts routed to an agent; code for determining at least one quantity correlated to a true intention of contactors utilizing the automated response system; code for generating a performance model of the automated response system from the logs of contact activity; and code for analyzing the logs of contact activity, the determined routing information, the at least one determined quantity correlated to the true intention of the contactors, and the performance model to determine a performance value of the automated response system. The performance value is used to monitor the automated response system.

These and other objects, features, and advantages of the present invention will be apparent from the following description of the preferred embodiments considered in conjunction with the corresponding drawings.

BRIEF DESCRIPTION OF THE DRAWINGS

FIG. 6B, which is a composite of FIGS. 6B-1 through 6B-4, shows an example of a coding sheet used in mini assessment;

FIG. 6C, which is a composite of FIGS. 6C-1 through 6C-4, shows an example of tabulated results from an analysis of calls to a call center;

FIG. 6D is an example of an analysis report produced based on the tabulated results illustrated in FIG. 6B;

FIG. 8 is an example of a spreadsheet generated to assist in IVR system automation analysis;

FIG. 9 is a chart showing an example of standard benefit assumptions;

FIG. 10 is a chart for calculating an automation benefit of a call center, in accordance with an embodiment of the present invention;

FIG. 11 shows a chart useful for calculating an upper bound on call center automation;

FIG. 16 shows an exemplary confusion matrix, developed in accordance with the present invention;

FIG. 17 is an exemplary excerpt from a sum file;

DETAILED DESCRIPTION OF THE PREFERRED EMBODIMENTS

The present invention provides techniques for assessing interactive voice response (IVR) systems. The IVR system assessment techniques of the present invention provide functionality for evaluating the performance of commercial call centers in detail and can assist in providing concrete recommendations on how a call center IVR system can be improved. As part of this process, the IVR system assessment as practiced according to the present invention also quantifies the potential for improvement, in particular, the maximum operational (cost) savings a re-engineering effort could deliver. Advantageous results of an IVR system assessment include a detailed IVR system usability analysis, a set of recommendations for redesigning the system, and a business case for various redesign options.

I. Overview of Enumerated Techniques

Figure 1:
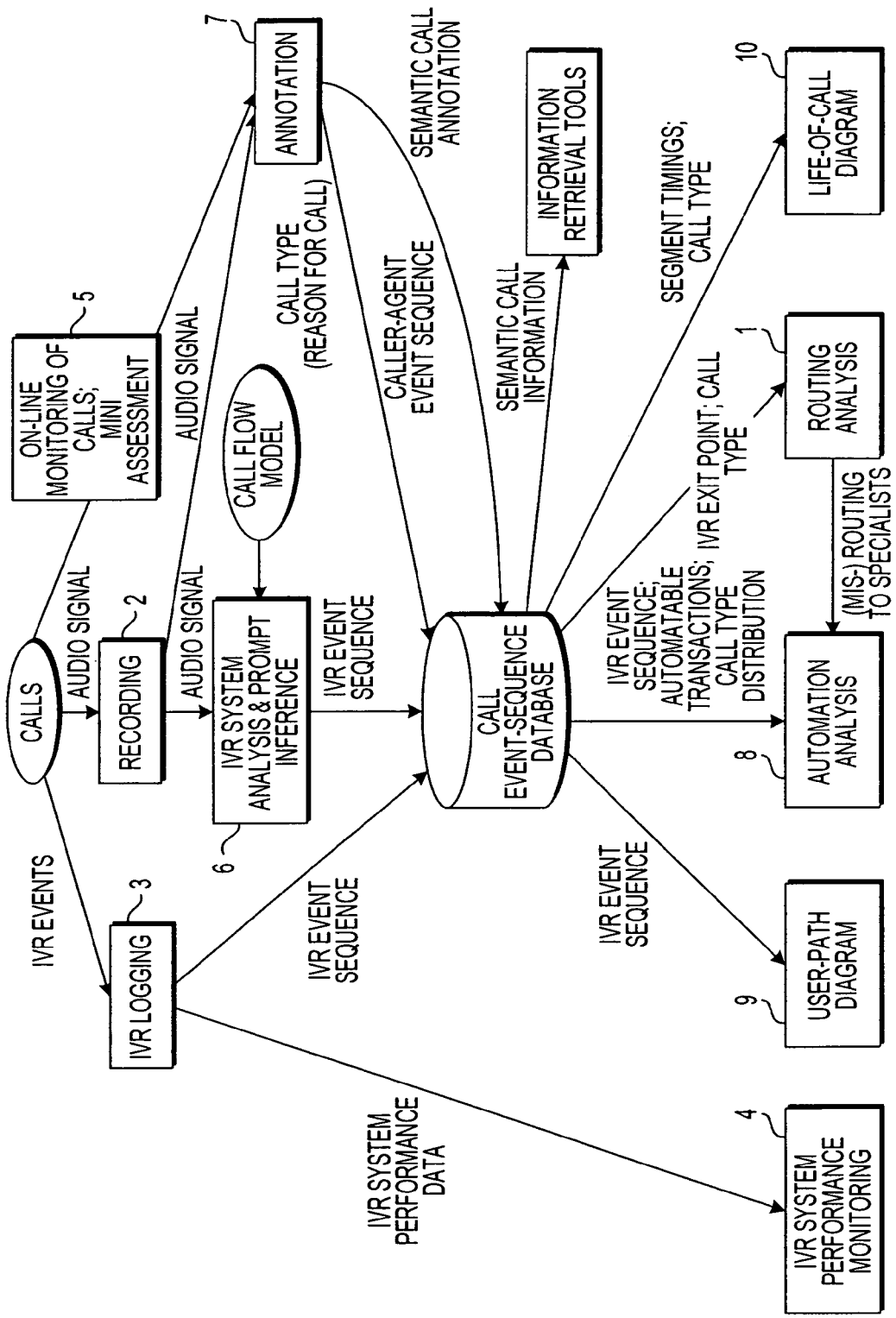
FIG. 1 is a schematic diagram illustrating components of a complete system for call center assessment, in accordance with preferred embodiments of the present invention.

Several new techniques are described below in the context of assessment of call-center performance, in relation to call-center automation in general and to IVR systems in particular. For ease of reference, these techniques will be identified by reference numbers, as shown in FIG. 1, and may be referred to as such throughout the specification. The techniques include: routing analysis 1, on-site and off-site end-to-end call recording 2, IVR logging 3, IVR system performance monitoring 4, mini assessment 5, IVR system analysis and prompt inference 6, call annotation and information retrieval 7, automation analysis 8, user-path diagram 9, and life-of-call diagram 10.

Initially, the above techniques will briefly be discussed in terms of how they relate to the overall assessment method and to one another. According to a preferred embodiment, the techniques enumerated above fit into the overall assessment method of the present invention as follows.

The assessment technique proceeds in two major phases. In the first phase, data from live calls is collected and processed into a format suitable for further analyses, that is, a database of complete call event-sequences for every call. The event sequence for every call should encompass both the IVR system-caller dialog and agent-caller dialog. The latter is included if such a dialog occurred during the call.

FIG. 1

In the second phase, based on the call event-sequence database, caller behavior is analyzed from different aspects and summary statistics are generated. FIG. 1 illustrates a complete process for an IVR system assessment and how the various enumerated techniques fit into a preferred embodiment of the assessment method and system of the present invention. Roughly speaking, the upper part of FIG. 1 illustrates various advantageous methods for obtaining a database of call event-sequences, and the lower part shows various assessment analysis techniques in accordance with the invention.

The capture of call event-sequences will be discussed next. The only complete record of user and system behavior in telephone user interfaces are complete calls. Therefore, any comprehensive assessment of telephone user interfaces must be based on complete records of calls, which may be stored in the form of a database of call event-sequences, shown as a central object in FIG. 1. A call typically begins with a dialog with an automated (IVR) system, called the IVR system-caller dialog, which may be followed by a dialog with a live agent, called the agent-caller dialog.

Three of the enumerated techniques are used to collect data from complete calls: IVR logging 3, call recording 2, and (on-line) call monitoring 5. First, in IVR logging 3, the IVR system itself provides a complete record (log) of system prompts and user responses. To obtain an IVR log, the IVR program is configured to write an event log at every significant state, as the call passes through the call-flow logic of the program. All log entries for a specific call constitute the complete event sequence for the IVR system-caller dialog of that call, which sequence can be stored in the call event-sequence database. The IVR logging technique is discussed in more detail below.

Second, end-to-end recordings of calls are obtained by passing incoming calls through specialized recording hardware, which stores the audio signal for a complete call into a file. Methods for obtaining end-to-end call recordings in accordance with the present invention are described below in the detailed discussion of call recording 2. Recordings of complete calls represent a large amount of data that is difficult to analyze in its raw form. For example, one hour of recording on one channel at 8 kHz with an 8-bit resolution corresponds roughly to 30 Mbytes of audio data. To make the analysis of call data efficient, call recordings are transformed into complete IVR event sequences using IVR system analysis and prompt inference 6, as described below in the detailed description of that technique.

Finally, instead of recording, a call can also be monitored manually, resulting in a rough, on-line annotation of the events of a complete call, including both the IVR system-caller dialog and the caller-agent dialog. This method is used in mini assessment 5, to be described in detail below. The main advantage of a mini-assessment over the two data collection methods discussed above is its low cost: instead of logging or recording and analyzing thousands of calls, only a few hundred calls are monitored and annotated manually, thus trading cost for accuracy.

Call analyses, assessment diagnostics, and customer relationship management (CRM) applications will be discussed next. Once event sequences have been obtained for many calls, these call records can be used in three main ways: to (constantly) monitor IVR system performance, to conduct a detailed IVR system assessment, and to annotate and retrieve information, e.g., for customer relationship management (CRM) purposes.

First, in IVR system performance monitoring 4, the performance of an IVR system is monitored constantly using a few key performance statistics. These performance statistics are obtained directly from IVR logs in a fully automated fashion, allowing monitoring to be conducted on an ongoing basis. Suitable performance statistics include IVR system automation, detailed measures thereof, such as rate of successful capture of caller ID or successful routing or delivery of information to the caller, or total IVR system benefit. Techniques for gathering these statistics are described in more detail below in relation to the technique for automation analysis 8.

Second, IVR system assessment techniques are used to analyze the call records in several ways to obtain detailed diagnostics for IVR system usability and efficiency. In one such technique, a user-path diagram 9 is produced that represents complete IVR event sequences visually in a state-transition diagram, which is annotated with the IVR exit conditions and the levels of automation achieved for every call. A user-path diagram essentially shows where callers went in the IVR system (what choices they made), whether they received useful information in the IVR system, where they abandoned the IVR system by hanging up, and if and where in the IVR program they were transferred to an agent. An example of a user-path diagram technique in accordance with a preferred embodiment will be described in detail below.

Routing analysis 1 is a technique that allows the performance of IVR routing to be visualized by graphically comparing choices made in IVR to the true reason for the call (or "call type"), as determined by annotations of agent-caller interactions. A confusion matrix, to be discussed below, is an example of such a graphical comparison.

Automation analysis 8 is a technique that quantifies the benefit of the existing IVR system as well as the potential for increasing automation. The benefit is calculated in terms of agent seconds (averaged across all calls), i.e., agent time saved by completing transactions in the IVR system that otherwise would have to be handled by an agent. The automation analysis 8 takes into account the benefit for routing callers to the correct place in the IVR system, which is measured in the routing analysis 1.

Finally, a life-of-call diagram 10 is a graphical technique that allows vital timing information for broad sections of a call, such as IVR-caller dialog, hold sections, and caller-agent dialogs, to be visualized. The timing of these sections is categorized by different call types, such as calls abandoned in the IVR system or while on hold for an agent, calls fully served in the IVR system, and calls handled by various kinds of specialist agents.

A mini assessment 5 performs most of the analyses described above based on manual annotations of a limited number of calls, which are monitored on-line. Thus, a mini assessment 5 can be viewed as a version of an IVR system assessment that delivers less accurate results but at a lower cost.

As shown by various arrows in FIG. 1, several of the IVR system assessment analysis techniques shown in that figure, in particular techniques 1, 8, and 10, require specific annotations of caller-agent dialogs. Techniques for gathering such annotations are described below as part of a more general method of annotating calls.

Finally, calls can be annotated with semantic events, and a database of call event-sequences enriched with semantic information can be accessed using information retrieval techniques such as annotation 7. Calls can be annotated with semantic information using at least three methods: by on-line monitoring (as in the mini-assessment), by manually annotating recorded calls, or by automatically annotating recorded calls. Semantic annotations can be limited to inputs required by an assessment, such as the true reason for a call (call type) and transactions or exchanges of information that are provided by the live agent but that could have been obtained in an automated (IVR) system. Once such a semantic call database has been developed, standard information retrieval techniques can be employed to access it. A detailed discussion of the specific techniques of the overall assessment system will next be described.

FIG. 1A

Figure 1A:
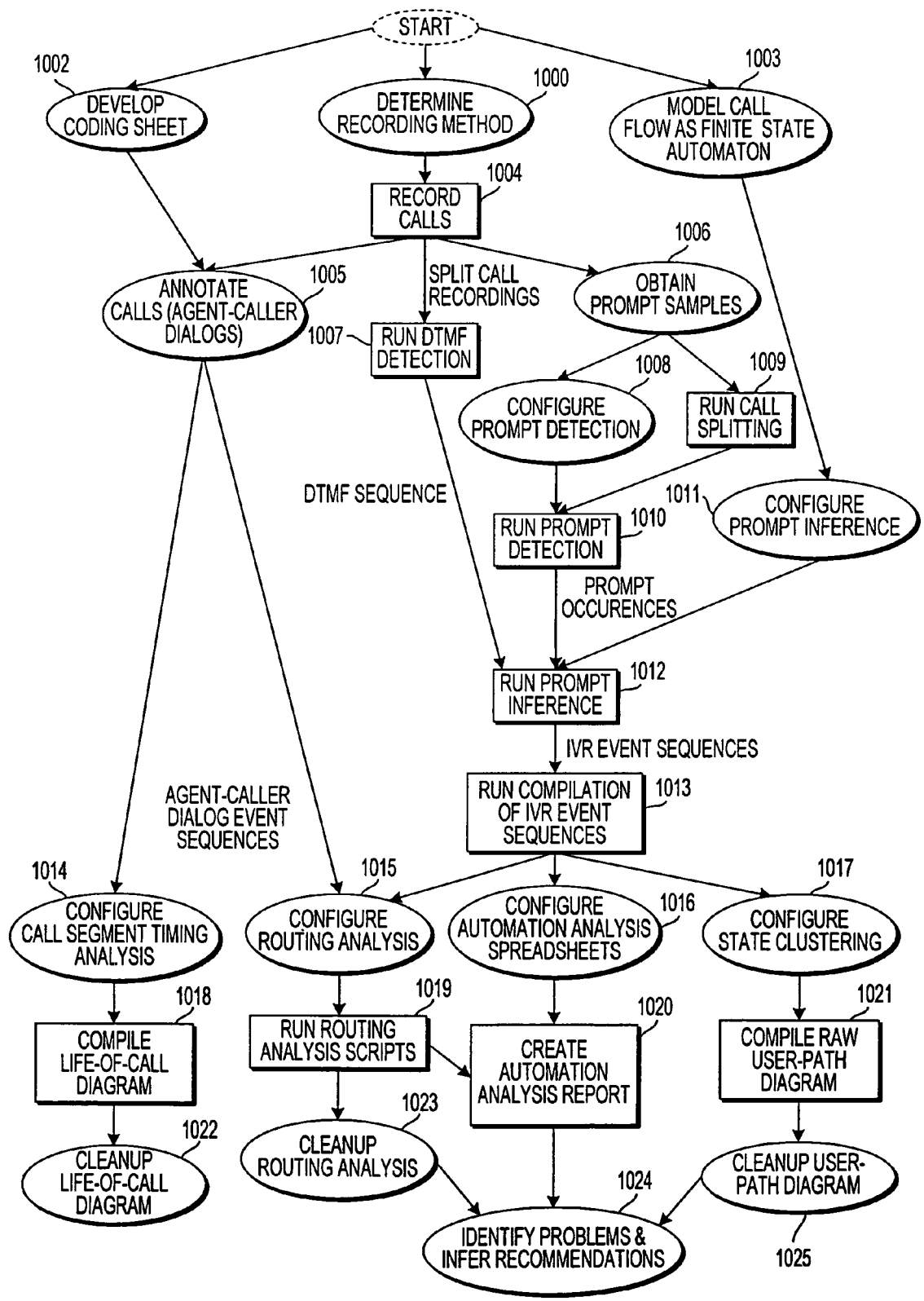
FIG. 1A is a chart describing a workflow of an assessment in accordance with the present invention.

The following describes the workflow of an assessment according to the preferred embodiment. The workflow is described with reference to FIG. 1A.

First, at step 1000 the recording method must be determined, i.e., how calls are being recorded end-to-end. The IVR platform employed in the call center determines which recording method (as described above) is feasible. Preferred are IVR platforms with a remote service-observation feature, because it makes end-to-end recording possible with the least amount of configuration required.

At the same stage in the workflow as determining the recording method, call annotation 7 and prompt inference 6 are configured. To configure annotation 7, at step 1002 a coding sheet is developed that determines what constitutes "significant" events in the agent-caller dialog for the call center under investigation. As part of the configuration of prompt inference 6, at step 1003 a non-deterministic finite-state automaton is defined that models the call-flow (IVR) logic. In a preferred embodiment, the finite-state automaton is defined using a flat text file called a "call flow specification" or ".cfs" file. Once a .cfs file is established, a set of prompts that are to be detected (rather than inferred) can be determined, as will be described in more detail infra.

At step 1004, end-to-end recordings of calls are made. Once end-to-end recordings of calls are available, call annotation 7 begins, at step 1005, and the various steps of prompt inference 6 can be configured. In a preferred embodiment, annotation 7 is performed manually by human annotators. To complete configuration of prompt inference 6, at step 1006 sample prompts are obtained from sample recordings for each prompt that is to be detected. The set of prompts that are to be detected have been determined earlier, based on the call-flow specification or .cfs file. Also, once recordings are available, at step 1007 a DTMF (dual-tone multi-frequency) detector is run automatically to obtain sequences of caller DTMF inputs for every recorded call. Furthermore, computer programs that process thousands of recordings are configured to perform the steps of IVR system analysis 6, i.e., to configure call splitting at step 1009, to configure prompt detection at step 1008, and to configure prompt inference at step 1011. This is accomplished by editing standard configuration files to suit current needs.

With the completion of IVR system analysis 6 at steps 1007 and 1009–1013 and call annotation 7 at step 1005, a sequence of significant events is available for every call, including both the IVR system-caller and agent-caller dialogs, as applicable. Further processes to be discussed in detail infra compile this event-sequence data to produce a user-path diagram 9, a routing analysis 1, an automation analysis 8, and a life-of-call diagram 10.

In a preferred embodiment, the user-path diagram 9 is generated using only IVR event-sequence data. At step 1021 several computer scripts successively compile the event-sequence data into a file that contains the IVR events for each call in a single line, called a sum file, fill in a two-way matrix that contains IVR system state-transition information, called a .trans file, optionally collapse the state-transition information by clustering states, and transform the state transition information into a rough layout as a tree, similar to the examples of user-path diagrams discussed infra. At step 1017 an analyst determines which states of the call flow should be clustered and represented as a single state in the user-path diagram, and a file must indicate the position and sizing of the various states to be displayed in the user-path diagram. The rough layout of the user-path diagram thus obtained is then loaded into a visualization tool (e.g., Microsoft™ Visio™) and at step 1025 the layout is cleaned-up manually.

At step 1019, routing analysis is performed using computer scripts that extract, for every annotated call, the IVR exit point from the IVR event-sequence and the call type from the agent-caller event sequence, and fill in a two-way routing matrix with counts as described infra. To configure these scripts, at step 1015 a file is generated that defines the different IVR exit points and call types, and how they appear in the IVR system-caller and agent-caller event sequences, respectively. The configured scripts are cleaned up manually using graphing programs available in standard spreadsheets (e.g., Microsoft™ Excel™).

Automation analysis 8 is performed based on the IVR event-sequence data and results of the routing analysis 1. At step 1020 computer scripts compile the IVR event-sequences into tables that collapse calls into various automation profiles, and accumulate count statistics for each profile. These call-profile count-statistics are read into a standard spreadsheet program. The spreadsheets are configured at step 1016 to account for misrouting, as described infra. Then, spreadsheet calculations produce a IVR system automation report and estimate a total IVR system benefit.

The process for creating a life-of-call diagram 10 is similar. First, a call-segment timing analysis is configured at step 1014 by indicating the different call types that are to be distinguished and which call segments have been annotated in calls. Next, at step 1018 computer scripts compile timing information based on annotations of every call, and calculate average timings across various call types. The output from the computer scripts, in table form, is read into a standard spreadsheet program that is configured at step 1022 to produce bar charts for the life-of-call diagram 10, as described infra.

Once all analyses have been completed, at step 1024 an analyst reviews all the data to identify specific problems in the call flow and to infer recommendations for call-flow redesign.

II. Detailed Description of Assessment Techniques

As outlined above, the present invention provides various techniques that form part of an assessment methodology operable to evaluate both cost effectiveness and usability of telephone interfaces based on a detailed analysis of end-to-end recordings of thousands of calls. This assessment methodology is applicable to both touch-tone IVR systems and speech-enabled IVR systems. Because agent time is the major cost driver in call-center operations, the methodology advantageously quantifies cost effectiveness in the form of a single number that measures how much agent handling time a telephone user-interface (IVR system) saves.

To quantify usability, task completion is refined into a set of IVR system automation rates, and the complete traffic through an IVR is represented as a tree, called a user-path diagram. Beyond evaluation, the methodology of the present invention has important implications for telephone user-interface design. Assessment results provide concrete guidance on how to improve the interface. Furthermore, the benefit of a redesigned interface can be estimated, thus providing the business justification for telephone interface usability reengineering.

As discussed above, in telephone user-interfaces, complete calls constitute the only complete record of user and system behavior. Therefore, the methodology of the present invention for performing a comprehensive usability assessment of telephone interfaces is based on end-to-end recordings of calls. A call typically begins with a dialog with an automated (IVR) system, which will be referred to as the IVR section of the IVR system-caller dialog, which may be followed by a dialog with a live agent, to be referred to as the agent-caller dialog.

The following sub-headings key into the various blocks shown in FIG. 1.

Collecting Data from Complete Calls (Recording) 2

Recordings of complete calls represent a large amount of data that is difficult to analyze in its raw form. For example, as mentioned above, one hour of recording on one channel at 8 kHz with an 8-bit resolution corresponds roughly to 30 Mbytes of audio data. To make the analysis of call data efficient, various techniques are used to transform the recordings into a complete trace of significant events for each call.

Significant events of a call include, in the IVR section of a call, system prompts and caller input (touch-tone or speech), and, in the agent-caller dialog, exchange of various kinds of information, such as account numbers, dollar amounts, etc., and description of the caller's problem, e.g., a question about a bill, an inquiry into flight schedules. While most of the analyses are based on an event sequence, the ability to switch between a call recording and its representation as an event sequence is extremely advantageous throughout the analysis process.

The initial stages of the assessment method of the present invention involve collecting data from complete calls and forming, from the collected call data, a call event trace. The formed call event trace must encompass both the IVR section and agent-caller dialog, if such a dialog occurs during a call. The reports generated by conventional IVR platforms are inadequate and inaccurate, because they do not track the event sequence for a call. Instead, they merely report "peg" counts, which indicate how many times a prompt or menu was visited overall, without maintaining references to specific calls. Conventional IVR reports are inaccurate because they count any call that ended within the IVR section as "resolved", regardless of whether the caller obtained any useful information.

The best method for capturing an IVR event sequence is an event log that is generated by the IVR system itself, and is described in the disclosure corresponding to reference numeral 3. However such IVR logging requires the IVR program code to be modified to write to an event log at appropriate states. This process is error-prone and intrusive to call-center operations. To avoid these disadvantages, the inventors have developed a method that infers the complete IVR event sequence from a call recording, and which can be performed after the fact. Since calls can be recorded remotely, the event sequence can thus be captured in an unobtrusive fashion.

The following section describes techniques employed to collect data from complete calls, in particular the end-to-end recording technique 2 and the IVR logging technique 3.

FIGS. 2A–2C

Figure 2A:
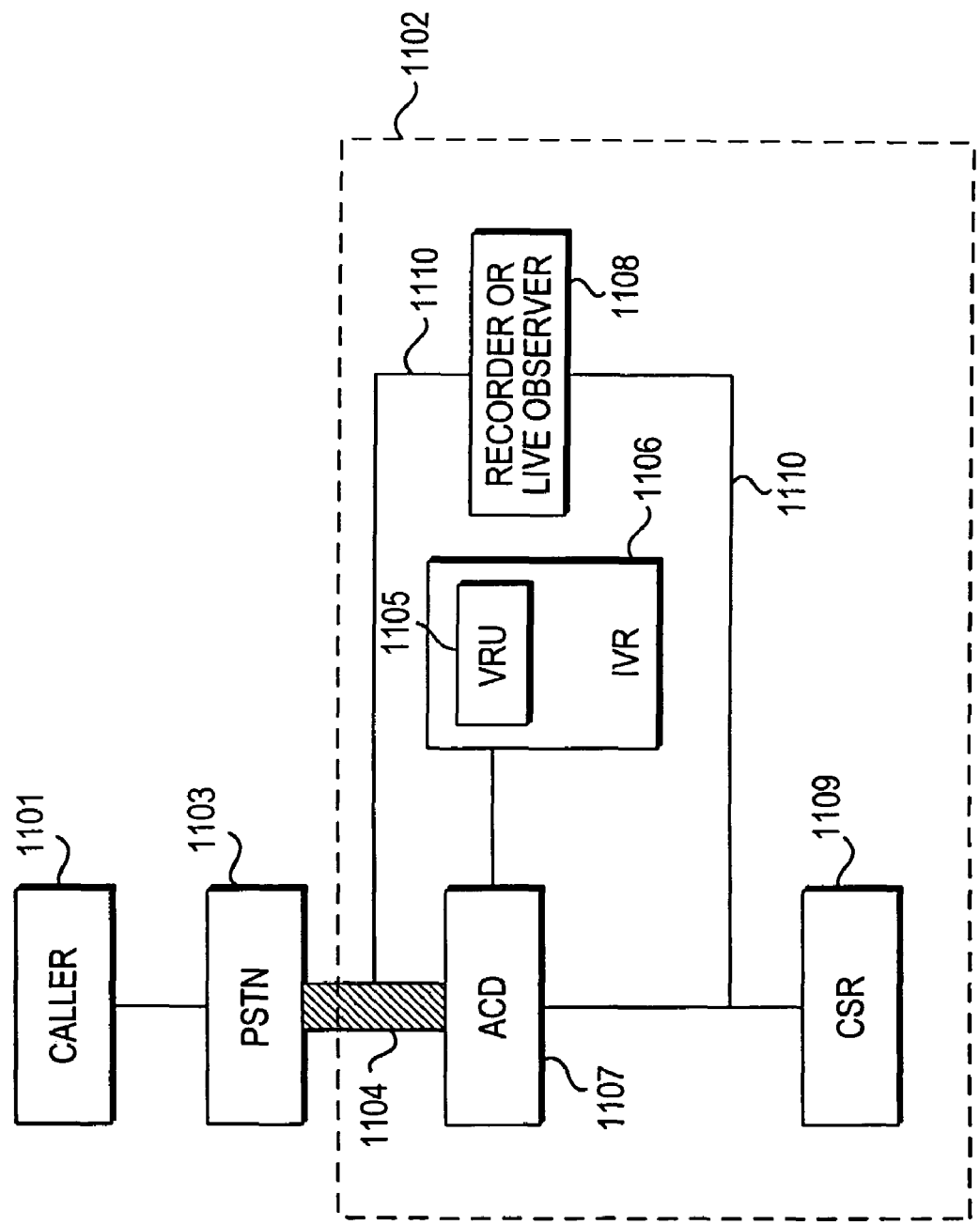
FIGS. 2A–2C illustrate three options for recording incoming calls to a call center.
Figure 2B:
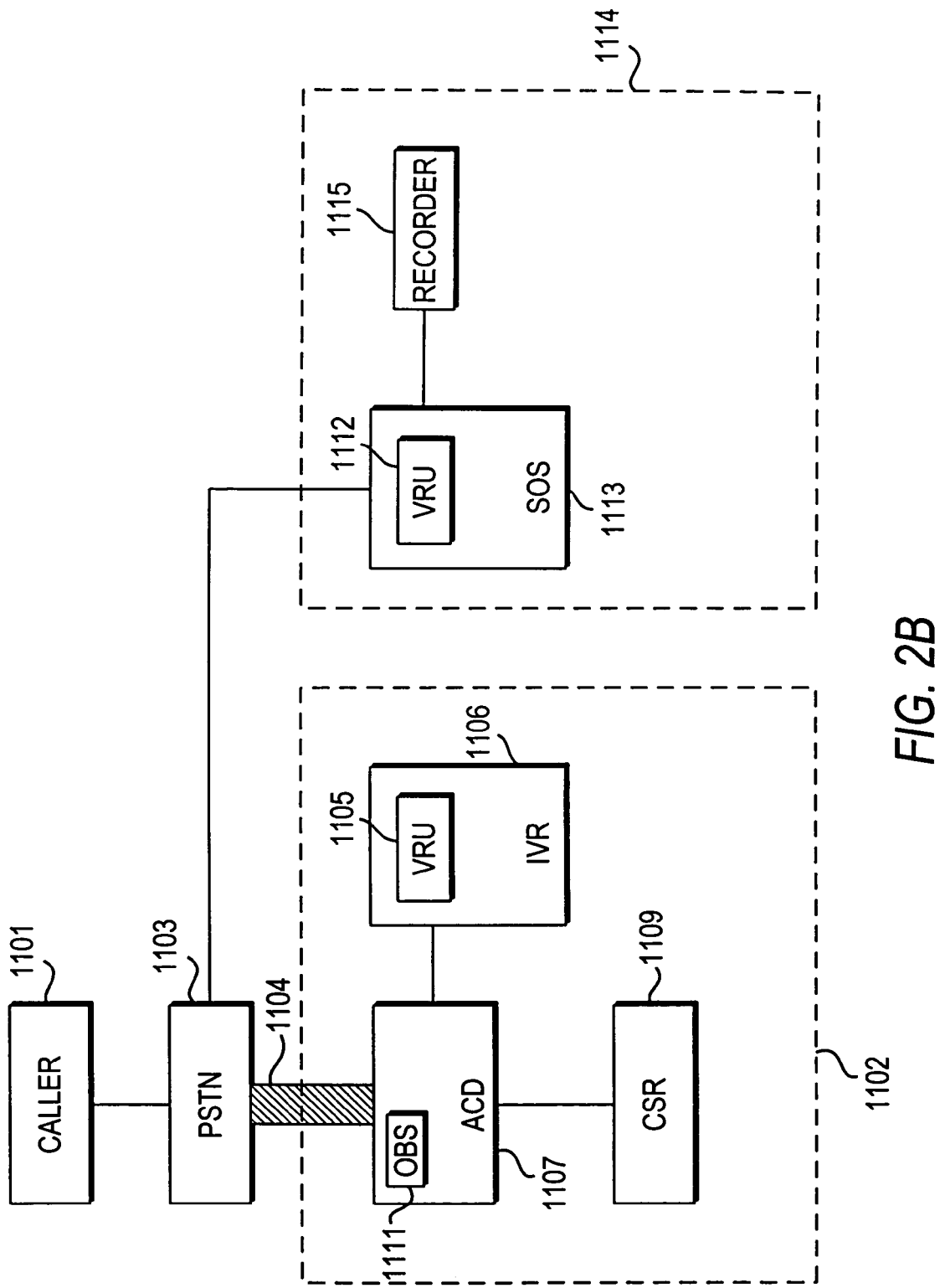
Figure 2C:
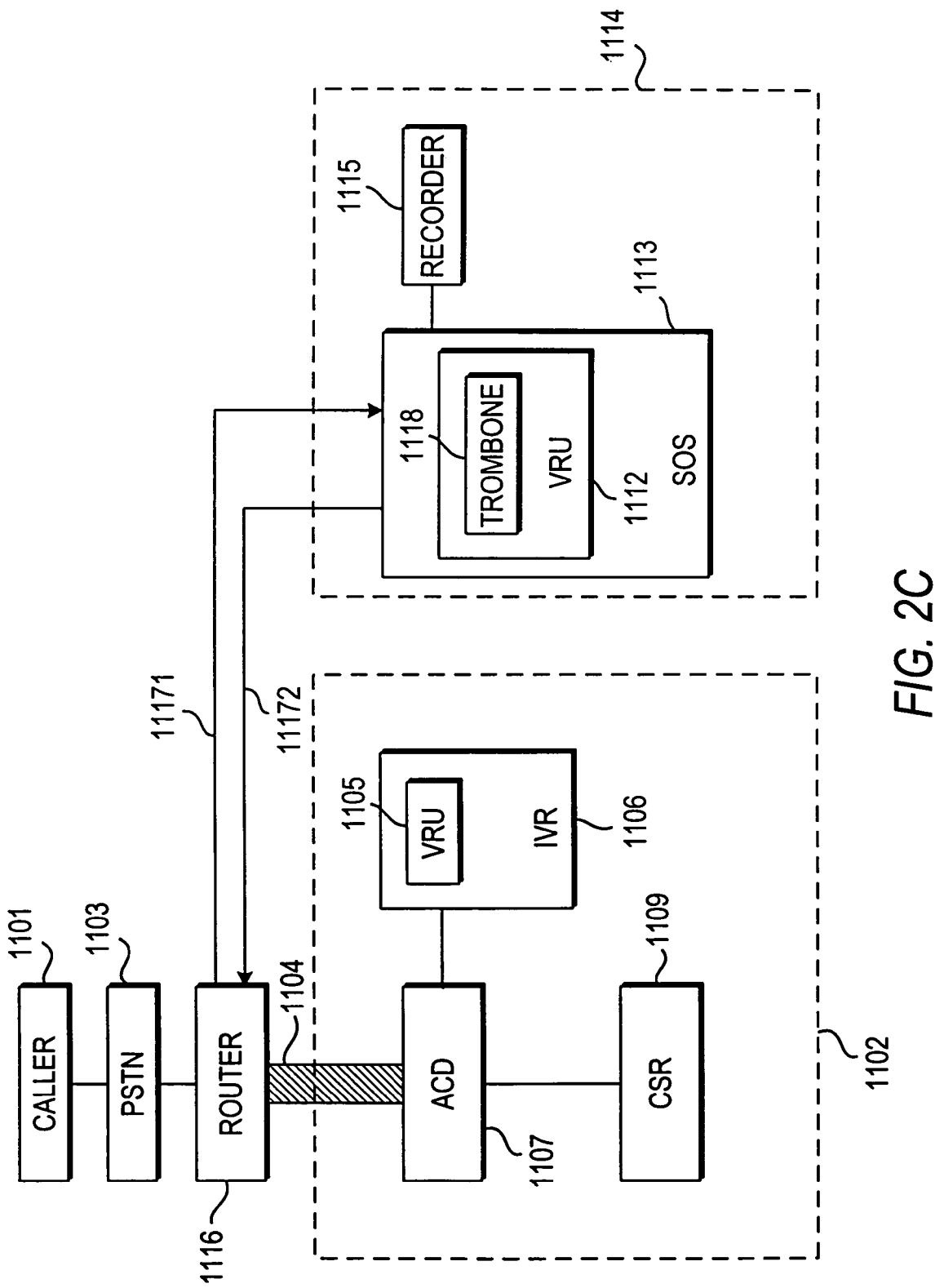

FIGS. 2A–2C illustrate three options for recording incoming calls to a call center.

In the first option, shown in FIG. 2A, recording is performed on-site at the call center by placing recording equipment at the call center site or by using a live observer to listen to the calls and manually note the significant events. The recording equipment or the live observer is connected directly to the call center's incoming telephone lines and to a customer service representative's (CSR's) telephone handset.

Usually, the first option is used when a call center has a policy that prohibits the off-site recording of calls or the recording of calls altogether. Therefore, in order to be able to assess the performance of the call center, a live observer is used to listen to (observe) calls to the call center and to manually make a record of events that occur during the observed calls. During the IVR portion of the calls, the observer uses a commercially available DTMF decoding device that indicates which touch-tone buttons were pressed in response to various inquiries made by the IVR system. If a call is transferred to a live agent, the observer takes notes on (annotates) that portion of the call to manually create a record of the questions, answers, and/or comments exchanged between the caller and the agent.

In practice, a recording operation according to the first option proceeds as follows. A caller 1101 places a call to a call center 1102 via a public switched telephone network (PSTN) 1103, a trunking system 1104, and an automatic call director (ACD) system 1107. The ACD system 1107 handles the queuing and switching of calls to the call center 1102.

If the call is to be recorded or observed in real time, a voice response unit (VRU) 1105 of the call center's IVR system 1106 notifies the caller 1101 that the call may be monitored for quality assurance or other purposes. Then, an electronic recorder or a live observer 1108 makes a record of the DTMF signals from the caller's touch-tone responses to inquiries or prompts from the IVR system 1106. If the caller 1101 opts to speak with a live agent or customer service representative (CSR) 1109, the recorder/live observer 1108 makes record of the caller-agent interactions.

In the first option, recording/observation takes place via lines 1110 between the recorder/live observer 1108, the trunking system 1104, and the CSR 1109, as shown in FIG. 2A.

In the second option, shown in FIG. 2B, recording is performed off-site at a dedicated recording facility or other suitable location. This option requires the call center's ACD system 1107 to have one or more observation ports 1111 that enable external dial-in observation. That is, the call center's ACD system 1107 must have a software "wire-tap" feature that allows calls to be listened to. Some commercially available ACD systems, including ones made by Lucen™ and Aspect™, have such a feature for monitoring call quality.

In practice, an off-site recording operation according to the second option proceeds as follows. A VRU 1112 of a service observation system 1113 running at an off-site recording facility 1114 places a call to the call center's observation port 1111. The VRU 1112 provides the observation port 1111 with a DTMF security passcode, which effectively gives the VRU 1112 access to the call center's incoming calls. The VRU 1112 then specifies an extension to be monitored and/or recorded. It should be understood that if the ACD system 1107 has several observation ports then several extensions may be monitored and/or recorded.

Similar to the first option, when a caller 1101 places a call to a call center 1102, if the call is to be recorded, a VRU 1105 of the call center's IVR system 1106 notifies the caller 1101 that the call may be monitored for quality assurance or other purposes. Then, a recorder 1115 records the entire call, including the DTMF signals from the caller's touch-tone responses to inquiries or prompts from the IVR system 1106, as well as the caller-agent interactions, if any.

In the third option, shown in FIG. 2C, recording is performed off-site by using a router 1116 to route incoming calls to a VRU 1112 of an off-site service observation system 1113. The calls are then redirected or "tromboned" back to the router 1116 by a trombone unit of the VRU 1112. Thus, calls are diverted by the router 1116 to the VRU 1112 of the service observation system 1113, where some or all of the calls may be recorded. Optionally, the router 1116 may be programmed to decide which calls to divert to the service observation system 1113.

In practice, a recording operation according to the third option proceeds as follows. A caller 1101 places a call to a call center 1102 via a PSTN 1103. The call is then routed by a router 1116 to a service observation system 1113 of an off-site recording facility 1114 via a redirection line 11171. The VRU 1112 of the service observation system 1113 notifies the caller 1101 that the call may be monitored for quality assurance or other purposes. The call is recorded by a recorder 1115 connected to the service observation system 1113. A trombone unit 1118 of the service observation system 1113 initiates a call back to the router 1116 via a redirection line 11172, and the router 1116 then routes the call to the call center 1102 from which the call was diverted.

Then, similar to the first option, the call passes a trunking system 1104 to the ACD system 1107, where it is sent to the IVR system 1106. The recorder 1115 records the entire call via the redirection lines 11171, 11172, including the DTMF signals from the caller's touch-tone responses to inquiries or prompts from the IVR system 1106, as well as the caller-agent interactions, if any.

FIGS. 2B and 2C show the recorder 1115 as a separate unit from the service observation system 1113. It should be understood, however, that the recorder 1115 need not be a discrete unit but instead can be physically incorporated into the service observation system 1113.

For the options described above, it should be understood that all of the incoming calls need not be recorded and, instead, a selected percentage of all calls, a selected number of calls, or only calls occurring during specified times of the day may be recorded, for example.

Also, the options described above have various advantages and disadvantages, and an option that may be ideal for one type of situation may be totally unsuitable for another type of situation.

For example, the first option is the least flexible, because it requires the installation and maintenance of recording equipment at the call center or the use of a live observer set up at the call center to listen to calls. Also, recordings must be transferred to another location for analysis, unless analysis equipment (e.g., computers configured to run analysis programs) is installed at the call center and trained personnel is available to run the programs at the call center. Further, if a live observer is used, he or she must be trained as to the call flow of the call center's IVR system. That is, the observer must know the options available to the caller as the caller interacts with the IVR system. Also, the data collected by the observer must be put into a form that can be analyzed by a computer.

Despite the disadvantages of the first option, if a call center does not allow recording of calls or only allows recording to take place on its premises, it may be the only way to obtain data necessary to make an assessment of the call center's performance, using the assessment techniques described infra.

The second option is the most flexible, because it allows calls to be recorded and analyzed at a facility dedicated to assessing call-center performance. It also enables selective analysis of specific aspects of an IVR system. For example, a call center's IVR system may initially request a caller to indicate whether the call is related to a billing inquiry, an order inquiry, a product information inquiry, or other inquiries. The second option enables the selective recording of, for example, only those calls designated by the callers to be billing inquiries. This allows the call center to target one aspect of its IVR system at a time for assessment, by monitoring only particular extensions associated with that aspect, and prevents the unnecessary recording of calls related to aspects not being assessed.

The second option may be implemented as an automated process by setting up the service observation system to automatically place a call to the service observation port of the ACD system at a designated time and provide the ACD system with the appropriate access number. Recordings can then be made for calls to the call center at selected hours of the day, at selected days of the week, for a selected number of calls, for example. Because the recordings are made off site, that is, external to the call center, there is minimal intrusion in the call center's operations. Also, if the service observation system fails for whatever reason, this option will not affect incoming calls to the call center.

Optionally, a call center that handles a large number of calls may use multiple lines or a high bandwidth line, such as a T1 line, to handle multiple calls simultaneously.

Of course, the second option is not available if the call center's ACD system does not accommodate external dial-in observation. In such cases, the third option allows for calls to be recorded by redirecting (tromboning) them through a service observation system. An advantage of tromboning is that it allows for a random sampling of calls from geographically distributed call centers to be recorded in a central location. Tromboning may also be used to enable live observers to listen to calls at a central location, if recording of calls is not feasible.

A disadvantage of tromboning is it precludes the use of features such as caller-ID to identify telephone numbers of callers, because the identified number will always be the telephone number corresponding to the location of the service observation system, i.e., where the calls are being redirected. Another disadvantage of tromboning is that, should there be a break in any of the legs of a tromboned call, e.g., a break between the caller and the VRU of the service observation system or a break between the VRU of the service observation system and the call center's ACD system, the caller will be disconnected from the call center.

For the above options, calls can be recorded using, for example, a standard NT workstation (not shown). According to a preferred embodiment, the calls are recorded onto the workstation's hard disk, and the recorded data is later transferred to a central server, which is connected to a network, so that the recorded data may be accessed by various programs of the service observation system for analysis. Transfer of the recorded data frees the hard disk to record additional calls.

Typically, 1 minute of recording utilizes 1 M of hard disk space. Therefore, a workstation with 8 G of hard disk space can record 8000 minutes of calls. Of course, the more calls that are recorded and analyzed, the more accurate the assessment of the call center will be, based on statistics theory.

IVR Logging 3

When a caller interacts with a call center's IVR system, the IVR system automatically keeps a record of, or logs, all the significant events that occur during the call. IVR logging is different from the end-to-end recording of calls discussed earlier. IVR logging 3 is an automated process performed by the IVR system itself to sequentially itemize the path traversed by each call to the call center.

FIGS. 3A–3F

Figure 3A:
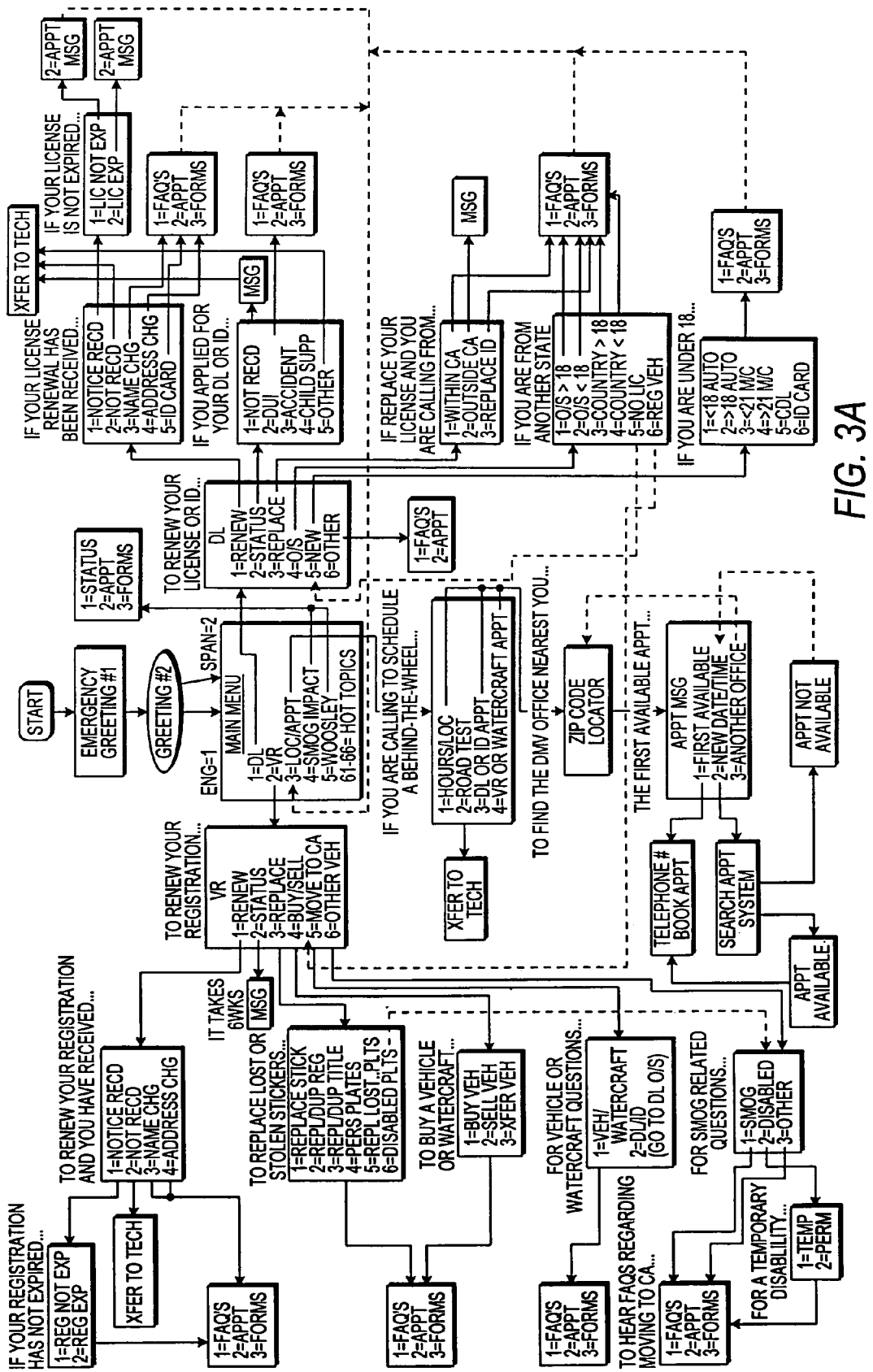
FIG. 3A is an exemplary IVR flow chart that maps out possible paths a caller can take while interacting with an IVR system.
Figures 1, 3C:
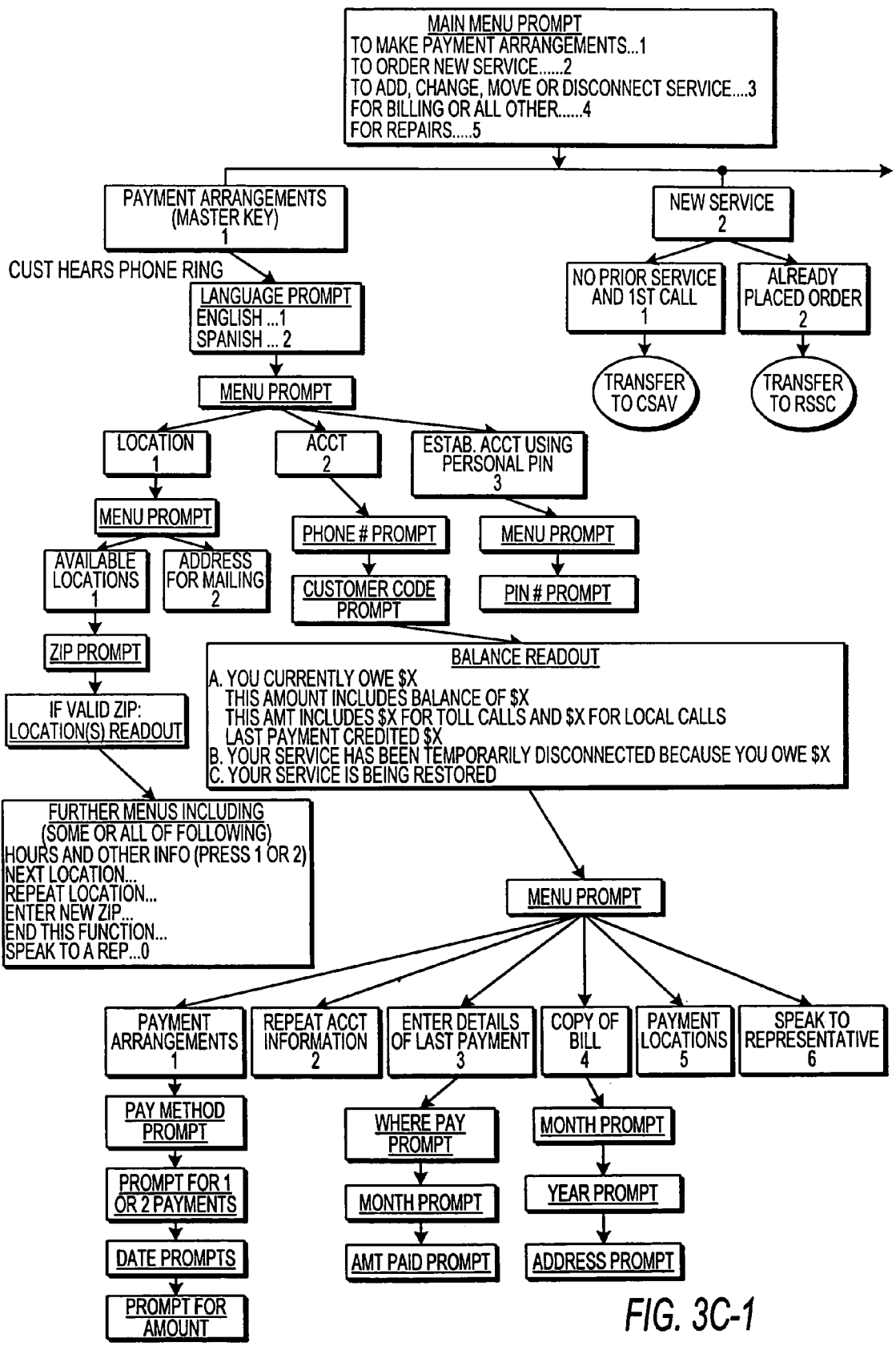
Figures 2, 3C:
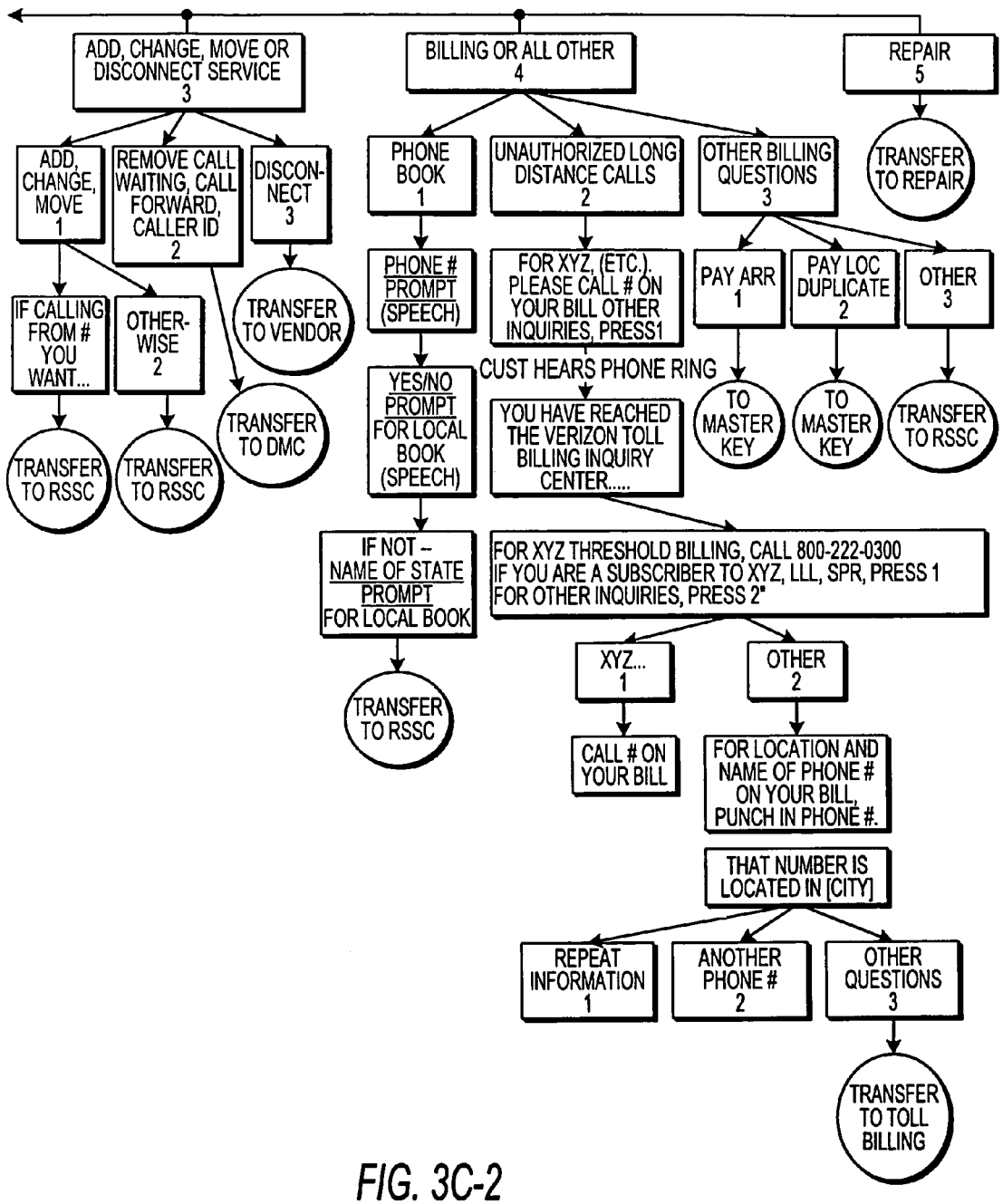
FIG. 3B, which is a composite of FIGS. 3C-1 and 3C-2, shows a more detailed flow chart for an IVR system.
FIG. 3D is a schematic diagram of an IVR system.
FIG. 3E is a chart showing typical data collected for a call.
FIG. 3F shows an IVR log that includes an area for identifying the caller.

Essential to IVR logging 3 is a detailed flow chart for the call center's IVR system. An IVR flow chart maps out all the possible paths a caller can take while interacting with the IVR system. An example of an IVR flow chart is shown in FIG. 3A, which details all the options available when a call is made to a town's motor-vehicle department (DMV) call center. Another example of an IVR flow chart is shown in FIG. 3B, which is a combination of FIGS. 3C-1 and 3C-2. FIG. 3B details all the options available when a call is made to a telephone company's call center. As shown in each of the IVR flow charts, all the inquiries or prompts given by the IVR system are itemized, as well as all the possible touch-tone responses a caller can make to each prompt.

The flow of a call through the IVR system consists of a series of "states" connected by "transitions." A state corresponds to a transaction between the IVR system and another entity, such as the caller, a database, or the ACD system, for example. The outcome of a transaction usually is a transition, which is a progression from one state to another state. Of course, if the caller requests the IVR system to repeat a list of choices, the transaction goes back to the preceding state without a transition occurring.

Figure 3D:
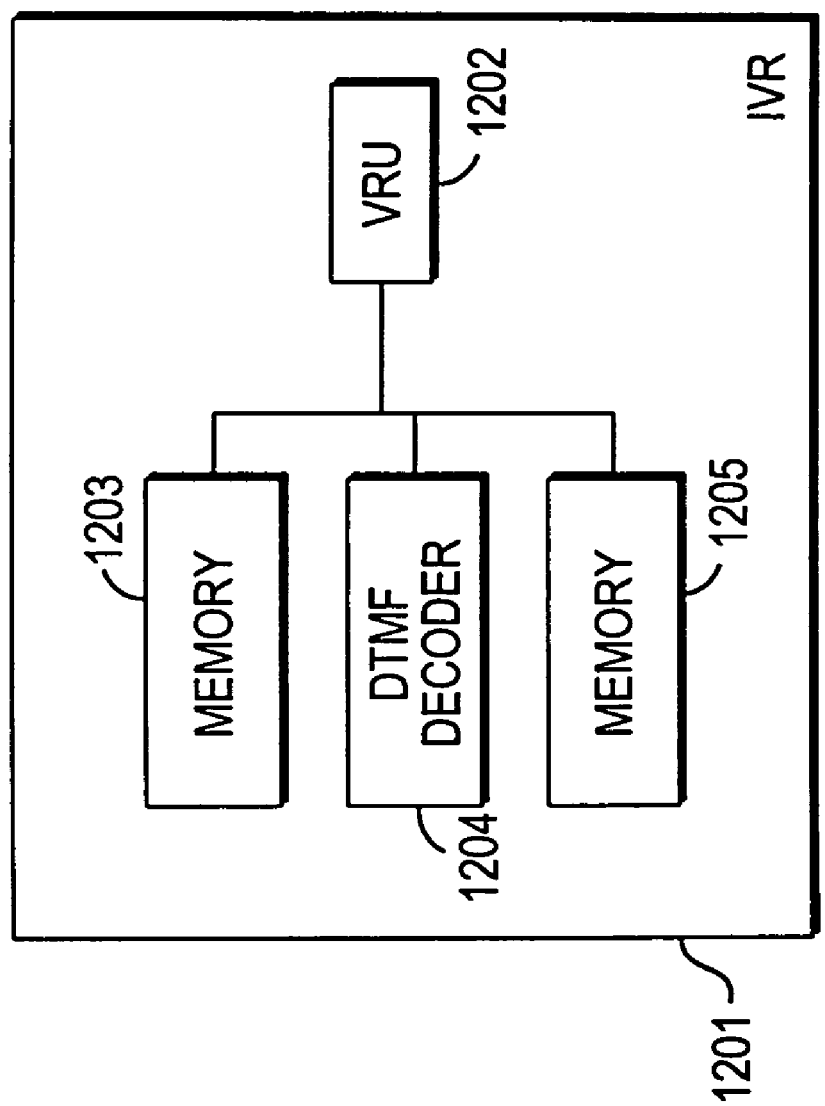

An IVR system 1201 is schematically shown in FIG. 3D. A VRU 1202 of the IVR system 1201 is a computer that performs the functions of a customer service representative according to a program stored in a memory 1203 of the IVR system 1201. That is, the VRU 1202 serves as an interface between the caller and the IVR system 1201. The program implements the call center's IVR call flow and runs interactively in response to touch-tone buttons pressed by the caller.

The IVR system 1201 also includes a DTMF decoder 1204, which translates touch-tone sounds into their corresponding numbers. A memory 1205 of the IVR system 1201 sequentially stores in a file, for each call, an event log of the inquiries and prompts given to the caller, as well as the caller's touch-tone responses. Each file contains the complete event sequence for the IVR portion of the call, and may be stored as part of an event-sequence database of the memory 1205. The memory 1205 also stores data indicating at what point in the call flow the caller leaves the IVR system 1201, and whether the caller terminated the call (hung up) or was transferred to a live agent.

Optionally, a speech recognition system (not shown) may be included in the IVR system 1201 to enable the program to run interactively in response to the caller's spoken words.

To prepare an IVR log of calls made to the call center, the data stored in the memory 1205 is downloaded to another computer, where it is analyzed to determine the caller's responses to inquiries or prompts from the VRU 1202. That is, the other computer translates the recorded data for each call into information about the path through the IVR call flow traversed by the call, and translates the DTMF responses made by the caller at each state of the call.

Optionally, instead of downloading the data stored in the memory 1205 to another computer for analysis, the analysis can be performed by a processor (not shown) internal to the IVR system 1201.

In addition to determining the states and caller responses for each call, the analysis also determines the time of day of the call and how long it takes for the caller to respond to an inquiry or prompt, that is, how long it takes for the caller to make the transition from one state of the IVR call flow to another. Thus, IVR log entries for a call enable the call to be reconstructed in sequence, including the time of the call and the timing of transitions from state to state.

FIG. 3E shows a chart of typical data collected for a call. For each state traversed by the call, the outcome is listed. Also, the time of entry to each state is listed, which can be used to determine how long it takes the caller to make the transition to each state.

FIG. 3F shows an IVR log that includes an area for identifying the caller. This enables more than one call to be represented in a single IVR log, without causing confusion as to which call a particular entry corresponds to.

The IVR logs shown in FIGS. 3E and 3F keep track of what information, if any, is delivered to each caller. Therefore, if a caller repeatedly requests a menu to be re-played because the options are too numerous and confusing, and then eventually hangs up before any information is delivered, then the IVR log entries for that call will indicate how many times the caller needed the menu to be repeated before hanging up. The entries will also show that the caller did not receive useful information. If the IVR log has many such entries, then re-engineering to improve the call flow of the IVR system may be justified.

In contrast, conventional IVR logging techniques that merely tally the number of times a state is traversed in an IVR system provide no insight as to why a particular state is traversed more than another state. Such conventional systems would not reveal, for example, that the reason a menu state was traversed a disproportionately large number of times was because callers needed to listen to that menu more than once before understanding the options. Therefore, a detailed log of the states and transitions of the IVR portion of calls enables a more accurate recreation of what occurred during calls to a call center, thus enabling a more accurate assessment of the call center's IVR system by facilitating the identification of weak aspects of the IVR system. As discussed in more detail below, an improved IVR system, in which callers obtain the information they are seeking in the least amount of time and without the use of a live agent, reduces the costs involved in running the call center.

IVR logs may be summarized to produce a transition report, which gives statistical details on, for example, the number of calls that made the transition from one particular state to another particular state; the number of calls that were abandoned at a particular state; the number of requests for a live agent at a particular state; and the number of times no transitions were made from a particular state because callers requested a repeat of the menu options. As will be discussed below, the statistics provided by a transition report can be used to produce a user-path diagram, which reveals the percentage of callers making the various transitions in a call center's IVR call flow.

If a caller requests to speak with a live agent, the log file for that call will include data indicating the transfer time and destination, so that the log file can be matched with a recording of the caller-agent interaction to enable a complete recreation of the entire call. The recorded caller-agent interaction contains the "ground truth" of the call, and provides information on whether the caller's question could have been answered during the IVR portion of the call if the IVR call flow was re-engineered.

IVR logs also may be used to generate an error report, summarizing errors made by callers, including errors in entering account numbers and time-out errors, which occur when a call is assumed to be abandoned because no response was entered within a pre-set time period. An error report is used to determine trouble areas in a call center's IVR call flow, so that those areas may be re-engineered to improve the call center's effectiveness.

Further, IVR logs may be used to summarize timing statistics of events, which are useful in understanding whether to develop a shorter route to certain commonly requested information than what a current IVR call flow allows.

IVR System Analysis 6

IVR system analysis 6, introduced in FIG. 1, is a computer-based method for determining the complete sequence of events in an IVR system-caller dialog, based on a recording of at least the IVR section of a call. Recordings of calls can be collected in a completely unobtrusive fashion, and IVR system analysis determines the complete IVR event sequence independently of data from IVR logs.

IVR system analysis determines the complete IVR event sequence in two steps: event detection and prompt inference. The event detection step identifies user input, which may be touch-tone or speech input, and selected system prompts. The prompt inference step requires: 1) complete knowledge of the user input; 2) partial knowledge of system prompts; and 3) knowledge of the call-flow logic of the IVR system. Using this information, the prompt inference technique of the present invention infers the complete IVR event sequence.

Complete IVR event sequences are necessary for detailed IVR assessments, including the generation of user-path diagrams, automation analyses, and routing analyses techniques, which are discussed in more detail below. IVR system analysis is applicable to touch-tone, speech-enabled, and multimodal IVR systems.

IVR system analysis 6 employs three main tools to capture the event sequence for the IVR portion of a call: a prompt detector, a DTMF detector, and a prompt inference tool. The prompt detector and the DTMF detector are used for event detection. Optionally, if evaluating a speech-enabled IVR system, a speech detector preferably would be employed to identify spoken user input in the recordings. Any known speech detection algorithm may be used for this purpose. A commercially available DTMF detector preferably is used to detect touch tones. A prompt detector, to be described in detail below, preferably is used to identify spoken prompts in the recordings. The prompt detector employs standard pattern recognition techniques, in particular, template matching, and identifies prompts by matching audio samples of prompts with the audio signal of the recordings.

Finally, for all but the simplest IVR systems, a prompt inference tool is used to infer a complete prompt sequence. While it is possible to detect all prompts in a call using a prompt detector, this is impractical for complex IVR systems, because the detector would need samples for each prompt, and complex IVR systems may contain hundreds of different prompts. The prompt inference technique of the present invention determines a complete prompt sequence from the complete sequence of user input and knowledge of the call-flow logic. According to the prompt inference technique of the present invention, it is necessary to detect only a f subset of prompts necessary to disambiguate the complete sequence.

FIG. 4

Figure 4:
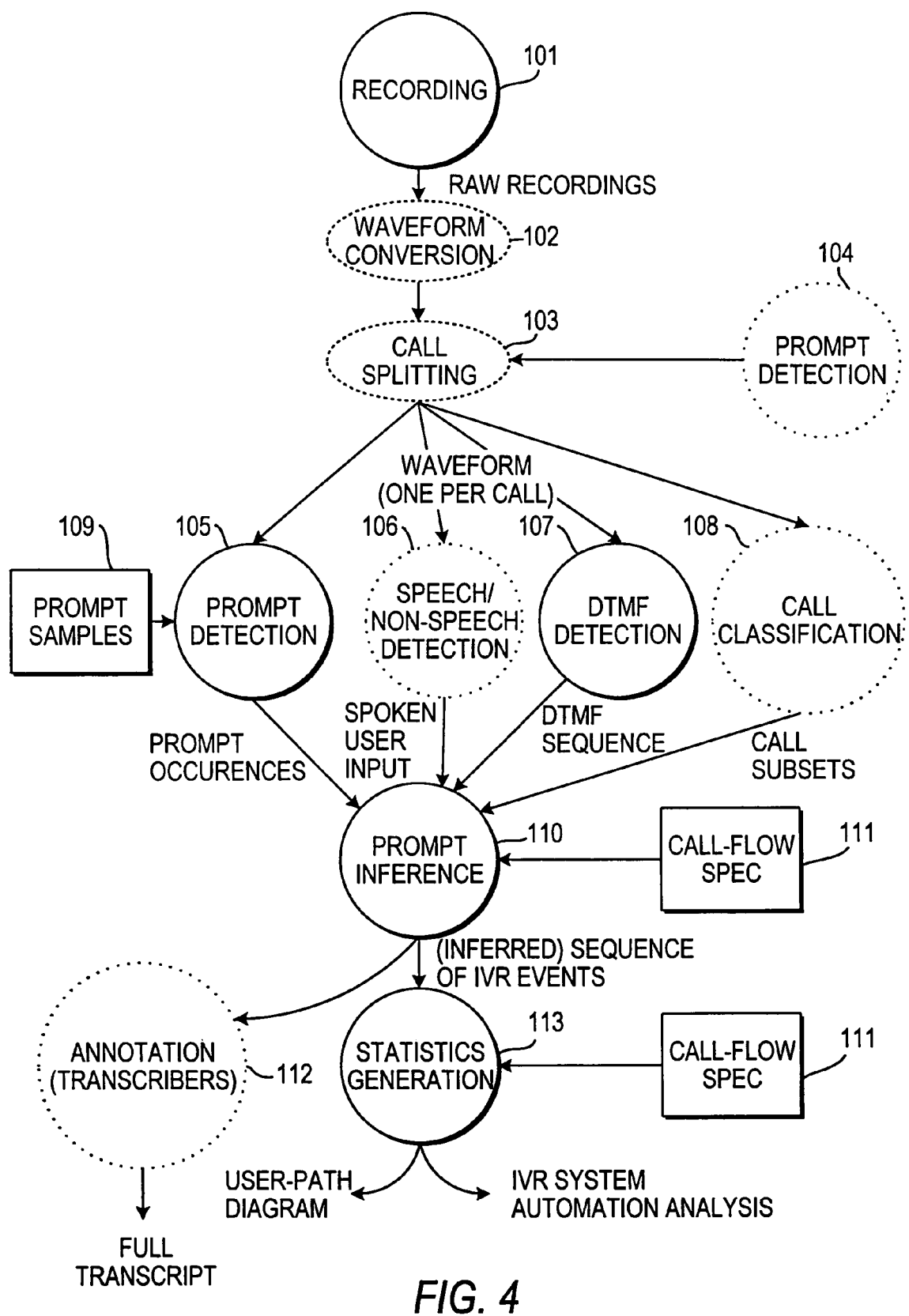
FIG. 4 is a diagram that illustrates a complete process of an IVR system analysis, according to a preferred embodiment of the present invention.

FIG. 4 illustrates a complete IVR system analysis process, which consists of four steps. Optional steps are illustrated with dotted circles. In FIG. 4, first a recording step 101 is performed. Raw audio recordings are subjected to wave form conversion in step 102. The resulting signal, which may contain one or more calls, is split by a call splitter in step 103, such that each call is contained in exactly one audio file. This step is not required if the recording equipment delivers recordings that contain only one call per file. Second, in step 107, a complete sequence of user input is detected using a DTMF detector for touch-tone input. Optionally, in step 106, a speech detector is used to detect spoken input. In addition, selected prompts are detected using a prompt detector in step 105. Prompt samples 109 are used to configure the prompt detector. As an optional third step, a call classifier may be employed to identify specific kinds of calls in step 108. Call classification is necessary if the recording equipment captures calls from multiple sources and only one specific source is of interest. Calls can be classified by detecting prompts that uniquely identify each kind of call that is of interest. For example, the greeting prompt often differs for various kinds of calls.

Prompt inference, step 110, is the final step in IVR system analysis 6. In addition to the complete sequence of touch-tones, prompt (sequence) inference requires complete knowledge of the call-flow logic (or specification) 111 and at least a partial sequence of detected prompts. The prompt inference technique models the call-flow logic as a non-deterministic finite-state automaton; the states correspond to prompts, and state transitions are triggered by touch-tone sounds, speech, or the absence of user input. Each transition represents a specific user response, for example, pressing 1 may lead a caller to one prompt while pressing 2 or providing no input would lead the caller to a different menu. Prompt inference determines a complete IVR event sequence by determining which state sequence(s) are consistent with the detected user input and the call-flow logic 111. Algorithms that determine a state sequence in a finite-state automaton for a specific sequence of input are in the public domain.

While standard algorithms can determine a complete event sequence in theory, ambiguity in interpreting a sequence of user input may arise for several reasons:

(1) Because callers frequently type ahead, i.e., press a touch-tone before hearing the corresponding prompt, there is ambiguity in tokenizing a complete sequence of DTMF tones into discrete responses to specific touch-tone prompts.

(2) Event detection is not completely accurate. Therefore, there may be errors in the detected touch-tones and prompts.

(3) The call flow sometimes depends on internal processing, which cannot be inferred from the recording. For example, callers with an overdue account may be handled differently from other callers.

(4) Exactly how the caller left the IVR portion of the call, the so-called IVR exit condition, tends to be another source of ambiguity.

Prompt inference resolves the ambiguity in three steps. First, a set of prompts is determined that allows all ambiguities to be resolved, and these prompts are detected in step 105. All prompts that immediately follow any ambiguous transition in the call flow must be detected. Ambiguous transitions occur whenever the next state depends on internal processing, such as accessing a database, and whenever a timeout (i.e., no user input) leads to a specific new path. Second, the algorithm mentioned above infers all state sequences (i.e., interpretations) of the detected user input that are consistent with the call-flow logic. Third, an interpretation is selected that is most consistent with the detected prompt sequence.

Inferring exactly how the caller left the IVR portion (the exit condition) requires special treatment. The exit condition indicates whether the call ended in the IVR portion with a hangup or whether it was transferred to an agent. Because all IVR systems announce transfers to agents to the caller, for example with the prompt "Please wait for the next customer service representative," whether a call was transferred to an agent can be determined by detecting a transfer prompt. If the prompt detector detects a transfer prompt, it is inferred that the call was transferred to an agent; otherwise, it is assumed that the caller hung up. This method of inferring the IVR exit condition fails when the caller hangs up during the hold time, before reaching an agent. However, for the purposes of IVR system analysis, this distinction is not made, and has not been found to be necessary. Rather, it is simply indicated whether or not a call was transferred to an agent. If necessary, annotation analysis 7, described below, can determine whether a call that was transferred to an agent actually reached the agent.

The event sequence in speech-enabled IVRs can be captured in a similar way, with the following modification to the process. Unlike in touch-tone IVR systems, where user input is limited to touch tones, which can be reliably recognized, recognition of user speech input is error-prone. Therefore, a state transition after speech input cannot be reliably inferred, unless the state transition only depends on whether the user spoke at all. The simple presence of spoken input can be detected reliably by a speech detector, shown as optional step 106 in FIG. 4. However, in all other cases, all prompts following spoken user input must be detected to disambiguate the complete event sequence.

That is, for a speech-enabled IVR system, the analysis must rely on prompt detection to disambiguate an event after any speech input from a caller. And, to evaluate speech recognition performance, all segments of recording that contain user speech must be identified, and the true sequence of words on those spoken segments must be annotated manually, using human transcribers.

The inferred sequence of IVR events that is produced by the prompt inference technique may be utilized by the assessment methodology of the present invention, for example, to assist the annotation efforts of transcribers, in step 112, in generating a full transcript of a call. The sequence also is used for statistics generation in step 113, which uses it, along with the call-flow specification (logic) 111, to generate a user-path diagram 9 and as input for automation analysis 8, to be described in more detail below.

Transcription analysis captures the sequence of significant events for anything that follows the IVR portion of a call, i.e., waiting on hold and agent-caller dialogs. Significant events include: start of an agent-caller dialog, exchange of information between caller and agent (such as account numbers, amounts, dates), and reason for calling. In addition, transcription analysis may characterize a call as a whole according to certain attributes, such as the level of call resolution (was the call resolved or not?) and agent courtesy. The present invention, in accordance with a preferred embodiment, employs human transcribers to perform transcription analysis.

Annotation 7

The annotation techniques of the present invention provide a system to, in one embodiment, automatically index customer (caller) contacts to store them in a semantically annotated database, which may be queried. Customer contacts in this context include, but are not limited to, calls placed into a call center. They may instead be email received or Web pages accessed. The techniques also may be performed manually.

Annotation of customer contacts may include characteristics of a contact's content and quality. Characteristics of a contact may include length of significant sections of the contact (e.g., in a call, time spent in the IVR and on hold and talking to a live agent) and mode of termination of the contact (e.g., in a call, whether the caller hung up in the IVR portion, while on hold, or after talking to a live agent). Content refers to the reason(s) for the contact, the topics/issues "discussed" in the dialog(s), the information exchanged, the transactions performed, and entities mentioned (e.g., companies). Quality refers to the success of the contact, customer satisfaction, the quality of the communication with the customer/caller.

Certain kinds of annotations are required input for several analysis techniques in an IVR system assessment. For example, in the routing analysis 1 and IVR performance monitoring 3 techniques, each to be described in detail below, the true call type, i.e., the "ground truth" or reason for a call, must be annotated; automation analysis 8 requires annotations of automatable transactions or, at the very least, the call type distribution; a life-of-call diagram 10 requires annotation of the lengths of various sections of a call.

Once indexed as a content database of customer contacts, standard information retrieval methods can be applied to mine this database of customer contacts. An application for such a retrieval system includes, but is not limited to, customer relationship management (CRM).

A database of customer contacts, e.g., calls, can be annotated either manually or automatically. Computer-based annotation methods will be described in detail next. Manual annotation techniques analogous to the computer-based methods can easily be inferred based on the following description.

FIG. 5

Figure 5:
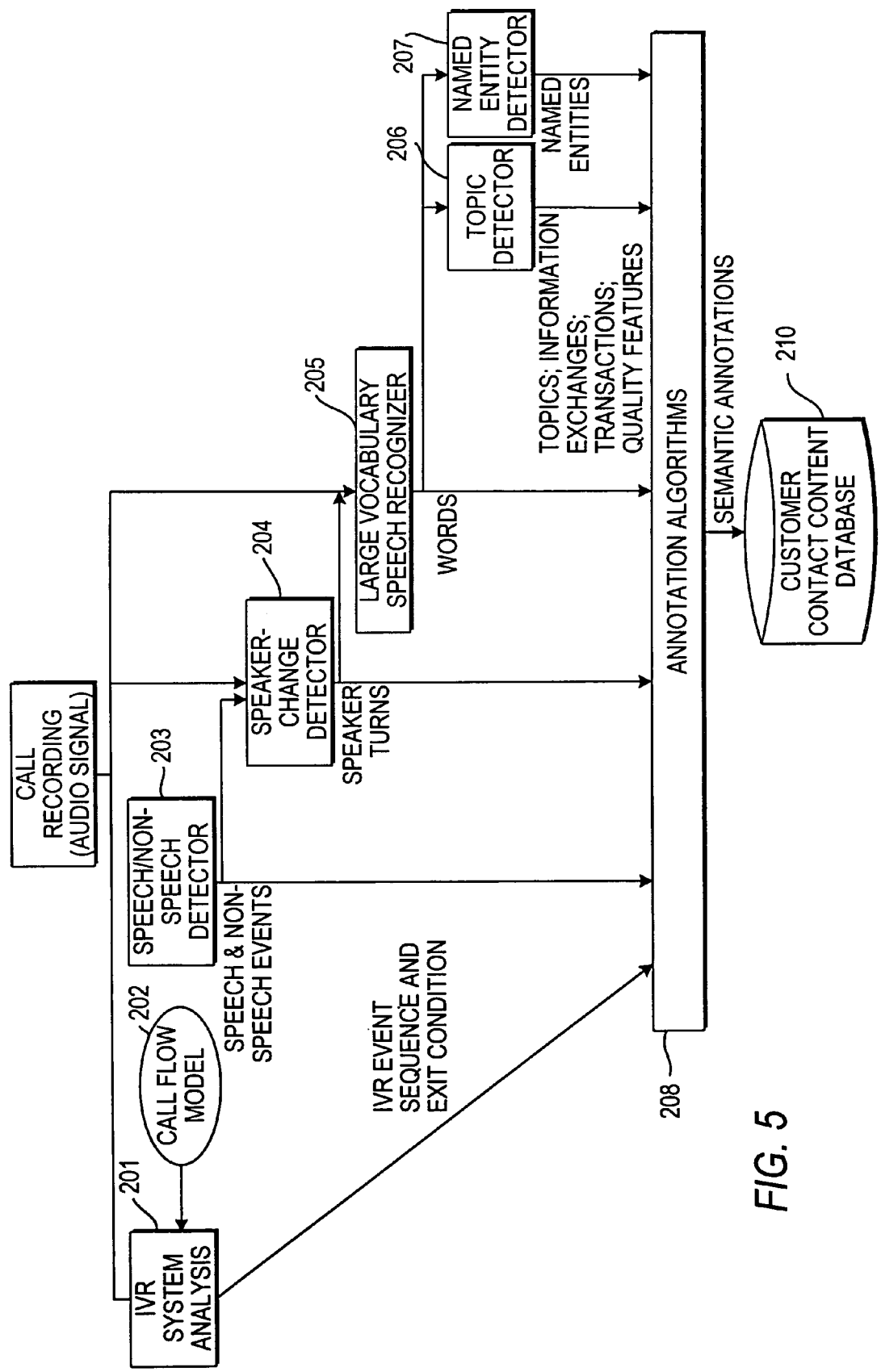
FIG. 5 is a diagram illustrating an exemplary architecture for a computer-based indexing system.

An architecture for a computer-based indexing system is illustrated in FIG. 5. IVR system analysis and prompt inference techniques 201, described above, are used to determine a complete event sequence for the IVR portion of a call. In a manually effected embodiment, a human transcriber listens to recorded calls to distinguish various features to be extracted from the caller-agent dialog portion of a call. In an automated embodiment of annotation 7, in accordance with the present invention, standard audio mining methods are configured to extract various features from the caller-agent dialog portion of a call as follows.

Audio mining techniques using, for example, a speech/non-speech detector 203, a speaker change detector 204, a large-vocabulary conversational-speech recognizer 205, a topic detector 206, and a named-entity detector 207 are known. The speech/non-speech detector 203 identifies speech and certain non-speech events, e.g., silence, muzak, hangup noise, in the audio signal. The speaker change detector 204 marks speaker turns; the speech recognizer 205 outputs sequences of words for every speaker turn; the topic detector 206 determines a topic (or other content characteristics) at various levels, and the named-entity detector 207 identifies named entities, e.g., companies, people, locations, dollar amounts, dates. Data generated by these units serve as input to an annotation algorithms unit 208, which annotates calls. Specific annotation algorithms for call characteristics, content, and quality are described in the following section. Semantic annotations that are generated by the annotation algorithms unit 208 are input to a customer contact content database 210.

Call characteristics, such as length and termination mode, can be determined as follows. The IVR portion of a call, including a complete sequence of IVR events, such as prompts and user responses, is annotated based on output from the IVR system analysis unit 201. The IVR system analysis unit 201 takes into account the call flow model 202 for the call (contact) center being investigated when analyzing an audio signal. The output also includes the IVR exit condition, i.e., whether the caller hung up in the IVR portion or whether the caller was transferred to a live agent. If the caller hung up, the exact time of the hangup is inferred from output from the speech/non-speech detector 203, either by detecting hangup noise directly, or by inferring it from the presence of a long silence at the end of the recording of the call. If the caller was transferred to a live agent, a hold section is determined as the section between a transfer prompt, the IVR prompt that announces a transfer to an agent, e.g. "Please wait for the next available agent," and the first occurrence of a caller-agent dialog, which can be inferred from output from the speaker-change detector 204.

The agent-caller portion of a call is first annotated with speaker turns, using output from the speaker-change detector 204. Which speaker is the agent versus the caller can be determined using a speaker identifier (not shown). Algorithms for speaker identification are also in the public domain. Additional information, however, is necessary to identify agent versus caller. A database with speaker models from all agents in the call center can be used, or the agent can be inferred as the first speaker after a hold section.

The content of a call is annotated using the topic detector 206 and the named-entity detector 207. The topic detector 206 is trained to annotate various kinds of topics using a set of calls that were manually annotated with topics. Once configured in this way, the topic detector 206 can be used as is.

The whole call is annotated with all topics that were discussed in the course of the agent-caller dialog using the topic detector 206. If only one topic was discussed, this yields immediately the reason for the call (or "call type"). If more than one topic was discussed, the reason for the call is determined to be the first topic or is inferred from the set of discussed topics using predetermined rules. These rules must be determined by an expert in the domain of the call center. Other content, in particular exchanged information and completed transactions, can be annotated using a topic detector configured to detect content other than topics. For example, the topic detector 206 can detect information exchanges and transactions if it is trained on a set of several hundred calls for which all information exchanges and transactions have been manually annotated. In certain cases, output from the named-entity detector 207 can be used as additional input to the topic detector 206. For example, to detect stock transactions, all references to specific kinds of stock can be detected as the name of the respective company in the vicinity of the word "shares."

Automatic annotation of quality aspects can be performed similarly. To this end, specific quality aspects of interest preferably are annotated manually in several hundred calls. For example, sections are marked where an agent interacted with a customer in a polite manner and in a rude manner, and sections are marked where a caller was satisfied and when a caller was frustrated. The same statistical models that are used for topic detection can then be trained to detect specific quality aspects, e.g., sections of a call where the agent was rude or in which the caller was angry.

Mini Assessment 5

The above data collection techniques compile detailed call sequences on the basis of end-to-end recordings of calls. A technique that is referred to as mini assessment is used to create a rough on-line annotation of complete calls using manual monitoring of complete calls, including both the IVR and caller-agent dialog portions of calls.

Mini-assessment is a process for assessing the effectiveness of a call center's IVR system by analyzing the path a caller takes while interacting with the IVR system. The true reason, or "ground truth," of the call, is then determined from a conversation between the caller and a live agent. By comparing an implied reason for the call, based upon the caller's menu selections while interacting with the IVR system, with the ground truth of the call, based upon comments and questions that arise in the caller/agent conversation, the effectiveness of the call center's IVR system is revealed.

For example, if the caller, during the IVR portion of the call, cycles through the same menu repeatedly before requesting to speak with a live agent, then asks the agent for information that is available through the IVR system, there is a clear indication that the menu options are too hard to understand, are too numerous to remember, and/or do not accurately reflect the information available through the IVR system. Thus, by knowing the ground truth of the call, as gleaned from the caller's interaction with the agent, a weakness or inefficiency of the IVR system is identified.

Similarly, if callers, during the IVR portion of calls, repeatedly cycle through a particular menu and then hang up, there is an indication that the menu needs improvement.

Re-engineering to improve the call flow of the IVR system, in order to more efficiently handle calls entirely within the IVR system and to reduce the time spent by agents on calls, results in reducing the costs associated with maintaining the call center, especially if calls can be handled entirely by the IVR system without agent interaction. In order to accurately pinpoint areas requiring re-engineering, a statistically significant number of calls must be analyzed. As is well understood in the field of statistics, the more calls that are analyzed the more accurate the assessment of the call center can be. Also, depending on the complexity of the call center's IVR system, that is, the number of paths a caller may take while interacting with the IVR system, a statistically meaningful number of calls may vary from tens of calls to over a thousand calls.

In the mini-assessment process, an observer or analyst listens to calls to the call center from beginning to end. The analyst may listen to live calls in real time or may listen to end-to-end recordings of calls. The techniques described earlier may be used to observe and/or record the calls.

FIGS. 6A–6C

Figure 6A:
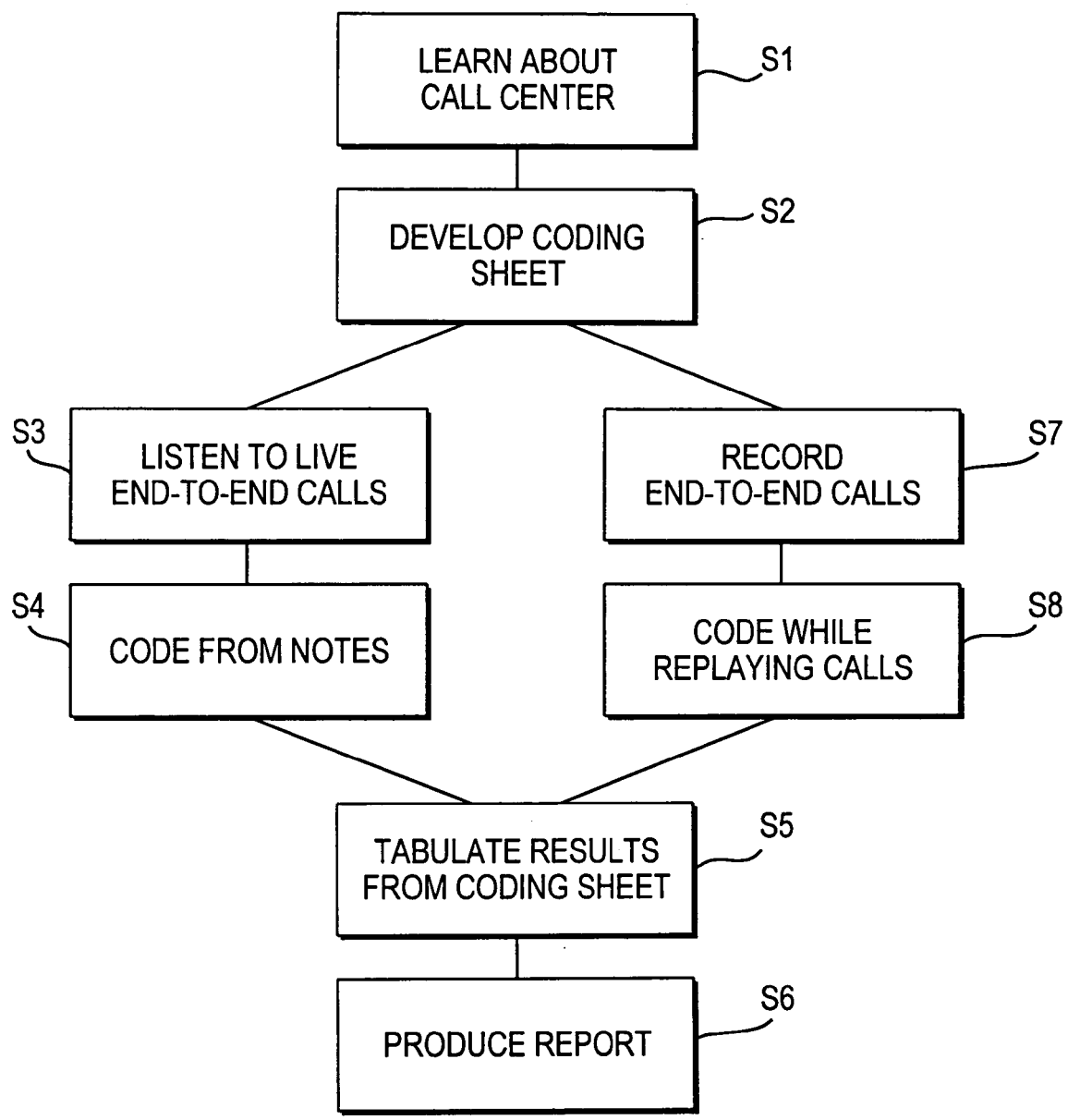
FIG. 6A is a flow chart illustrating a mini assessment process, according to the present invention.

A flow chart summarizing the mini-assessment process is shown in FIG. 6A. In step S1, information is gathered regarding the call center, including the call flow of the call center's IVR system and the different categories of live agents that callers may be transferred to. The information also includes a complete set of destinations that the agents can transfer callers to, as well as rules regarding when such transfers are made. The analyst studies the information to understand the different possible routes callers may take when interacting with the IVR system.

Figures 6B, 6B-1, 6B-2, 6B-3, 6B-4:
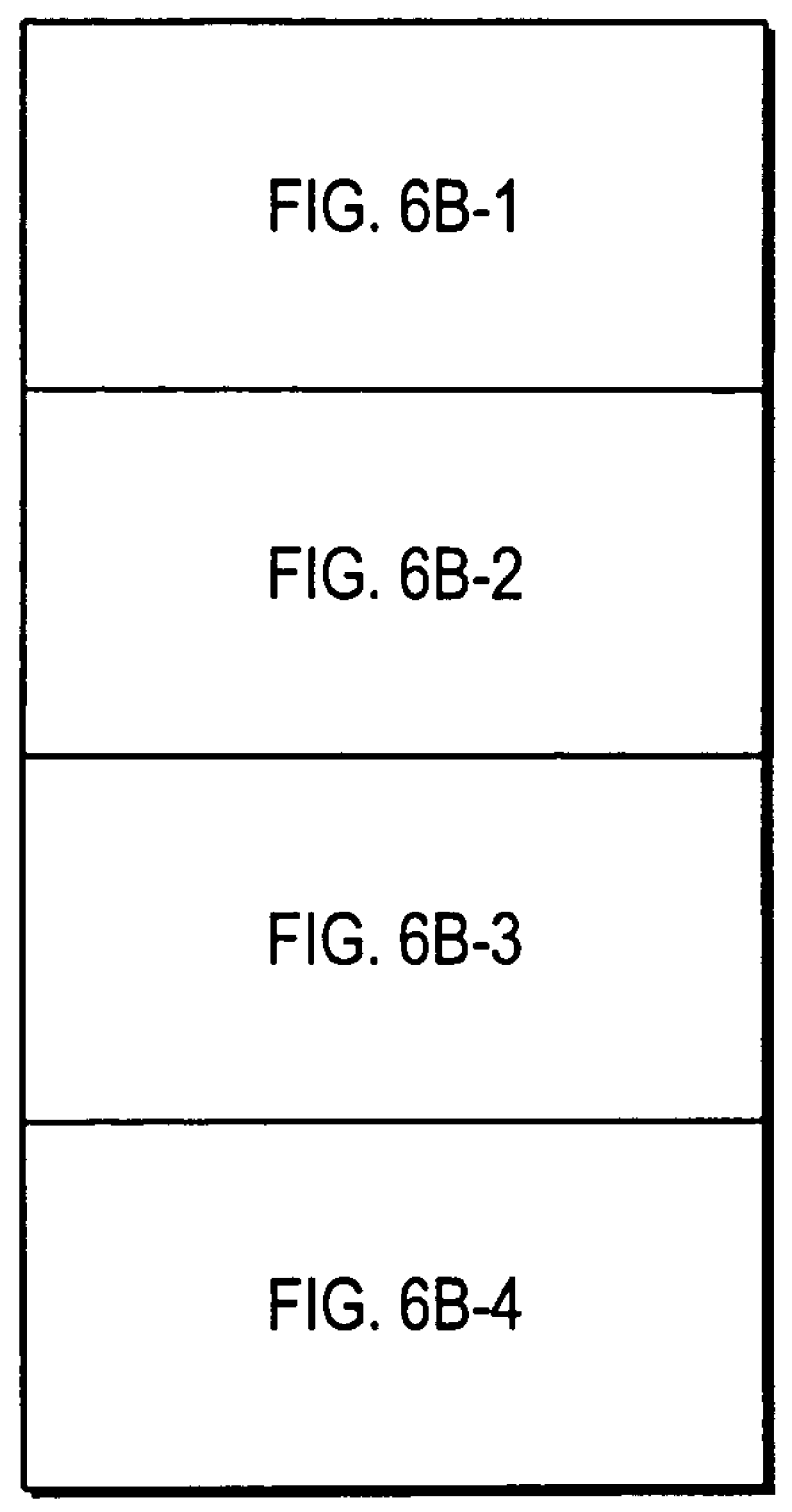

In step S2, a coding sheet is developed for the call center. An example of a coding sheet is shown in FIG. 6B, which is a combination of FIGS. 6B-1 through 6B-4. The coding sheet summarizes the call flow of the call center's IVR system into a list of items that the analyst can quickly check off when analyzing a call, and also summarizes the interaction between the caller and a live agent, if any. Also, because the analyst listens to the call even during the IVR portion, when the caller interacts with the IVR system the analyst can make note of any verbal comments made by the caller that would be helpful to identify the purpose of the call.

The items listed on the coding sheet include menu choices made by the caller when interacting with the IVR system; whether and how the caller was transferred to an agent; functions performed by the agent; whether those functions could have been handled by the IVR system; whether the agent transferred the call to another agent and, if so, the destination of the transfer; whether the first agent stayed on the line during the transfer; whether the call was further transferred to another agent, etc.; and when the caller terminated the call (hangs up).

The coding sheet is also used to note timing information, including time spent interacting with the IVR system; time spent on hold; time spent interacting with the live agent; time spent on transfers; and the total time of the call.

In step S3 of the flow chart of FIG. 6A, the analyst listens to and takes notes on live calls, from the time when the caller initially interacts with the IVR system through the time when the caller hangs up. This is repeated for a desired number of calls. Then, in step S4, the analyst's notes are entered on the coding sheet for the call center. Optionally, if the call center allows recording of calls (step S7), the analyst listens to recorded calls and "codes" (fills out the coding sheet) while replaying the calls (step S8).

As shown in FIG. 6B, the coding sheet is a spreadsheet in which items to be coded are listed and each call is summarized in a column of the spreadsheet. Space is provided for summarizing various aspects of the call. Items marked with "1" indicate that they apply for that call. Items left blank or marked with "0" indicate that they do not apply for that call.

The coding sheet of FIG. 6B includes entries for the date and time of the call, the caller's telephone number and gender, and identification letters for the observer (analyst). The upper portion of the coding sheet also provides information on whether the call was fully automated, whether an agent was involved, and the duration of the call.

In the IVR Summary section of the coding sheet, the observer lists the menu choices made by the caller. The menu choices are determined using a DTMF decoder, which decodes the touch-tone selections made by the caller.

If the call was incomplete, that is, if the caller abandoned the call during the IVR portion without receiving any requested information, the coding sheet notes the point at which the call was abandoned. If the call was transferred to a live agent, the coding sheet notes how the transfer took place. The coding sheet notes the menu choices made in the IVR portion of the call, as well as the functions completed there, if any.

For calls that were transferred to a live agent, space is provided on the coding sheet for the analyst to insert comments on the problem posed by the caller and how it was solved by the agent. The coding sheet also notes whether the agent performed functions that could have been performed by the IVR system, as well as whether the agent performed functions that can potentially be handled by the IVR system, if so re-designed. Functions that cannot be handled by the IVR system are also noted on the coding sheet.

Once the desired number of calls has been coded, the results are tabulated and studied to look for patterns or trends indicating areas in which there is inefficient or unnecessary use of agent time (step S5 of FIG. 6A). That is, if a certain function is currently being performed by an agent, but which could easily be performed by the IVR system, then that function is identified as an area that can be improved. Also, as mentioned earlier, if callers cycle through a particular menu more than once, then that menu is identified as an area that can be improved.

Figures 6C, 6C-1, 6C-2, 6C-3, 6C-4:
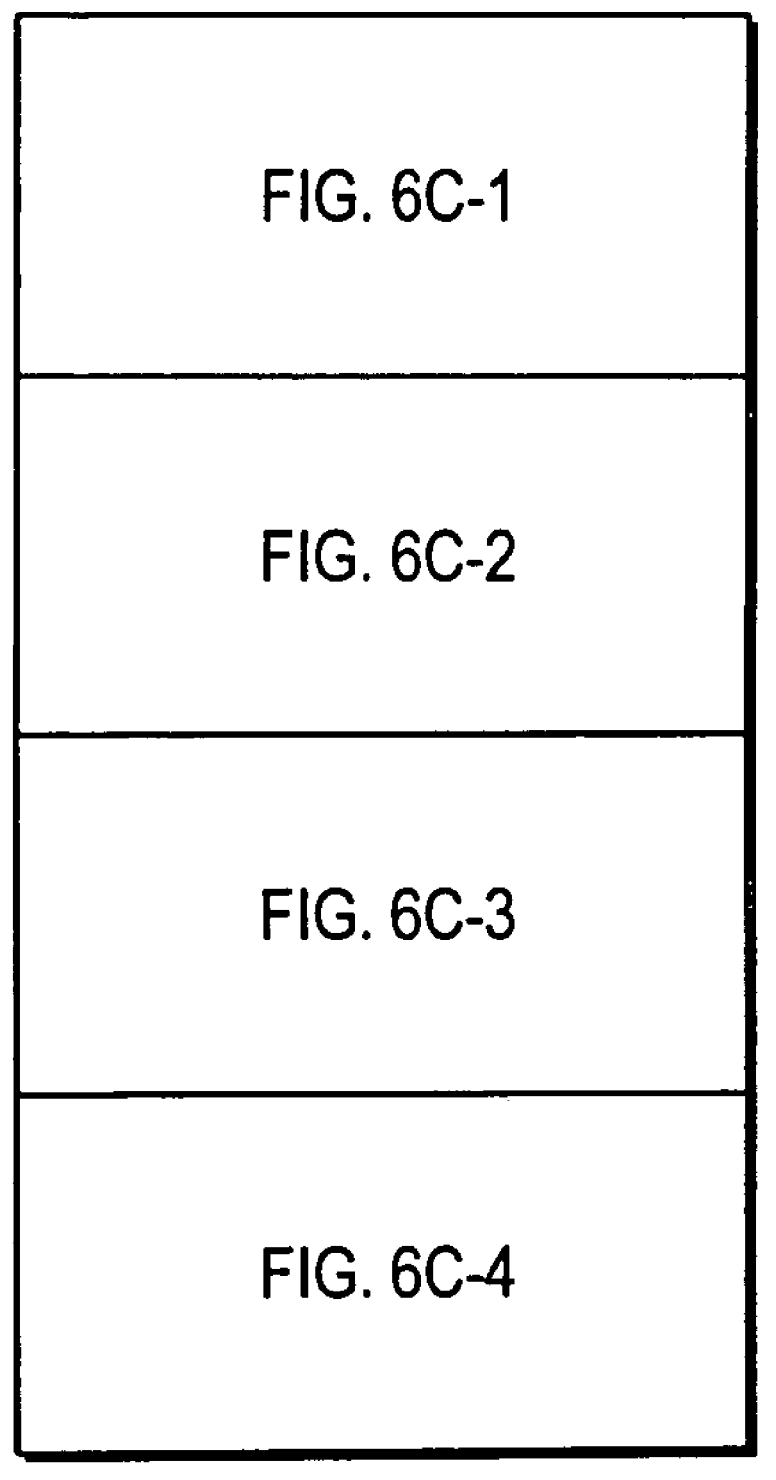

FIG. 6C, which is a combination of FIGS. 6C-1 through 6C-4, shows a summary of tabulated results from an analysis of calls to a call center. Statistics are given for an average duration of IVR portions of calls, an average duration of entire calls, the number and percentage of calls that were fully automated, the number and percentage of calls that involved a live agent, etc. The summary of tabulated results utilizes that same categories as the coding sheet, so that statistics from various aspects of the coding sheet may be easily found.

Finally, in step S6 of the flow chart of FIG. 6A, an analysis report is produced based on the tabulated results from step S5. An example of an analysis report is shown in FIG. 6D. In the "Data" column on the left, problems are listed; in the "Conclusion" column on the right, corresponding diagnoses are listed, as well as suggested improvements.

The report describes three general categories to be improved: Quick Hits; Touch-Tone Re-Engineering; and Speech Engineering. In the Quick Hits category, simple improvements that can be easily implemented without major cost to the call center are suggested. Such simple improvements include re-wording, re-phrasing or re-ordering prompts in the IVR system, menu selections, and other recorded messages that are replayed to callers; adding or removing prompts and menus in the IVR system; and enforcing certain call center policies. For example, agents may be inefficiently staying on the line with callers until transfers are completed ("warm transfer"), even though the policy of the call center is to transfer calls without remaining on the line. Also, agents may not be using special transfer queues while they remain on the line during a transfer, thus further increasing the time spent on calls.

In the Touch-Tone Re-Engineering category, improvements to the call flow of the IVR system are suggested that are more difficult to implement and/or incur major costs. Such improvements include areas that currently are being handled by live agents, but could also be handled by the IVR system if it was re-engineered. For example, the IVR system may be re-engineered to request a caller to enter, via touch-tone keys, a birth date, a portion of a social security number, a car license plate number, etc., which the IVR system uses to verify/locate the caller's records prior to transferring the call to a live agent. This would save time normally spent by the agent to enter the information into a terminal and wait for the caller's records to appear.

Similarly, if it turns out that callers frequently enter wrong account numbers or wrong birth dates, etc., then the IVR system may be re-engineered to request re-entry of a previously entered number, so that a comparison can be made and the caller notified if the entries do not match. Also, the IVR system may be re-engineered to request more than one type of identification information, usually requested by a live agent, so that a cross reference can be made by the IVR system to verify that the caller is authorized to access certain information from the IVR system before transferring the call to an agent.

In the Speech Engineering category, improvements in or implementation of speech recognition technology is suggested for the IVR system. For example, if the call center receives a large percentage of its calls from elderly callers and callers with certain physical handicaps or callers calling from cellular phones, it may be easier for those callers to speak their responses to prompts from the IVR system than to enter their responses via touch-tone keys. Those categories of callers are likely to pretend that the call is from a rotary telephone, to avoid interacting with the IVR system. The call center would reduce agent time by re-designing the IVR system to provide a speech recognition option.

The analysis reports generated in step S6 are then used by the call centers to identify and improve areas of inefficiency in their IVR systems. As discussed infra, significant cost savings can be achieved by reducing the amount of time spent by live agents handling calls. This is done by identifying functions that can be completed through the IVR system and providing menu selections notifying callers of those functions. Agent time can also be reduced by identifying and eliminating areas of caller confusion in the IVR system, which usually result in callers opting out of the IVR system by directly requesting to speak with an agent or by callers pretending to be calling from a rotary telephone.

Automation Analysis 8

The main cost driver in the operation of call centers is the cost of agents. The ratio between cost of agents and all other costs, including telecom time, and IVR system hardware and maintenance, is at least 4:1. Therefore, the assessment methodology of the present invention quantifies the cost effectiveness of an IVR system in terms of agent time.

The total IVR system benefit (cost savings) is defined herein as agent time that is saved by the IVR system, compared to routing all calls directly to an agent. An IVR system "saves" agent time whenever it successfully performs tasks that otherwise would be performed by an agent. Tasks that typically can be performed within an IVR system include identifying the caller, providing information to the caller, performing transactions, and routing the caller to an appropriate agent. In some cases, completing these tasks successfully may resolve the call and the caller hangs up without any assistance from an agent. Such cases of complete call resolution will be referred to as full automation.

In other cases, the reason for the call is not completely resolved by the IVR system, and the caller is transferred to a live agent. Although not fully automated, completing one or more tasks in the IVR system reduces the time that the agent has to spend with the caller. Such cases will be referred to as partial automation of calls. In summary, an IVR system saves agent time by achieving different levels of automation of a call.

In the two subsections that follow, IVR system automation is formalized and a method of quantifying cost effectiveness of an IVR system in a single measure, the total IVR system benefit, as measured in agent seconds, is described. While the emphasis in this context is on cost, it is noted that IVR system automation rates correspond to task completion rates. Hence, IVR system automation is a more differentiated or specific version of this standard usability measure. Thus, total IVR system benefit can be interpreted to quantify both cost benefit and usability of an IVR system.

IVR system automation can be measured based on call state sequence data. This process is referred to as (IVR system) automation analysis. An automation analysis proceeds in the following three steps: defining automation categories, collecting call profile statistics, and calculating automation rates.

In defining automation categories, all tasks that can be completed within an IVR system are classified into a few distinct categories, such as caller identification, information delivery, transaction completion, and routing. The completion of these tasks is typically associated with reaching a certain state in the IVR system. Therefore, a set of completed tasks can be inferred directly from the event sequence data for a call, using a simple lookup table that documents which IVR states indicate the completion of certain tasks.

With such a categorization of tasks that can be completed within an IVR system, different levels of automation correspond to a distinct combination of automation categories, which is referred to as a call profile. Given a set of calls and their event sequence data, automation analysis 8 accumulates counts for each call profile by annotating every call with its set of completed tasks. The call traffic into an IVR system is thus partitioned into a set of call profiles, each representing a distinct level of automation.

Automation rates, finally, are defined as the percentage of automation achieved in each automation category. This percentage can be calculated by adding the percentages of all call profiles that contain a certain automation category. Task completion in an IVR system is thus quantified as automation rates.

As mentioned above, the IVR system automation analysis 8 of the present invention advantageously quantifies the level of automation achieved by an existing IVR system, as well as the potential for improvement. Furthermore, automation analysis 8 quantifies the total (automation) benefit of an IVR system in a single measure, which can easily be translated into cost savings estimates.

Automation is measured by categorizing the manifold transactions that an IVR system may offer into four broad automation categories, annotating IVR event sequences with the level of automation achieved, and annotating all automatable transactions that occur in agent-caller dialogs. Based on such annotations, existing automation rates and upper bounds can be estimated for each automation category, as described above.

In addition, by obtaining reasonable estimates for how much agent time is saved by each automation category, the automation rates can be transformed into a single measure for the total IVR system (automation) benefit in terms of agent seconds saved by the IVR system, simply by multiplying automation rates with the time saved and summing up across automation categories.

IVR system automation analysis 8 includes two parts: first, measuring automation as achieved in an existing IVR system, and second, measuring the potential for increasing automation.

FIG. 7

Figure 7:
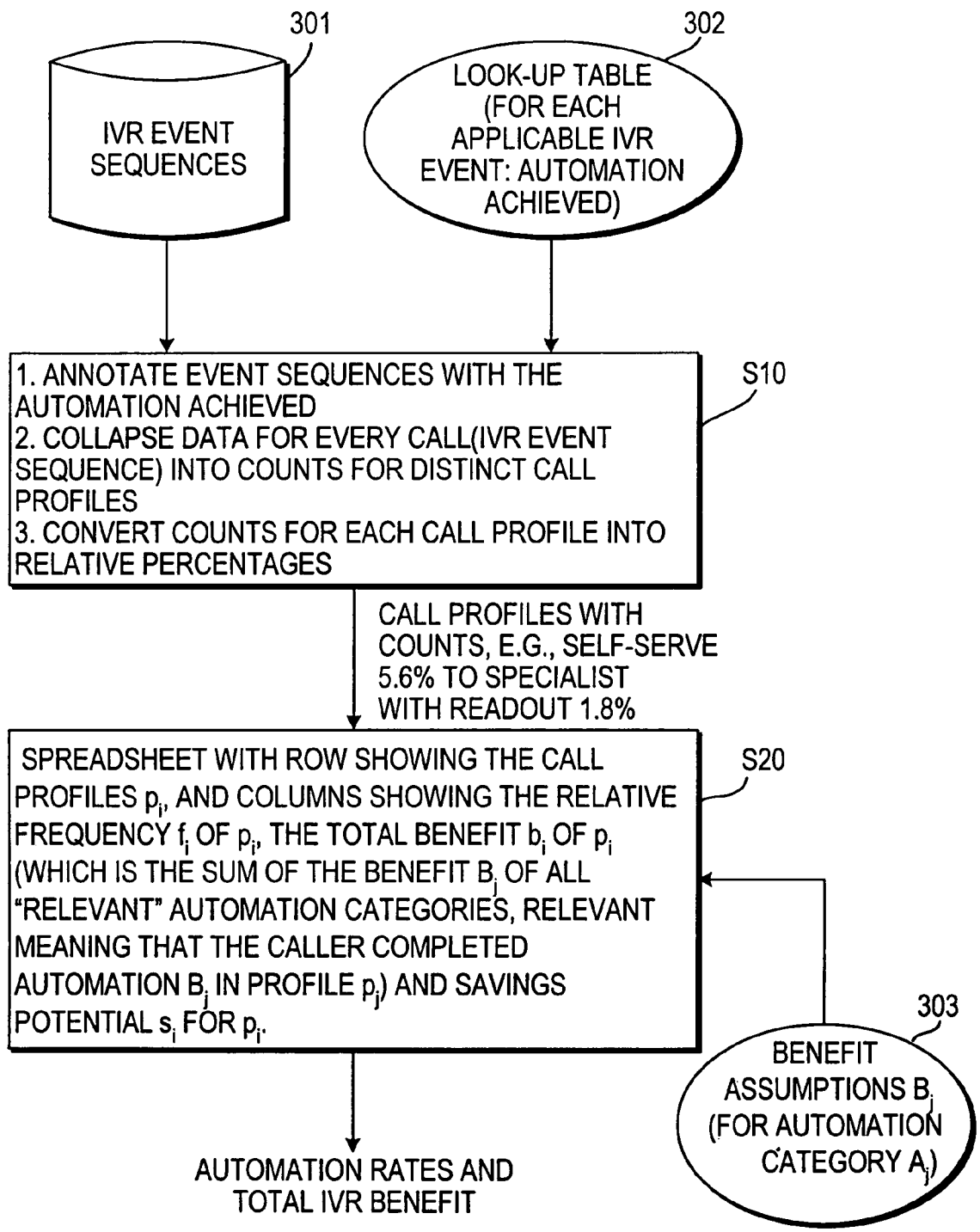
FIG. 7 is a diagram illustrating a process for measuring existing automation levels.

FIG. 7 illustrates the process for measuring existing automation levels of an IVR system. As discussed below, the process illustrated in the figure provides data for a spreadsheet that graphically conveys the automation benefit.

As shown in FIG. 7, step S10 utilizes stored IVR event sequences 301 and a lookup table 302 as input. The lookup table has, for each applicable IVR event, the automation achieved by that event. Step S10 first annotates sequences with the automation achieved, to indicate such automation as capture of a telephone number or readout of information (e.g., a customer's balance). The data for every call, that is, the IVR event sequence, is collapsed into counts for distinct call profiles. Finally, the counts for each call profile are converted into their relative percentages. The output of step S10 consists of call profiles with counts, e.g., self-serve 5.6%, to specialist with readout 1.8%.

At step S20, a spreadsheet is formed with rows showing the call profiles $p_i$, and columns showing the relative frequency $f_i$ of the call profiles $p_i$, the total benefit $b_i$ of the call profiles $p_i$, which is the sum of the benefits of all relevant automation categories, and the savings potential $s_i$ for the call profiles $p_i$. The spreadsheet yields automation rates and the total IVR system benefit.

The following formulas specify the main calculations in the spreadsheet:

1. Benefit for profile $$p_i: b_i = \sum_j A(i,j) B_j,$$

where $A(i,j)=1$ if automation category j is achieved/completed in profile $p_i$ and 0 otherwise, and where $B_j$ is the benefit assumption for automation category j.

2. Total IVR benefit $$B = \sum_i f_i b_i.$$

FIGS. 8 and 9

FIG. 8 shows an example of a spreadsheet generated as described above to assist in IVR system automation analysis

8 in accord. The left column lists the call profiles. This analysis distinguishes two agent types, "specialist" and "floor." The next two columns (labeled "Traffic") show the breakdown of the total data set, which consists of 3636 calls, into various profiles. For example, 2% of the calls were fully automated, and 18.7% abandoned without providing useful information. Then, the three "Automation" columns show the automation categories for each profile. The analysis is based on three automation categories: "A" for capture of the caller's account number, "R" for routing, and "I" for delivery of information. For example, the profile "Transfer to floor after info readout" achieved capture of the account number ("A") and automated delivery of information ("I"). The bottom row, for the three "Automation" columns, show the automation rates by category: 41.5% capture of account number, 14.5% routing, and 3.1% information delivery. The last two columns and the rows labeled "Misrouted . . . " are described below.

Looking at cost effectiveness from an operational point of view, the total IVR system benefit was defined earlier as saved agent time. Total IVR system benefit can be directly quantified by measuring the average time that a caller spends with a live agent, and comparing that time for a call center that does not use an IVR system, as a baseline. The baseline (no IVR system) can be simulated by routing all callers directly to an agent. Evaluating this baseline with live customer traffic, however, is impractical, because bypassing a deployed IVR system would result in a severe disturbance of the on-going call center operation. A call center must provide the best possible customer service at all times. Therefore, instead of measuring total IVR system benefit directly, the present invention advantageously provides a method for estimating the total IVR system benefit based on the results of the automation analysis.

Automation analysis 8 represents completion rates for all tasks that can be automated with an IVR system. The missing piece to estimate IVR system benefit is finding out how much agent time is saved by completing each task or automation category. The savings in agent time for each automation category can be measured based on a transcription analysis of agent-caller dialogs. Transcription analysis inserts codes for completing tasks within agent-caller dialogs. Based on these codes the present invention allows to be estimated, for each task category, how much time agents spend on the task. This corresponds exactly to the time saved by completing the same tasks in the IVR system.

Alternatively, if such timing data is not available, all the timings may be replaced by standard benefit assumptions, as shown in FIG. 9. These assumptions represent lower bounds and are based on experience gathered from many call centers.

Given the time saved of agent-caller dialog in each automation category, the average agent-time saved by the IVR system can be determined easily by multiplying the corresponding automation rate with the time saved. In the example shown in FIG. 8, the two columns labeled "Benefit" show the IVR system benefit for each call profile. The left column shows the benefit for one call and the right column the average benefit, relative to all 3636 calls that were evaluated.

For example, the profile "Transfers to floor after info readout" indicates that the caller provided the account number to the IVR system (A, saving 15 agent seconds) and listened to useful information in the IVR system (I, saving 40 agent seconds). Adding these up, this profile corresponds to a benefit of 55 agent seconds in each instance. However, because only 1% of all calls fit this profile, the benefit relative to all calls is only 1% of 55 seconds, that is 0.6 seconds. With standard benefit assumptions, IVR system analysis estimates a total IVR system benefit of 13.4 seconds of saved agent time, shown in the lower right-most cell of FIG. 8.

Routing a caller to the right destination is an important task of an IVR system, in view of maximizing both cost effectiveness and usability. If a caller is routed to the wrong agent, who then transfers the caller to another agent, both agent and caller time are wasted. This subsection presents a method to quantify the effect of misrouting on cost effectiveness. To account for misrouting, calculation of total IVR system benefit is modified as follows. First, routing accuracy is measured for each distinct agent category, based on transcription analysis. Routing accuracy is defined as the percentage of callers that were routed to the correct agent, relative to all callers that were routed to that particular agent category. Then, the count for each applicable call profile is discounted by the rate of misrouting (which is the complement of routing accuracy). The counts thus subtracted are assigned to new call profiles representing misrouting.

In the estimation of total IVR system benefit, misrouting receives a penalty of agent seconds by assigning a negative "benefit" to routing in the automation category, as shown in FIG. 8. This penalty corresponds to the time that the first agent spends talking with a caller until realizing that the call has to be transferred to another agent.

The example in FIG. 8 includes two misrouting profiles ("Misrouted to specialist"), one with and the other without the benefit of caller identification. In this example, misrouting reduces the total IVR system benefit by 2.8 agent seconds, a figure calculated by adding the average "benefits" for the two misrouting profiles.

FIG. 10

In addition to the above-described automation categories, A, R, and I, it is particularly advantageous to consider "transactions" as an additional automation category. An automation analysis may therefore include the following four broad automation categories: customer ID, which is referred to as A in FIG. 10, routing (R), info delivery (I), and transactions (T). Also, estimates for how much agent time each automation category saves can be obtained using any common sense method, in addition to the two methods mentioned herein. An example of such a common sense method is timing one's self in relation to how much time would be spent in performing the corresponding task, for example asking someone for their telephone number. Thus, there are three methods for estimating the agent time saved for each automation category (benefit assumption). Namely, the agent time saved may be based on:

1. time-stamped annotations in agent-caller dialogs;
2. standard benefit assumptions; and
3. any other common sense method.

A technique for measuring the potential for increasing automation is described next. The potential for improvement is defined as the difference between the upper bound of automation for each automation category and the automation achieved in the existing IVR system. Although the automation actually achieved may be determined using the method described above, two methods effective to determine the upper bounds on automation are described in the following paragraphs. Also, because automation may be quantified as a total IVR system benefit, i.e., the total agent-time saved through automation, the potential for increasing automation can be translated into a potential for saving agent time and thus operational cost of a call center. Note that the examples below do not refer to the same hypothetical call center that was used as the examples above. Therefore, the automation rates in the examples below do not match the ones calculated there.

The first method measures upper bounds on automation based on annotations of automatable transactions in caller-agent dialogs. This method will be described with reference to FIG. 10. In a specific form of annotation, transactions that can be automated in the existing IVR system and transactions that can be automated in a modified IVR system are marked and time-stamped in caller-agent dialogs of a few hundred calls, as described also in the discussion of mini assessment 5 above. Examples of such automatable transactions include: providing the agent with the caller's account number, reading the account balance to the caller, and scheduling an appointment for a technician to come to the caller's house; other examples are shown in the column "automatable transactions" in FIG. 10.

Once such transactions have been annotated, their frequency and average handling time can be estimated. The product of frequency and average handling time yields the savings potential for a specific transaction, expressed in agent seconds. The total opportunity is calculated by adding up savings potentials across all automatable transactions, and multiplying the total by the percentage of calls that are handled by agents.

FIG. 10 lists automatable transactions in the left column and then cross references those transactions based on, for each automatable transaction (defining rows), the number of occurrences, the time spent, the frequency, the savings potential, and the automation category (A, R, I, and T). For example, the savings potential for making a new payment arrangement, relative to all calls handled by an agent, is 20.94 seconds×13.7%=2.9 seconds. The total savings potential is the sum of the savings potential entries for each automatable transaction. This opportunity is relative to all calls that are handled by an agent. The rate of calls handled by an agent, 72% in FIG. 10, can be obtained from the gathered IVR event-sequence data. An IVR event sequence, as discussed above, indicates, for each call, whether the call was enabled in the IVR system or was transferred to an agent. A weighted opportunity of 16.6 is relative to all calls. It is calculated by multiplying the opportunity relative to all calls handled by an agent (23.1 agent seconds in the example) by the percentage of calls handled by an agent (72% in the example). The numbers in the savings potential column are, for each automatable transaction, the product of "time spent" (average time spent by agents on handling the transactions) and frequency. In this example, the total potential for increasing automation, thus saved agent time, is determined to be 16.6 agent seconds relative to all calls. A normalization relative to all calls facilitates translation of these savings of agent time into agent labor savings. The number of agent seconds is simply multiplied by the total call volume into the call center, which is readily available from standard call center reports, and the agent cost per second.

FIG. 11

FIG. 11 illustrates a second method for determining upper bounds on automation. This method is less accurate, but also much less costly. Instead of requiring annotation of all automatable transactions that occur in hundreds of agent-caller dialogs, which may require significant effort if annotation is performed manually, this method requires only knowledge of the call-type distribution and how an IVR system could benefit each of the call types.

The call-type distribution, shown in the first two columns in FIG. 11, is estimated by annotating the call types of a few hundred calls that were handled by an agent, using one of the annotation methods described in relation to the technique for call annotation 7, discussed above. To estimate upper bounds on automation based on the call-type distribution, for each call type, which are shown as rows in FIG. 11, the automation categories that are required to handle calls for each call type are indicated. In FIG. 11, a mark (X) in one of the automation category columns indicates that a specific call type benefits from a certain automation category. For example, callers of the type "balance/billing" would benefit from providing their customer ID, making the right menu selections to get to the balance/billing section (therefore an X in the routing column), and obtaining their account balance (therefore an X in the info delivery column). Once this table has been filled out, the upper bound for each automation category is simply the sum of all call-type frequencies (shown in the column labeled "% Calls") where the automation category column is marked. In this example, the upper bound for customer ID is 95.7%, 71.5% for routing and information delivery, and 29.5% for transactions.

Figure 12:
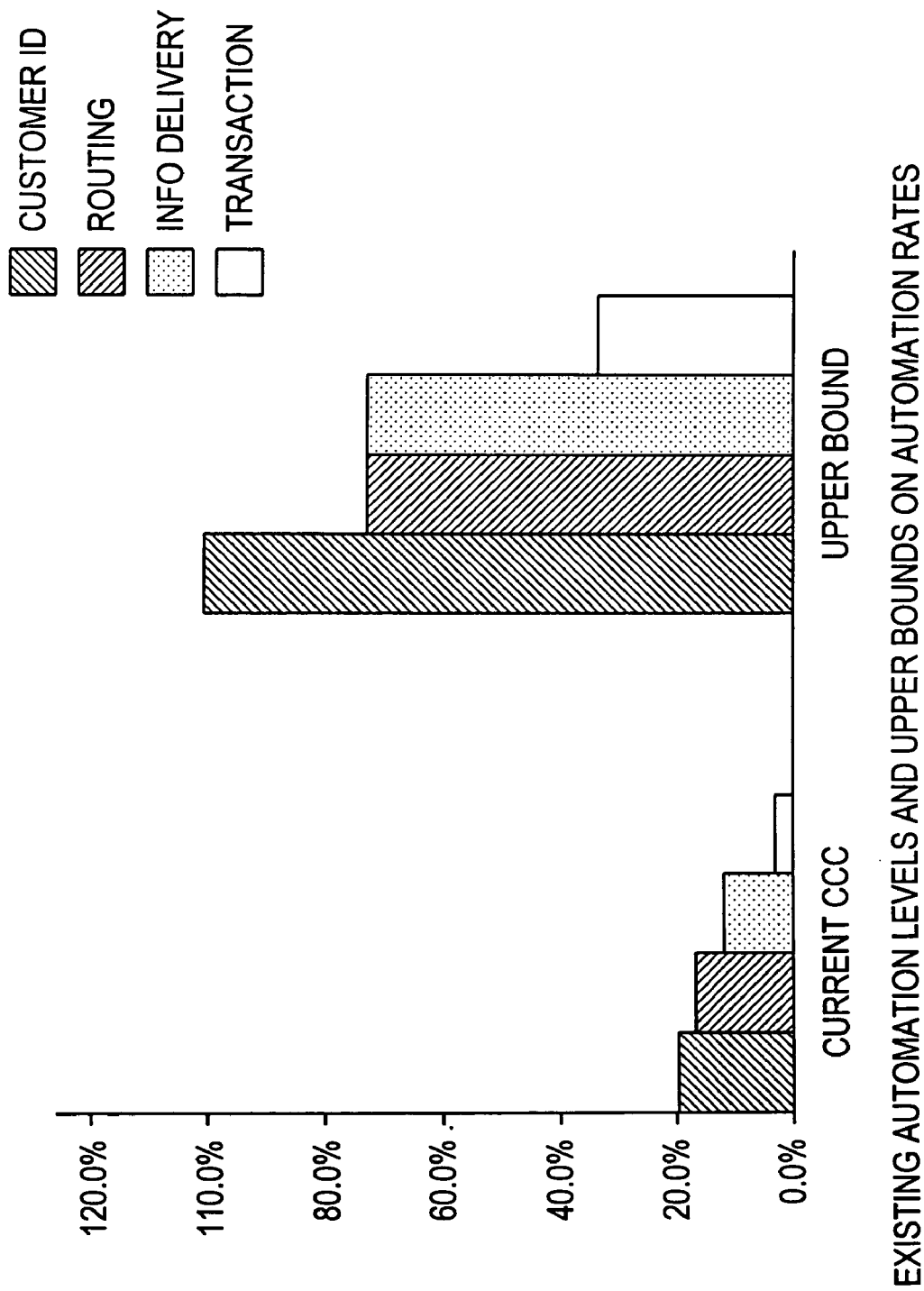
FIG. 12 is a bar chart for comparing upper bounds of automation with existing levels of automation in a call center.
Figure 13:
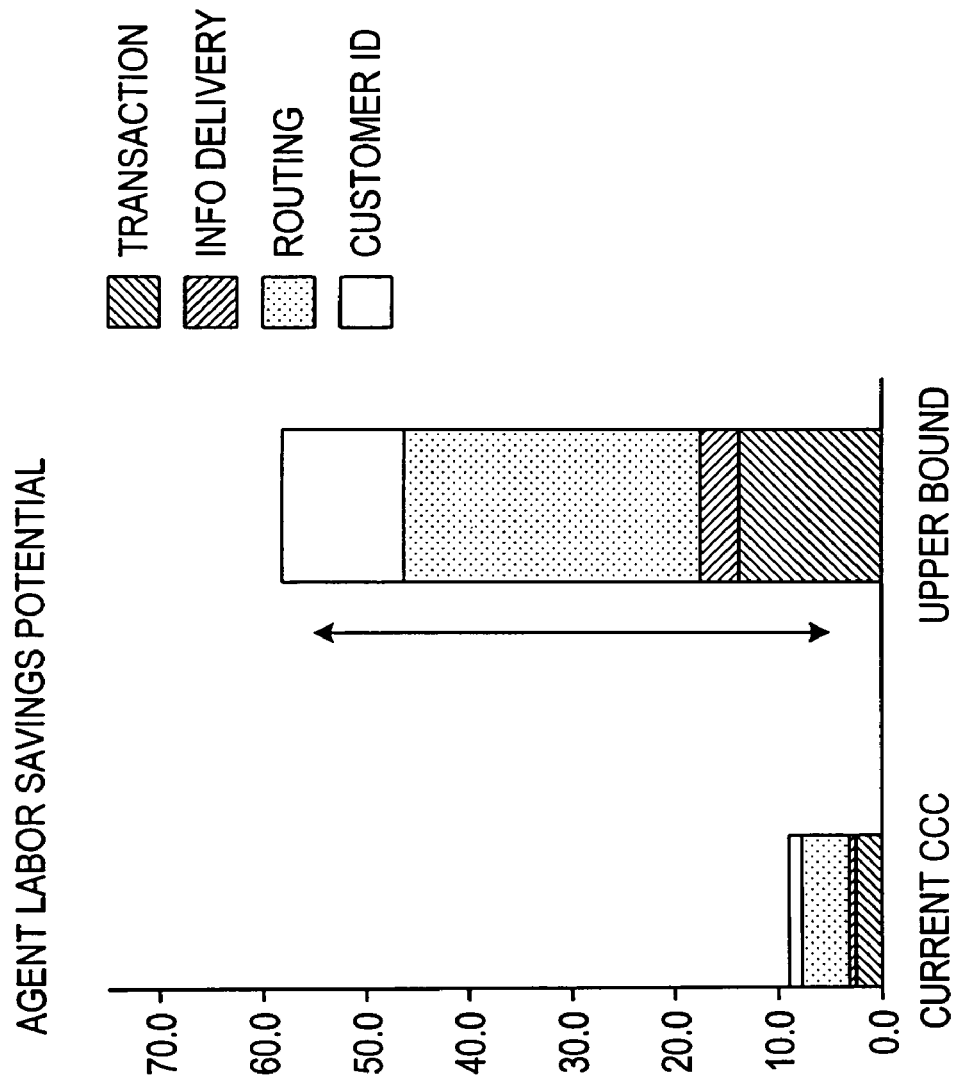
FIG. 13 is a chart illustrating potential savings of agent time in a call center.

FIGS. 12 and 13

To determine the potential for increasing automation, the upper bounds on automation are compared with the automation rates achieved in the existing IVR system, as illustrated in the bar chart of FIG. 12. The existing automation rates were measured using the automation analysis method described above.

As above, potential for operational savings is quantified as savings in agent time, expressed in agent seconds per call. To transform the potential for increasing automation rates into a potential for realizing operational savings, the automation rates are multiplied with the corresponding benefit assumption, the agent time saved. The bottom part of FIG. 11 shows this calculation. Once automation rates have thus been converted into estimates for saving agent time, the potential for saving agent time is the difference between the upper bound and the savings realized by the existing IVR system, as illustrated in FIG. 13.

The output of the first method can also be visualized in the form shown in FIG. 13. To this end, the savings potential for each automation category is calculated by adding up savings potentials for all transactions that are assigned to that automation category, as shown in the next to last column in FIG. 10.

It should be noted that the second method yields much more optimistic upper bounds on automation than the first method described above, because it assumes that every call of a specific call type would actually benefit from a certain type of automation. However, in reality it is never true that all callers of a specific call type can actually get their problem solved in an automated (IVR) system, even though the service needed is offered in the IVR system. Therefore, when trying to glean a realistic estimate for how much automation could actually be realized, upper bounds derived using the second method must be discounted more heavily than upper bounds derived using the first method. For the call center used as example above, the first method estimated the total upper bound at 30 agent seconds while the second method arrived at 40 agent seconds. Note that the description of the first method did not include the potential for increasing automated capture of customer ID, which was quantified at 14 agent seconds, but which was not included in FIG. 10 to reduce complexity of the figure.

User-Path Diagrams 9

The following subsections introduce user-path diagrams, also referred to as state-transition diagrams, as an extremely useful tool for evaluating usability of call center IVR systems. Following the description of user-path diagrams, a method is described for conducting timing analyses in telephone user interfaces.

A user-path diagram is used to visualize user behavior of calls placed into a call center by representing the actions taken and the final conclusion (level of success) reached for many calls. A user-path diagram is a state-transition diagram where states correspond to actions or prompts in the IVR system, and arcs correspond to user responses or actions initiated by the IVR system. Both states and arcs (transitions) are annotated with the amount of user traffic that reaches a specific state. The amount of traffic may be represented by a count number, and absolute and/or relative percentages. Each state also shows how many customers (callers) left the IVR system at that specific state, along with the level of success (i.e., automation or completion of the customer's goals) and the IVR exit condition. Optionally, transitions in the user-path diagram may be annotated with the modality that triggered the transition. For example, some transitions may occur after pressing "1" or "2", while other transitions occur if the caller provides no input ("timeout") or speaks to the IVR system.

A user-path diagram can be obtained for touch-tone, speech-enabled, and multimodal IVR systems. Also, a user-path diagram can be generated at various levels of abstraction of the call flow of a call center. A state in a user-path diagram may represent one specific prompt in the call flow, or a prompt with all reprompts and retries, or a complete subsection of the IVR system, representing many different prompts.

FIG. 14

Figure 14:
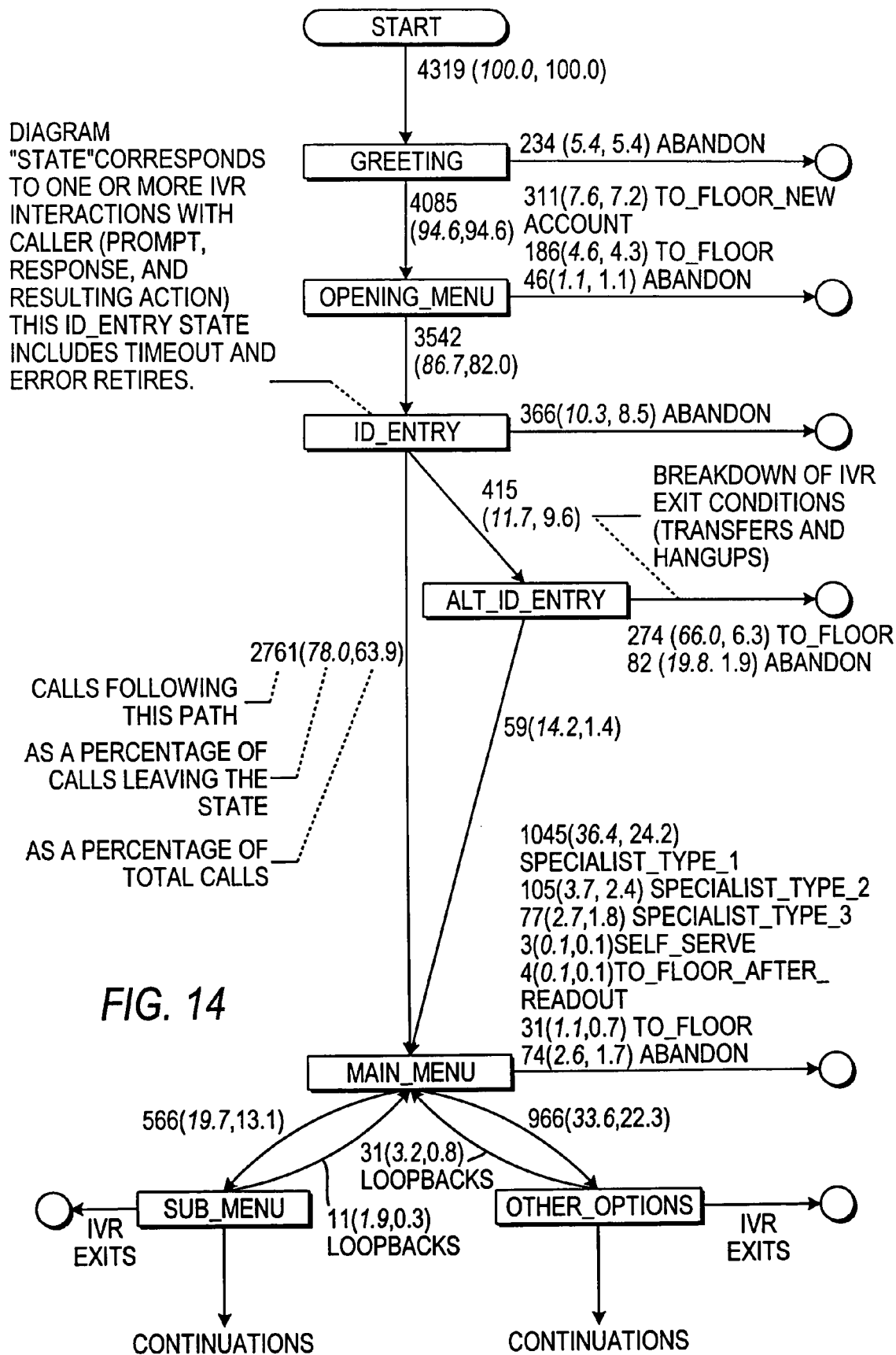
FIG. 14 is an exemplary user-path diagram, in accordance with a preferred embodiment of the present invention.

An exemplary user-path diagram is shown in FIG. 14. A user-path diagram effectively shows user behavior in an IVR system by representing IVR event-sequence data as a tree. The nodes of the tree correspond to IVR states or prompts, arcs correspond to state transitions, and leaves correspond to IVR exit conditions of calls. As is shown in FIG. 14, each node and leaf is marked with the count of calls that reached the node or leaf, and with two percentages: the percentage relative to all calls that reached the parent of the node, indicated in italics, and the absolute percentage, relative to all calls in the data set. In addition, although not shown in the figure, arcs may be marked with user (caller) input that causes the corresponding state transition, such as pressing a certain touch-tone button in response to a prompt. Each state also shows how many customers left the IVR system at that specific state and its exit condition. Such exit conditions include, but are not limited to: "self-serve" (or full automation)—the call was resolved in the IVR; "to agent"—the call was transferred to a live agent; and "abandon"—the caller hung up, either in the IVR system without obtaining any useful information, or on hold before reaching a live agent. If a call center operates with distinct categories of agents, the "to agent" category is typically broken down or separated into various subcategories, each representing a distinct queue of specialist agents. In addition, the level of automation may be added to each of the agent categories. Such annotations may include: "cold to the floor" (routed to default agent without obtaining any useful information in the IVR system), "to floor with ID (routed to default agent after providing the caller ID in the IVR system), "to floor with readout" (routed to default agent after obtaining useful information in the IVR system), or "to floor with transaction".

Figure 15:
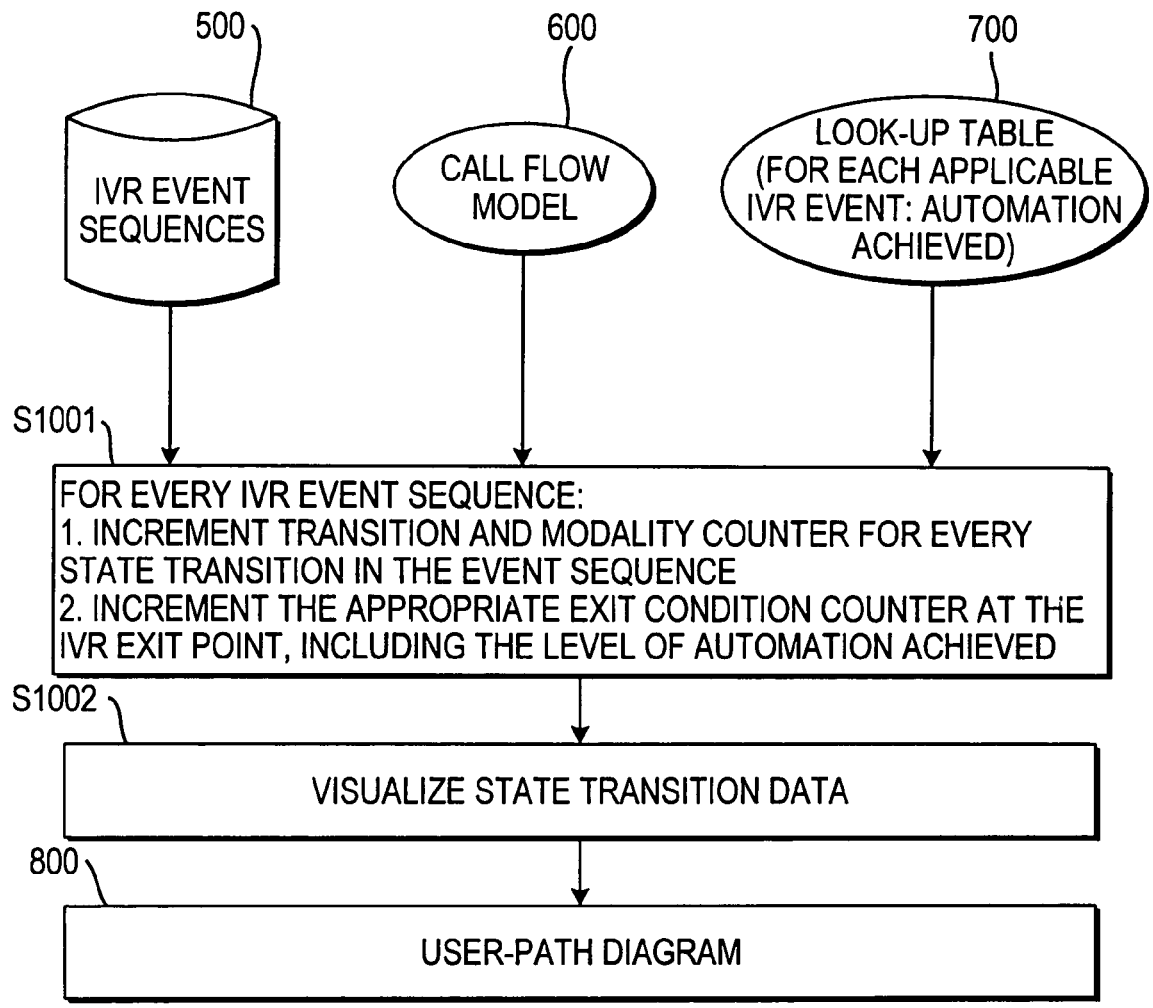
FIG. 15 is a flow diagram illustrating a process for generating a user-path diagram, in accordance with the present invention.
Figure 15A:
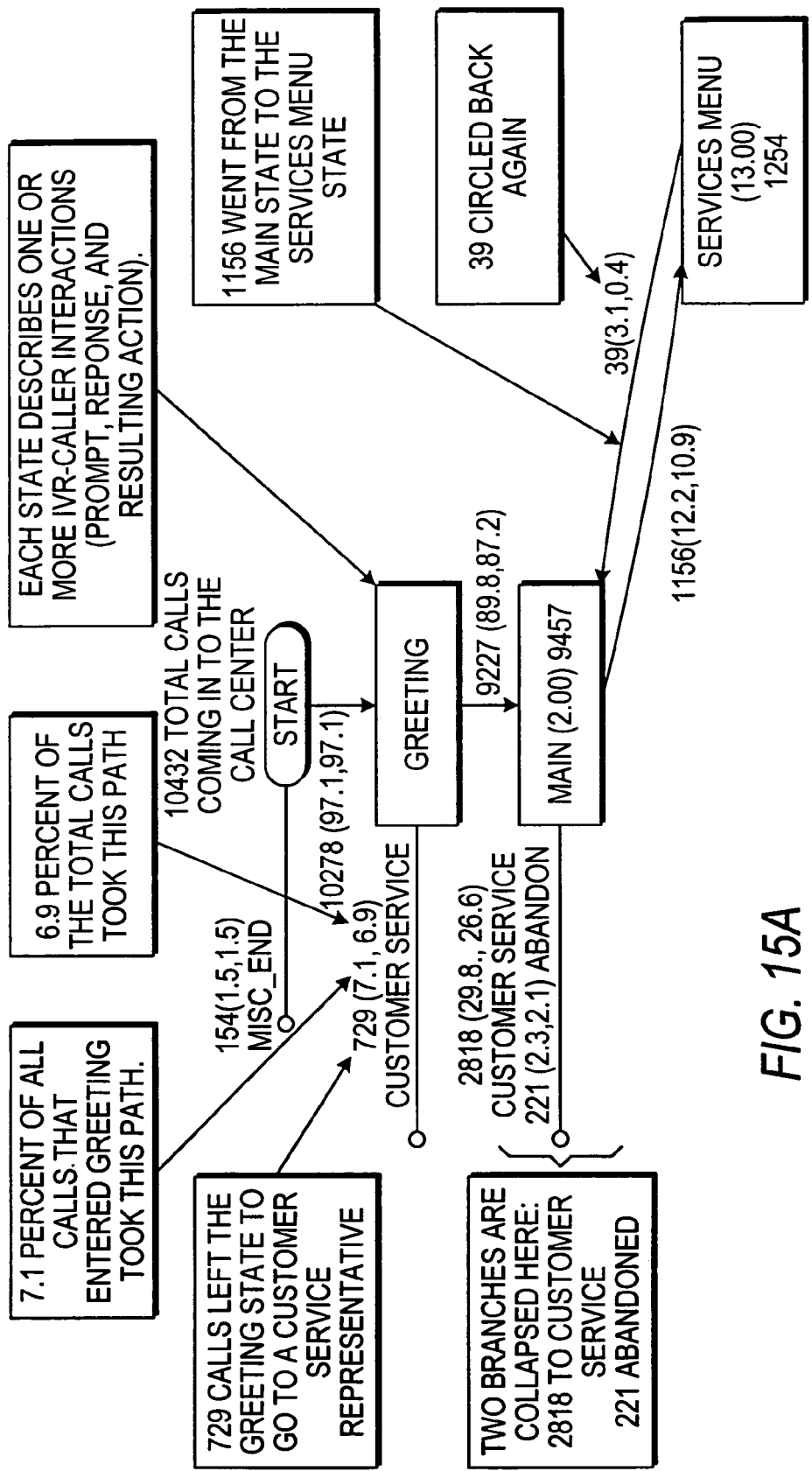
FIG. 15A is a diagram that illustrates how to read a user path diagram.

In the exemplary user-path diagram of FIG. 14, rectangular boxes represent one or more IVR states, arrows represent call traffic, and circles indicate locations where calls leave the IVR system. For example, of the 4319 calls that this hypothetical data set contains, 234 calls (or 5.4%) abandon at the greeting. At the opening menu, 311 calls (or 7.2% of total calls) are transferred to a "floor" agent, claiming they want to establish a new account. At the same menu, 4.3% of all the calls reach a "floor" agent for other reasons, and 1.1% abandon the call. FIG. 15A illustrates how to read a user path diagram.

IVR systems can be very complex, thus also user-path diagrams. To cope with complex IVR systems, usability analysis based on user path diagrams can be conducted in a modular fashion by clustering IVR states. In such clustered user-path diagrams, nodes may represent clusters of states. The counts for a clustered user path diagram are obtained by adding up counts for all states in a cluster, and by eliminating loops, i.e., transitions between two states that belong to the same cluster. For example, in FIG. 14, "ID Entry" and "ALT ID Entry" are state clusters representing a call flow for entering account numbers in two different ways.

User-path diagrams can be generated from complete IVR event sequences for many calls using the following computer-based method. The call-flow logic is modeled as a non-deterministic finite-state automaton, which is a standard modeling tool in the field of computer science. The start state represents the first prompt in the IVR system, most often a greeting. Other states of the call-flow model represent all prompts where a branching occurs in the call flow, be it triggered by some kind of user input or by internal processing. In addition, the IVR exit condition is captured in a set of end states, representing a caller hangup, a transfer to a floor agent, and a transfer to a specialist agent. The transitions of the automaton represent transitions between call-flow states, which may be triggered by caller DTMF dtmf input, spoken caller input, or no input (timeout).

After modeling the IVR call-flow logic as a non-deterministic finite-state automaton, the IVR event sequences are fed through the finite state automaton, using a standard acceptance algorithm. During this process, a two way matrix of several counters is filled as follows. For every state with at least one child (subsequent state), there are state-transition counters and a counter for each distinct modality. In addition, for all exit states there are counters representing the various IVR exit conditions, separating the different levels of automation achieved.

FIGS. 15–16A

Once this two-way matrix of several counters has been filled, it can be represented visually as a state-transition diagram using standard visualization techniques. FIG. 15 illustrates the process for generating user-path diagrams. As shown in the figure, the first step S1001 is performed on the basis of a database of IVR event sequences 500, a call-flow model 600, and a lookup table 700. The lookup table 700 stores, for each applicable IVR event, the automation that was achieved.

At step S1001, for every IVR event sequence, a transition and modality counter is incremented for every state transition in the event sequence. Also, an appropriate exit condition counter at the IVR exit point, including the level of automation achieved, is incremented. At step S1002 the state transition data is used to produce a user-path diagram 800. FIG. 15A illustrates how to read a user path diagram.

Usability problems can be identified by inspecting user-path diagrams. Usability problems reveal themselves, for example, as parts of the tree that receive little or no caller traffic, or as states with high rates of abandoned calls or transfers to an agent. In other words, a user-path diagram can be interpreted as a funnel. In this view, "leaks" in the funnel indicate usability problems.

For example, in FIG. 14, the state cluster named "ALT ID Entry" receives 9.6% of all calls, but 86% of these calls either are abandoned or are transferred to a floor agent, and the account number is correctly entered in only 14% of calls. Obviously, this part of the IVR system is ineffective.

Clustered user path diagrams lend themselves to analyzing the effectiveness of sections of an IVR system, e.g., the section that identifies the caller. It has been found by the inventors that the success rate (or yield) of an IVR system on such IVR sections is useful to analyze IVR system usability for specific tasks. The yield of an IVR section is defined as the ratio of incoming to outgoing calls in the cluster that represents the IVR section. For example, the yield for identifying the caller for the IVR shown in FIG. 14 is (2761+59)/3542=79.6%, by adding appropriate counts for two state clusters "ID Entry" and "ALT ID".

Routing Analysis 1

The performance of an IVR system with regard to call routing is important in assessing the IVR system. Routing performance can be graphically summarized in a confusion matrix. Such a matrix graphically displays the routing decisions made by the IVR system in comparison with where the caller actually should have been routed, according to his or her reason for calling. This information, thus arranged, facilitates calculation of the routing accuracy of the IVR system. The procedure followed to generate the information to be displayed in the matrix is discussed in detail below, after a discussion of the confusion matrix itself and what can be gleaned from it.

An exemplary confusion matrix is shown in FIG. 16. A confusion matrix uses the information gathered by the IVR system analysis 6, the prompt inference 6, and the annotation 7 techniques and graphically compares the way the IVR system routed calls with what was actually intended by the callers, that is, the true reason for calling, or "truth".

In the confusion matrix shown in FIG. 16, the rows indicate the destination to which the IVR system actually routed the calls in a hypothetical call center. In the hypothetical call center, the calls were routed either to Specialty 1, Specialty 2, Specialty 3, or to the floor (non-specialist agents). The columns indicate to which specialty the caller actually needed to be routed. Note that the numbers along the diagonal from upper left to lower right represent correctly routed calls, i.e., 33 calls intended for Specialty 1 were actually routed there, 24 calls intended for Specialty 2 were actually routed there, 8 of the calls intended for Specialty 3 were actually routed there, and 150 of the calls intended for the floor were actually routed there.

On the other hand, it can be seen, for example, from the matrix that 22 of those calls routed to the floor actually should have been routed to Specialty 1. The matrix also shows, for example, that the true topic (confirmed by interactions with agents) of 55 calls was that corresponding to Specialty 1. This topic represents 18% of topic volume (55/307×100). The information also indicates that 60% of the calls intended for Specialty 1 actually were routed there. Conversely, only 51% of the calls routed to Specialty 1 actually should have been routed there (33/65×100). It can also be seen, for example that 16 of the calls intended for Specialty 2 were routed to Specialty 1, 26 went to the floor, while only 8 were correctly routed. This is extremely important information in assessing an IVR system, because misrouting costs as much as auto-routing saves, in that the wrong agent's time is wasted rerouting the call. The overall accuracy of the system can be calculated (in %) as the number of correctly routed calls (215, adding up the figures in the diagonal) divided by the total number of calls (307) and multiplied by 100. In the hypothetical, the overall accuracy is 70%.

To convert the end-to-end call-flow information gathered in the IVR logging 3 and annotation 7 techniques into a form that may easily be displayed in the form of a confusion matrix requires manipulation of several data files containing data gathered from end-to-end calls. The method of manipulating those files is described next with reference to the flow chart of FIG. 16A.

First, at step S20A, the call flow of a particular IVR system is summarized in a specially formatted input file (.cfs file). The .cfs file encapsulates a call-flow model from information provided by the organization running the IVR system and by listening to and making calls to the IVR system. At step S20, calls are recorded end to end, as discussed in detail above. At step S21, agent-caller interaction is coded and annotated. At step S22, event detection and prompt inference are performed, with reference to the .cfs file, and the IVR portion of the call is summarized in a typ output file. The typ files (one per call) are compiled at step S24 to create a summary (.sum) file of, among other items, information collected from the caller in the IVR system and the routing destination out of the IVR system for each call.

FIG. 17

FIG. 17 is an example of an excerpt from a sum file. As can be seen, each line contains a summary of a particular call.

Figure 16A:
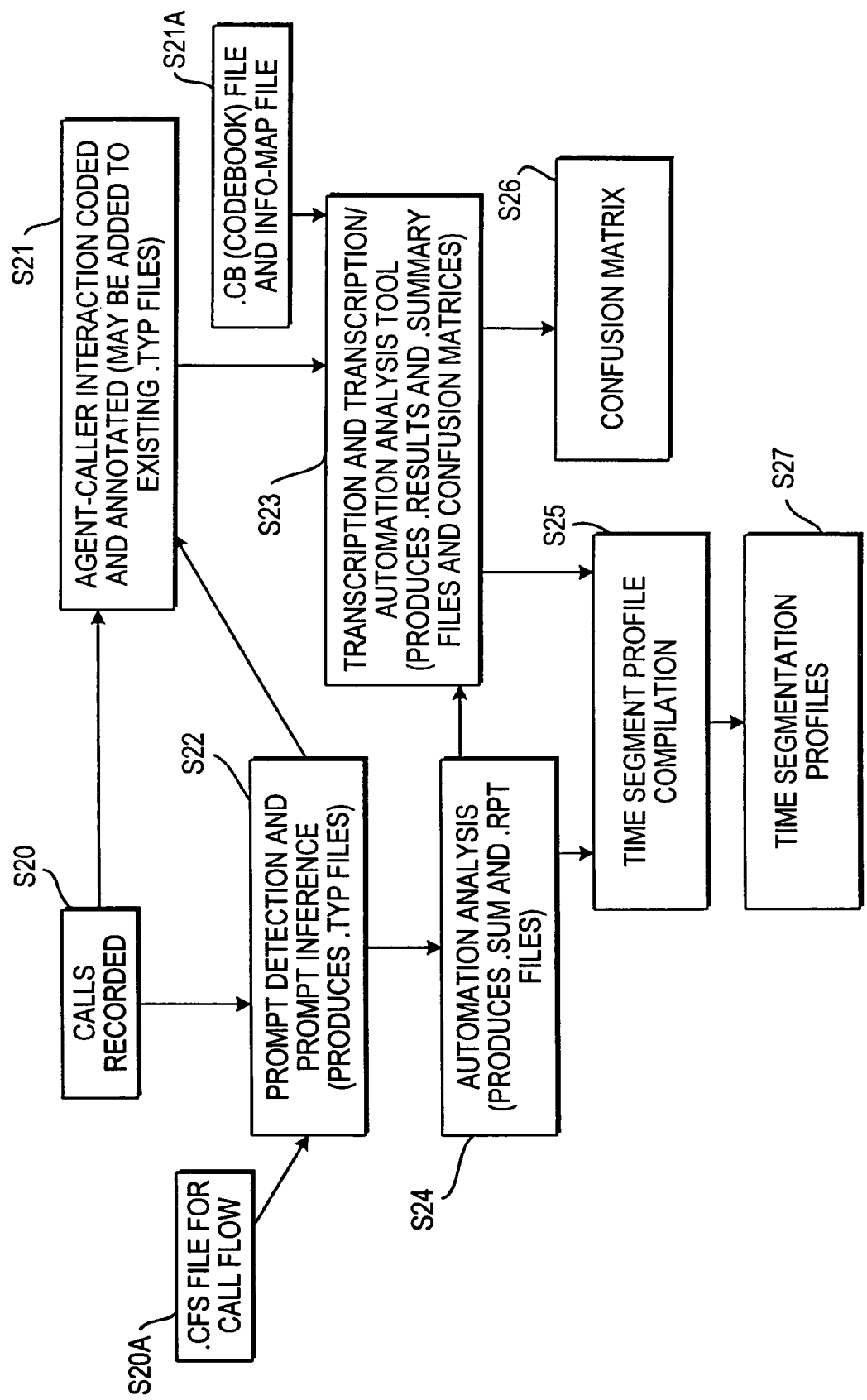
FIG. 16A is a flow chart illustrating a method of manipulating call data files so that they may be visualized in a confusion matrix.

As has been discussed in detail previously, at step S21 of FIG. 16A transcribers annotate the post-IVR portion of the call for calls that transfer out of the IVR system, noting, among other things, when calls transfer to an agent (or end), topics discussed, information collected, and transactions completed for the customer (caller). Global information about the call, e.g., whether the customer was satisfied and whether the problem resolved, may also be noted. The coding scheme is summarized, at step S21A in a codebook input file (.cb file). (The transcription analysis technique is discussed above.) Then, at step S23, summary results are created for the coded transcriptions. The coding scheme also combines the coded information for each call with that from the IVR system analysis for that call to generate a profile of how many callers are asked again for information that was requested and/or acquired in the IVR system, and cross-tabulates the IVR system routing and the topic(s) discussed in the agent-caller dialog to generate a confusion matrix, as shown in FIG. 16A, at step S26.

The files discussed above are described in more detail as follows:

A .results file includes summary statistics for the coded agent-caller transcription; times to collect information from callers or provide information to them; in-IVR, transfer, hold, and with-agent times; breakdowns of calls by any global information items collected; and breakdowns of calls by first topic, any topic, topic list, call routing (topic) types, information provided or collected. The timing statistics are further broken down by the routing type of the call.

A summary file gives both IVR system analysis and with-agent transcription results in spreadsheet form. Such files are discussed in more detail below.

A confusion matrix file is a cross-tabulation of the calls routed by IVR system routing and the actual caller topic noted in the transcription of the agent-caller portion of the call.

There are three segments to most calls to an IVR system: the IVR portion; the hold portion; and the caller-agent interaction. To segment time by call type, the automation analysis tools, in addition to creating the sum file, as described above, also create a report (.rpt) file that includes summary statistics for time spent in the IVR system until transfer or abandonment. The summary results created by the transcription analysis techniques include statistics on the amount of time spent in the IVR system, in the initial transfer to an agent, with an agent, and in subsequent transfers for all calls and broken down by call (routing topic) type.

The information from the .rpt and results files is then combined at step S25 to profile calls, at step S27, by time spent in the IVR system for all calls, in the initial transfer out of the IVR system, for calls that do not self-serve or are abandoned in the IVR system, and after an agent takes the call, for calls that transfer out of the IVR system and do not hangup during the initial hold. Calls for which a call-routing type can be identified have "subprofiles" by call type.

FIG. 18

Figure 18:
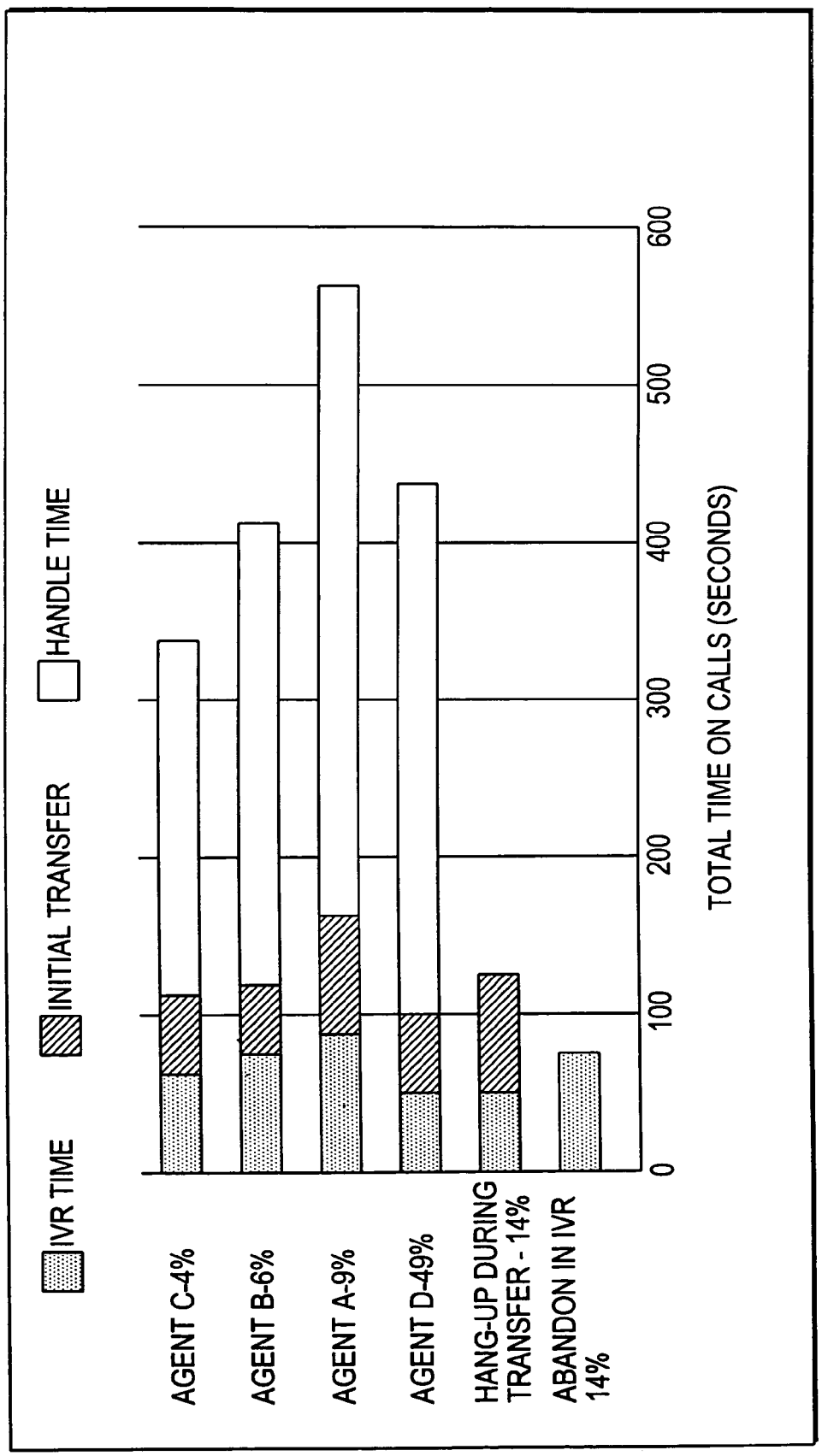
FIG. 18 is an exemplary life-of-call diagram.

This profile information, presented in both tabular and graphic (barchart) form, is called a life-of-call diagram, as shown in FIG. 18. The above process produces profile information for the segment times by call type:

A .typ file is generated from client application logs, from simulator logs, or from prompt detection/inference. The format can be read by a transcriber's standard software tool, which allows caller-agent interaction annotations to be added. The .typ file acts as the repository of information for an individual call, both from the automated IVR system analysis and transcriber annotations, and acts as the basis for analysis by parsing tools.

A .sum file is a single file for an entire set of data, where a set of data is whatever list of .typ files is selected for processing as a set. The .sum file consists of a one-line summary per file of major events in a call (prompts, DTMF tones, etc.) and the final information on destination, information exchanged, and the manner of exit from the IVR system (e.g., to agent or hangup). The file acts as the basis for further "batch" analysis, such as analysis to create a user-path diagram and to merge information from IVR system analysis and caller-agent interactions.

A .elog file consists of a single file for an entire set of data, where a set of data is whatever list of typ files is selected for processing as a set. The file has one "paragraph" per file of major events in the call, including a list of prompts and responses, the timing of the prompts and responses, and various other "global" statistics for a call (e.g., number of tries for each piece of information, exit states, etc.)

A .rpt file includes counts and summary statistics computed across an entire set of data, where a set of data is whatever list of typ files is selected for processing as a set. This file is generated at the same time as the sum file, and includes timing statistics for various checkpoints in a call (time to transfer, time to first readout, etc.), as well as count breakdowns by various criteria, such as destination out of IVR system, number of prompts heard, information exchanged, topics given in the IVR system (for speech applications), etc.

Inputs to an IVR system automation analysis tool include a typ file and a .cfs file.

A .typ file, as described above, acts as the basis for analysis by an IVR system automation analysis tool. Events are noted in pairs of lines: a timestamp line, followed by the event(s) that occur at that time. Events include start of call, end of call, prompts, DTMF tones, speech recognition, topic identification, and coded events as annotated by transcribers. The coded events include agent greetings, holds, transactions, topics, and transcribed customer (caller) speech. Transcriber annotations that refer to the entire call (such as whether the customer issue was resolved, whether the customer was upset, etc.) can be encoded in start-of-call or end-of-call fields.

A .cfs file encapsulates a call-flow model in a specified format used by IVR system automation analysis tools. The .cfs file includes prompt name, information collected or provided (readout) at the prompt, subsequent prompts, and caller actions that lead to each possible subsequent prompt.

The automation analysis tool discussed above takes a list of typ files and a .cfs file as input, and steps through each typ file, parsing out events and their associated times, and using information in the .cfs file to deduce what information was collected, the final disposition (abandon, self-serve, to-agent, etc.) of the call, and the sequence of events. The event sequence is vetted to make sure that it is possible under the call flow as documented in the .cfs file. As each call is processed, counts and summary statistics are updated, and the entries for that call in the .sum and elog files are generated.

Outputs from the IVR system automation analysis tool include a sum file, a elog file, a .rpt file, all of which are described above. The outputs also include a counts file and a .success file.

A counts file includes a brief overview of counts and percentages of calls by disposition, full automation, transfer to agent, hangup, abandon, prompt detection, or simulator failure. This file can be used to detect shifts in the success of the prompt detection or the simulator that creates the typ files used for analysis, or in abandon and automation rates.

A success file provides, for each type of information prompted for in the IVR system, counts and success rates for eliciting that information from callers, broken down in various ways, such as by number of tries, by mode (DTMF, speech recognition, no response), For example, a success file can give the number and percent of callers that provide their telephone number by speech at the first try.

The user-path diagrams discussed above are generated using the .sum file, created by the IVR system automation analysis tool, and the .cfs file. A matrix of from-to pairs is generated and updated for each call by parsing the event sequence for that call as given in the sum file. From this information, a .trans file is created, which reports the total number of calls that transited from state A (usually a prompt, start, or end state) to state B for each from-to pair observed. When the "to" state is an exit condition (transfer to agent or hangup in the IVR system), the exit information from the .sum file is preserved in the trans file.

A trans file gives the counts of calls that transit from state A to state B, along with a breakdown of those counts by mode (DTMF, speech, or silence), and is used as the input to tools for generating the actual user-path diagram (graph), and to roll up or agglomerate associated states (e.g., a prompt and immediate retries) into a single state for graphing and analysis purposes.

A transcription analysis tool that analyzes transcriber (annotator) codes and annotations takes as inputs a list of .typ files and a .cb (codebook) file that gives the annotators' codes, their names, and topic and routing groupings, if applicable, e.g., allowing all billing-related topics to be tracked both individually, and collectively as "billing". Optionally, a sum file created by an IVR system analysis tool can be inputted, in which case the transcription analysis tool will also merge information from an IVR system analysis. For each call (.typ file) listed, the transcription analysis tool parses the events and associated codes in the typ file. As each call is processed, counts and summary statistics are updated, and the entry for that call in the summary file is generated.

Outputs of the transcription analysis tool include a summary file and a results file.

A summary file gives information for each call (timing statistics, topics noted, information exchanged, etc.), at one line per call, in a format that can be easily read into a spreadsheet program or parsed by other analysis tools.

A results file, as discussed above, includes counts and summary statistics computed across an entire set of data, where a set of data is whatever list of .typ files is selected for processing as a set. The .results file is generated at the same time as the summary file, and includes timing statistics for various checkpoints in the call, time to exchange each type of information, time with agent(s), as well as count breakdowns by various partitions, such as first topic, any topic, information exchanged, number of topics, number of agents, type of routing agent pool of topic, etc.

If a sum file from an IVR system automation analysis is one of the inputs to the transcription analysis tool, the .results file that is generated will include merged statistics on incidences of callers being queried by an agent for information they have already been asked for and/or provided in the IVR system.

Sections of a results file that give call segment times (time in IVR portion, time on hold to agent, time with agent) broken down by routing type, and timing statistics for calls that are abandoned while on hold for an agent, are combined with information from the .rpt file created by the IVR system automation analysis tool to generate information on time segmentation by call type, i.e., a life-of-call diagram, which is discussed next.

Life-of-Call Diagram 10

To conduct timing analyses of telephone user interfaces, completion times are measured based on call-event traces, which contain time stamps for every significant event in a call. Timing analyses can be conducted at various levels of detail, ranging from timing broad sections of a call, such as IVR, on hold, and agent-caller dialog, to measuring task completion times for specific tasks, such as entering an account number.

Useful insights about caller experience within a telephone user interface can be gained by tabulating the timing of broad sections for different call profiles, which will be referred to as a life-of-call diagram. At least the following two profiles should be considered: abandoned calls and calls that were transferred to an agent.

More profiles should be considered if calls can be classified into distinct service categories. Based on annotations that characterize the reason for a call, obtained from transcription analysis, life-of-call diagrams graphically represent user (caller) experience across the service categories. For example, the life-of-call diagram in FIG. 18 shows four different agent categories A–D. It can be seen that the call center services calls of type C much faster than type A. The profile "Hangup during transfer from IVR" shows that callers' patience during a transfer is typically exhausted within 90 seconds of waiting on hold while being transferred.

Beyond evaluation, the assessment analyses techniques of the present invention also provide guidance for improving interface design. The following outlines how to apply these techniques to the design or redesign of telephone user interfaces.

IVR system automation analysis and calculation of a total IVR system benefit discussed above, can be applied to quantitatively compare alternative IVR system designs. For a comparative IVR system analysis, automation rates are calculated separately for both IVR systems, in the manner presented above. Differences in automation rates indicate which IVR system design is better, separately for each task (automation category). For a decision based on a single number, the difference in total IVR system benefit reveals which design is superior overall.

Figure 19:
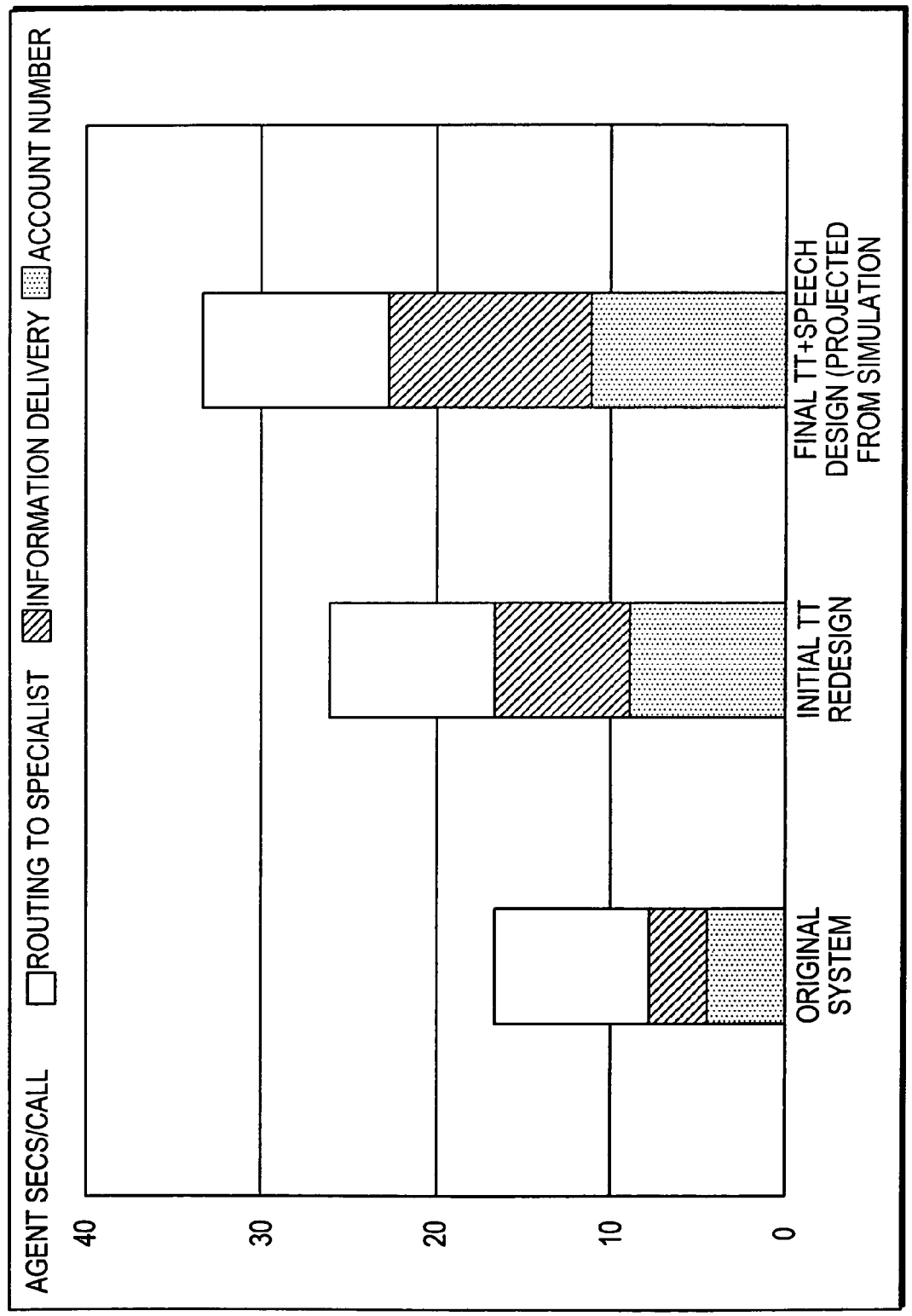
FIG. 19 is a chart comparing cost savings in three different IVR systems.

Comparative IVR system analysis can thus validate that a new IVR system design is indeed better, and furthermore, it quantifies the cost savings. FIG. 19 compares three IVR system designs: the original design and two new designs (an initial touch-tone redesign and a final touch-tone and speech-enabled design). The height of the columns indicates the total IVR system benefit.

It can be seen that the initial touch-tone redesign increased total IVR system benefit from 17 to 26 agent seconds. By comparing three automation categories "account number (entry)", "information delivery", and "routing to specialist", it can be seen that this increase is due to improved capture of account number and information delivery. Hence, this comparative IVR system analysis validates that the touch-tone redesign is indeed superior to the original system, and quantifies the savings as 9 agent seconds. In this call center, with 15 million calls per year and an agent cost-per-minute of 52 cents, this corresponds to annual savings of more than $1 million.

IVR system automation analysis and benefit calculations can provide the necessary business justification of IVR system redesign, because the cost savings of a redesigned IVR system can be estimated. Based on an automation analysis of an existing IVR system and knowledge of usability problems, bounds for improvements in the various automation categories can be derived. Given such bounds, the total IVR system benefit can be projected to calculate bounds on the annual cost savings.

Figure 19A:
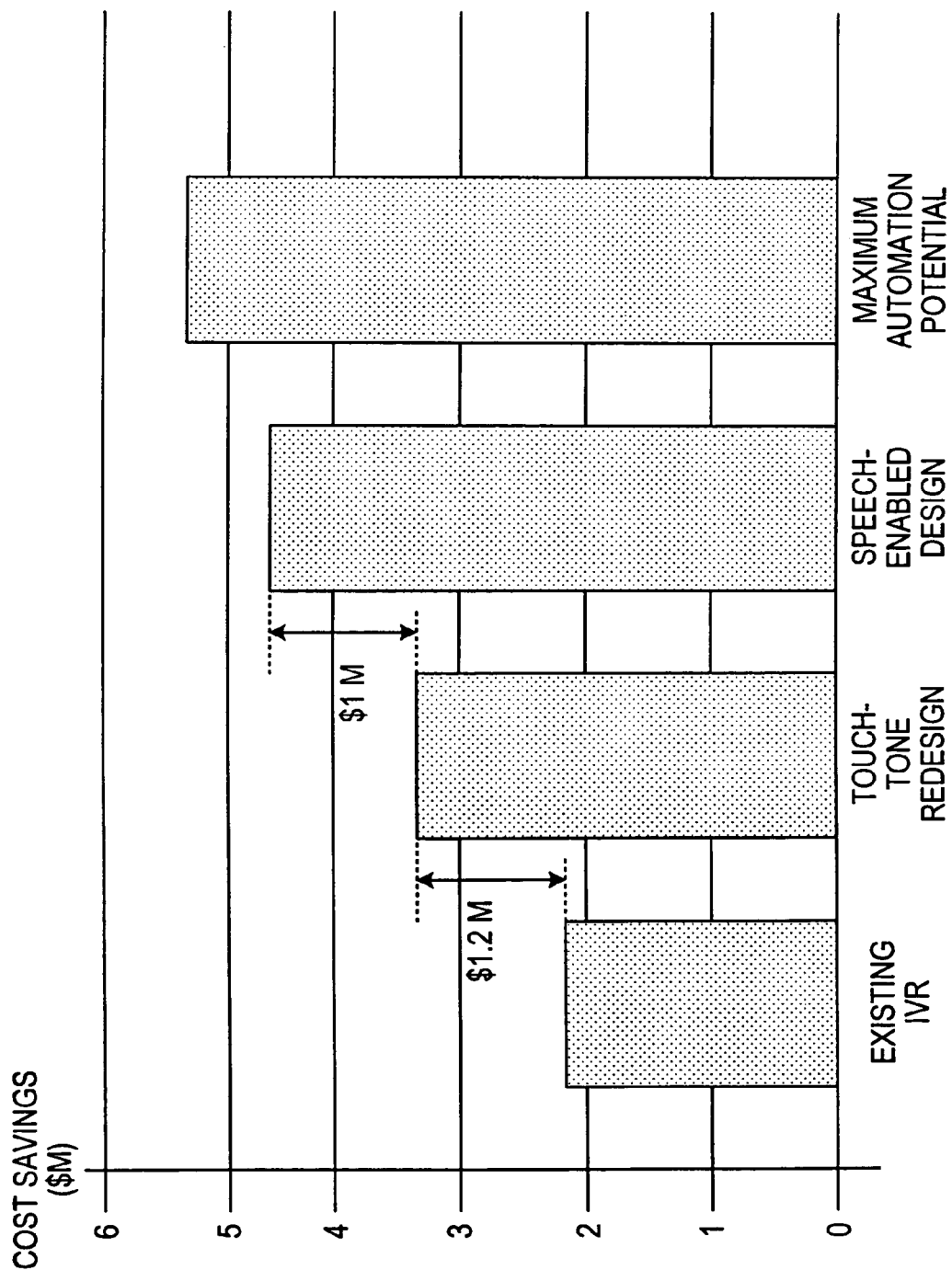
FIG. 19A illustrates projected benefits for a touch-tone redesign versus a speech-enable call center.

FIGS. 19 and 19A

In FIG. 19, for example, the numbers for touch-tone and speech-enabled design are based on such benefit projections. The projected increase in total IVR benefit to 34 agent seconds corresponds to annual savings of more than $400,000. For the call center at hand, this provides justification to implement the speech-enabled design, which is expected to greatly improve usability and user satisfaction, in addition to the projected cost savings.

Given an assessment of automation potential, techniques of the present invention can estimate how much of an opportunity for savings can be expected to be realized by redesigning an IVR system. Based on expected savings in agent time per call, hourly rates for agents, call volume, and anticipated costs for implementing changes, a comparative business case can be built for touch-tone IVR system re-engineering versus speech-enabling a call center's IVR system. FIG. 19A illustrates the projected benefits for a touch-tone redesign versus a speech-enabled design in a case study of a customer care center of a large telecommunication service provider handling 10 million calls per year. Savings for a fully automated system is labeled as maximum automation potential, which can never be fully realized. The results show that while $1.2 M can be saved through touch-tone re-engineering, a speech-enabled interface can provide an additional $1 M in savings, for a total of $2.2 M in savings. Typically, a call center will implement the touch-tone redesign while proceeding with development of the speech-enabled interface, offsetting the cost of the speech implementation with the money saved from the touch-tone redesign.

If a decision is made to go ahead with speech technology, the first step is to simulate a speech-enabled interface and present it to live callers. This enables speech data needed for configuring the speech recognizer and natural language processing technology to be collected. The results are used to optimize a speech-enabled IVR system prior to evaluating a prototype on a larger audience using thousands of calls. To measure the actual performance of the speech-enabled IVR system, the same methodology used during assessment of the initial IVR system is applied. Thus, the actual benefit delivered by the speech-enabled interface can be accurately measured before the speech-enabled IVR system is rolled out in production mode. This phased-approach postpones the investment required for hardware and software until the benefit of speech is proven.

IVR Performance Monitoring 4

FIG. 20

Figure 20:
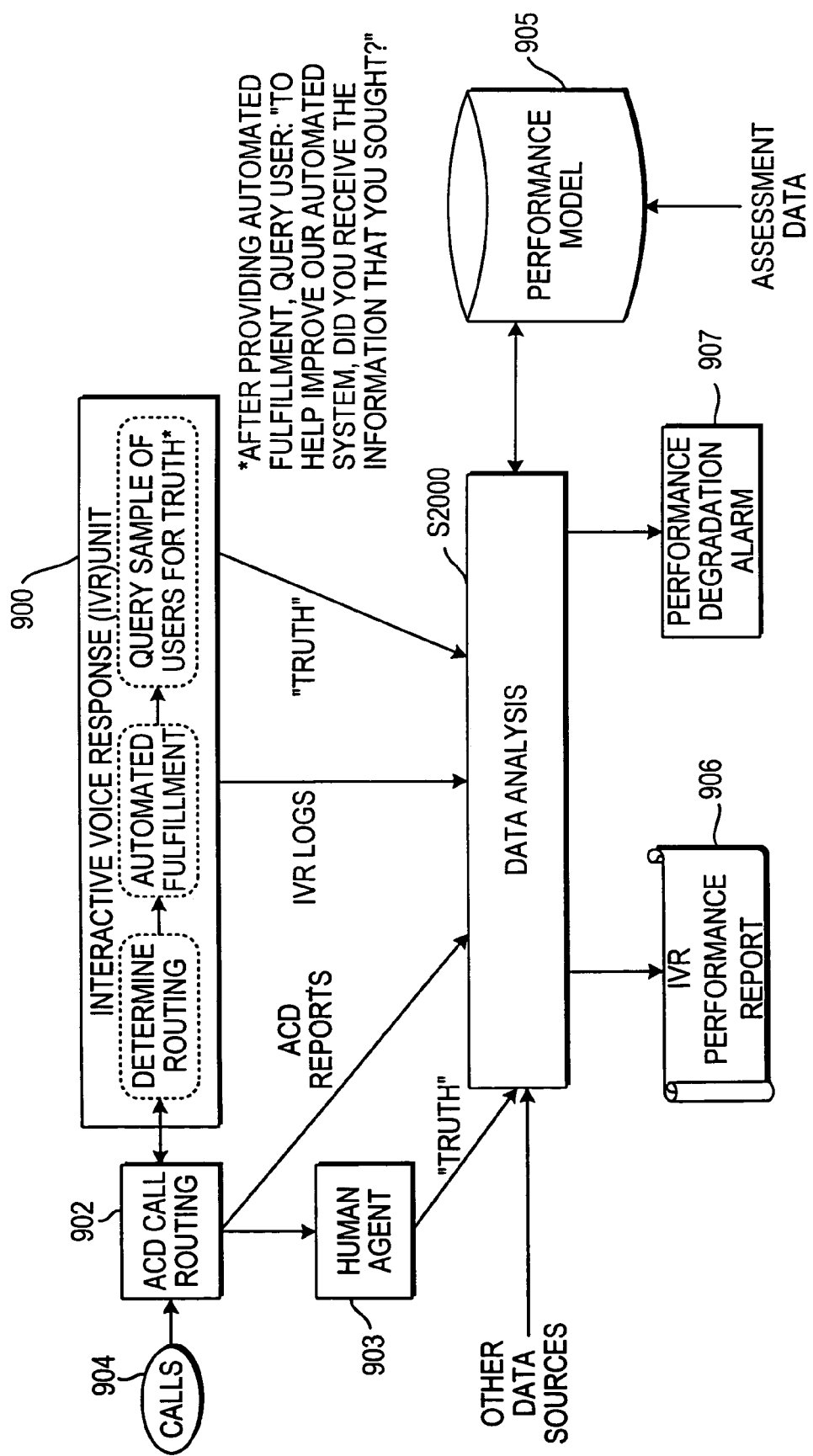
FIG. 20 is a diagram illustrating a technique for monitoring IVR system performance.

Another method of monitoring the performance of an IVR system involves the use of data logging and analysis to provide operational monitoring of IVR system performance and, in particular, performance on true benefit measures, such as agent-time savings, as defined in automation assessment discussed above. IVR system performance monitoring 4 addresses the problem of deciding when to "tune up" an IVR application to recover performance that may have degraded due to changing conditions in a call center. In IVR system performance monitoring 4, which is illustrated in the diagram of FIG. 20, an IVR application may use touch-tone or speech interfaces. Performance is defined in terms of "true" benefits, such as calls routed to the correct destination, or customer ID numbers captured correctly. In day-to-day operation, it is easy to collect information from the IVR system or caller-agent dialogue (CAD) about how calls are handled, but it can be difficult or impossible to obtain "truth", that is, what the caller really intended, in order to determine whether calls are processed correctly.

In one embodiment of the invention, as shown in FIG. 20, a data analysis step S2000, as shown in the figure, utilizes IVR logs, CAD reports, and "truth" data from an IVR unit 900 to determine performance. "Truth" may be determined directly, for instance in the IVR system by asking callers to indicate correctness, by querying a sample of callers in the IVR system for truth, or in an ACD call routing unit 902 by agents 903 who indicate correctness either directly with correctness judgments or indirectly by their handling of the call. For instance, agents who reroute calls 904 to another agent skill group indicate by their actions that the call must have been misrouted in the first place. Similarly, if agents 903 enter a customer ID different from that collected by the IVR system, then the IVR system must have been incorrect. For such a system in which truth is available, the data analysis step S2000 involves a matching of truth against call handling data available from ACD reports and IVR logs. Performance measures calculated by running assessment data through a performance model 905, such as correct routing and correct customer ID entry percentages, can be calculated and reported directly. If performance falls below some selected threshold, then an alarm can be raised. The data analysis step S2000 then generates an IVR system performance report 906 and, if performance has degraded below a predetermined threshold, a performance degradation alarm 907 may be set off.

When the truth is not available, performance and performance degradation may still be inferred from measurable quantities that are correlated with truth-based measures. Correlated, measurable quantities may include data such as the following:
- percentage of calls routed successfully (not necessarily correctly) to agents or self-service;
- rate of information delivery;
- rate of completion for available automated transactions; and
- rate of abandon without information.

For systems based on speech recognition and natural language processing, the following may also be included:
- rate of rejection, where the system cannot match any recognition text or topic to what is spoken; and
- average confidence or output score for recognition or topic ID.

As described above, the data analysis step S2000 for the preferred embodiment of IVR system performance monitoring uses, as input, logs from the IVR logging process, ACD reports, and the true call type, as determined by the agents for calls handled by live agents, and as determined by querying a small percent of callers that were handled by automated fulfillment. Note that callers served by automated fulfillment do not have to be queried constantly, rather, estimates can be derived by sampling a few hundred calls and updating these estimates as necessary.

An IVR system performance report 906 is preferably a report configured to show current values for several parameters that correlate with IVR system benefit. Examples of such parameters include rates of transaction completion, information delivery, abandon without information, and successful routing. These parameters are measured automatically as follows. Complete IVR event sequences are extracted from the logs, as described above in relation to the IVR logging 3 technique. Based on the extracted IVR event sequences, rates for different call profiles can be estimated using the method for measuring existing automation rates, which is described in the above discussion of automation analysis 8. In particular, the rates for abandoning without information, and the total automation achieved on delivering information and completing transactions is thus obtained. Finally, to measure the number and rate of successful routing, an IVR system routing analysis is performed using the IVR exit point from the event sequence and knowledge of the true call-types for calls during an appropriate sampling period. A computer-based method for performing a routing analysis is described above in relation to FIG. 16A.

A performance degradation alarm 907, shown in FIG. 20, is issued whenever at least one of the above parameters falls below a certain threshold. These thresholds are determined by competent call center personnel when configuring the IVR system performance monitor.

Telephone interfaces, an important class of human-computer interfaces, have been neglected by researchers in the field of human-computer interaction. Usability evaluation and engineering methods for telephone interfaces are not well developed. Decision makers in call centers yield to strong financial pressures, striving to cut costs without being able to assess the significant impact of usability on customer satisfaction and the financial bottom line. To remedy this situation, the present invention presents an assessment methodology for telephone user interfaces that evaluates both cost effectiveness and usability. Moving beyond previous laboratory studies of research spoken dialog systems, which evaluate only task completion rate and time, the methodology of the present invention allows practitioners to evaluate usability of telephone interfaces in a systematic and comprehensive fashion. Furthermore, this methodology can be applied to production call centers that service millions of calls per year.

An evaluation of telephone user interface must be based on thousands of end-to-end calls. Calls are recorded or observed in their entirety to capture the complete user (caller) experience, and often thousands of calls are necessary to obtain statistical significance in the analyses. Methods to analyze such large amounts of audio data efficiently have been presented above. IVR system analysis, as described above, transforms Gigabytes of audio data into complete event traces. For the IVR portion of a call, the event sequence is captured in a fully automated procedure, while manual transcription, or audio mining techniques, are used to annotate events in agent-caller dialogs. The assessment methodology of the present invention is applicable not only to commercial, but also to research telephone interfaces.

The above example embodiments of the assessment techniques of the present invention are illustrative in nature, and do not limit the scope of the invention, which is defined by the appended claims.

What is claimed:

1. A method of monitoring performance of an interactive voice response (IVR) system used by an automated call processing center, a call from a caller to the call processing center including an initial IVR portion of the call, and, at the caller's option, an agent-caller dialog portion of the call, said method comprising:
   generating logs of call activity within the IVR system for a plurality of calls;
   determining, from the logs of call activity, routing information related to the plurality of calls within the IVR system, including routing of calls out of the IVR system to an agent;
   noting, in the logs of call activity, predetermined significant activity in agent-caller dialog portions of calls routed to an agent;
   determining at least one effectiveness quantity by comparing a reason for a call implied from the routing information related to the call to a true intention of the caller determined from the agent-call dialog portion of the caller;
   generating a performance model of the IVR system from the logs of call activity; and
   analyzing the logs of call activity, the determined routing information, the at least one effectiveness quantity, and the performance model to determine a performance value of the IVR system, wherein the performance value is used to monitor the IVR system.

2. A method according to claim 1, wherein of determining a true intention of a caller includes asking a caller about his/her true intention for calling the call processing center.

3. A method according to claim 1, wherein said step of determining includes obtaining information from an agent to determine a true intention of a caller.

4. A method according to claim 1, wherein said method is performed on an ongoing basis.

5. A method according to claim 1, wherein the at least one effectiveness quantity correlates to a routing accuracy of the IVR system.

6. A method according to claim 1, further comprising the step of generating an alarm when the performance value of the IVR system is determined to be below a predetermined value.

7. An apparatus for monitoring performance of an interactive voice response (IVR) system used by an automated call processing center, a call from a caller to the call processing center including an initial IVR portion of the call, and, at the caller's option, an agent-caller dialog portion of the call, said apparatus comprising:
   means for generating logs of call activity within the IVR system for a plurality of calls;
   means for determining, from the logs of call activity, routing information related to the plurality of calls within the IVR system, including routing of calls out of the IVR system to an agent;
   means for noting, in the logs of call activity, predetermined significant activity in agent-caller dialog portions of calls routed to an agent;
   means for determining at least one effectiveness quantity by comparing a reason for a call implied from the routing information related to the call to a true intention of the call determined from the agent-caller dialog portion of the callers;
   means for generating a performance model of the IVR system from the logs of call activity; and
   means for analyzing the logs of call activity, the determined routing information, the at least one effectiveness quantity, and the performance model to determine a performance value of the IVR system, wherein the performance value is used to monitor the IVR system.

8. An apparatus according to claim 7, wherein said means for determining at least one effectiveness quantity asks a caller about his/her true intention for calling the call processing center.

9. An apparatus according to claim 7, wherein said means for determining at least one effectiveness quantity obtains information from an agent to determine a true intention of a caller.

10. An apparatus according to claim 7, wherein said apparatus operates on an ongoing basis.

11. An apparatus according to claim 7, wherein the at least one effectiveness quantity correlates to a routing accuracy of the IVR system.

12. An apparatus according to claim 7, further comprising means for generating an alarm when the performance value of the IVR system is determined to be below a predetermined value.

13. An apparatus for monitoring performance of an interactive voice response (IVR) system used by an automated call processing center, a call from a caller to the call processing centering including an initial IVR portion of the call, and, at the caller's option, an agent-caller dialog portion of the call, said apparatus comprising:
- a log generation unit adapted to generate logs of call activity within the IVR system for a plurality of calls;
- a routing information determination unit adapted to determine, from the logs of call activity, routing information related to the plurality of calls within the IVR system, including routing of calls out of the IVR system to an agent;
- a significant activity notation unit adapted to note, in the logs of call activity, predetermined significant activity in agent-caller dialog portions of calls routed to an agent;
- an effectiveness determination unit adapted to determine at least one effectiveness quantity by comparing a reason for a call implied from the routing information related to the call to a true intention of the caller determined from the agent-caller dialog portion of the caller;
- a performance model generation unit adapted to generate a performance model of the IVR system from the logs of call activity; and
- an analysis unit adapted to analyze the logs of call activity, the determined routing information, the at least one effectiveness quantity, and the performance model to determine a performance value of the IVR system, wherein the performance value is used to monitor the IVR system.

14. A system for monitoring performance of an interactive voice response (IVR) system used by an automated call processing center, a call from a caller to the call processing center including an initial IVR portion of the call, and, at the caller's option, an agent-caller dialog portion of the call, said system being operable to:
- generate logs of call activity within the IVR system for a plurality of calls;
- determine, from the logs of call activity, routing information related to the plurality of calls within the IVR system, including routing of calls out of the IVR system to an agent;
- note, in the logs of call activity, predetermined significant activity in agent-caller dialog portions of calls routed to an agent;
- determine at least one effectiveness quantity by comparing a reason for a call implied from the routing information related to the call to a true intention of the caller determined from the agent-call dialog portion of the callers;
- generate a performance model of the IVR system from the logs of call activity; and
- analyze the logs of call activity, the determined routing information, the at least one effectiveness quantity, and the performance model to determine a performance value of the IVR system, wherein the performance value is used to monitor the IVR system.

15. A system according to claim 14, wherein a true intention of a caller is determined by asking the caller of his/her reason for calling the call processing center.

16. A system according to claim 14, wherein a true intention of a caller is determined from information obtained from an agent.

17. A system according to claim 14, wherein said system operates on an ongoing basis.

18. A system according to claim 14, wherein the at least one effectiveness quantity correlates to a routing accuracy of the IVR system.

19. A system according to claim 14, wherein said system further operates to generate an alarm when the performance value of the IVR system is determined to be below a predetermined value.

20. A computer program product embodying a program for implementing a method of monitoring performance of an interactive voice response (IVR) system used by an automated call processing center, a call from a caller to the call processing centering including an initial IVR portion of the call, and, at the caller's option, an agent-caller dialog portion of the call, said program product comprising:
- code for generating logs of call activity within the IVR system for a plurality of calls;
- code for determining, from the logs of call activity, routing information related to the plurality of calls within the IVR system, including routing of calls out of the IVR system to an agent;
- code for noting, in the logs of call activity, predetermined significant activity in agent-caller dialog portions of calls routed to an agent;
- code for determining at least one effectiveness quantity by comparing a reason for a call implied from the routing information related to the call to a true intention of the caller determined from the agent-caller dialog portion of the callers utilizing the IVR system;
- code for generating a performance model of the IVR system from the logs of call activity; and
- code for analyzing the logs of call activity, the determined routing information, the at least one effectiveness quantity, and the performance model to determine a performance value of the IVR system, wherein the performance value is used to monitor the IVR system.

21. A computer program product according to claim 20, wherein a true intention of a caller is determined by asking the caller of his/her reason for calling the call processing center.

22. A computer program product according to claim 20, wherein a true intention of a caller is determined from information obtained from an agent.

23. A computer program product according to claim 20, wherein the method is performed on an ongoing basis.

24. A computer program product according to claim 20, wherein the at least one effectiveness quantity correlates to a routing accuracy of the IVR system.

25. A computer program product according to claim 20, further comprising code for generating an alarm when the performance value of the IVR system is determined to be below a predetermined value.

26. A method of monitoring performance of an automated response system used by an automated contact processing center, a contact from a contactor to the contact processing centering including an initial automated portion of the contact, and, at the contactor's option, an agent-contactor dialog portion of the contact, said method comprising:
- generating logs of contact activity within the automated response system for a plurality of contacts;
- determining, from the logs of contact activity, routing information related to the plurality of contacts within the automated response system, including routing of contacts out of the automated response system to an agent;
- noting, in the logs of contact activity, predetermined significant activity in agent-contactor dialog portions of contacts routed to an agent;
- determining at least one effectiveness quantity by comparing a reason for a contact implied from the routing information related to the contact to a true intention of the contactor determined from the agent-caller dialog portion of the contact;

generating a performance model of the automated response system from the logs of contact activity; and analyzing the logs of contact activity, the determined routing information, the at least one effectiveness quantity, and the performance model to determine a performance value of the automated response system, wherein the performance value is used to monitor the automated response system.

27. An apparatus for monitoring performance of an automated response system used by an automated contact processing center, a contact from a contactor to the contact processing center including an initial automated portion of the contact, and, at the contactor's option, an agent-contactor dialog portion of the contact, said apparatus comprising:

means for generating logs of contact activity within the automated response system for a plurality of contacts;

means for determining, from the logs of contact activity, routing information related to the plurality of contacts within the automated response system, including routing of contacts out of the automated response system to an agent;

means for noting, in the logs of contact activity, predetermined significant activity in agent-contactor dialog portions of contacts routed to an agent;

means for determining at least one effectiveness quantity by comparing a reason for a contact implied from the routing information related to the contact to a true intention the contactor determined from the agent-caller dialog portion of the of contact;

means for generating a performance model of the automated response system from the logs of contact activity; and means for analyzing the logs of contact activity, the determined routing information, the at least one effectiveness quantity, and the performance model to determine a performance value of the automated response system, wherein the performance value is used to monitor the automated response system.

28. An apparatus for monitoring performance of an automated response system used by an automated contact processing center, a contact from a contactor to the contact processing center including an initial automated portion of the contact, and, at the contactor's option, an agent-contactor dialog portion of the contact, said apparatus comprising:

a log generation unit adapted to generate logs of contact activity within the automated response system for a plurality of contacts;

a routing information determination unit adapted to determine, from the logs of contact activity, routing information related to the plurality of contacts within the automated response system, including routing of contacts out of the automated response system to an agent;

a significant activity notation unit adapted to note, in the logs of contact activity, predetermined significant activity in agent-contactor dialog portions of contacts routed to an agent;

an effectiveness determination unit adapted to determine at least one effectiveness quantity by a reason for a contact implied from the routing information related to the contact to a true intention of the contactor determined from the agent-caller dialog portion of the contact;

a performance model generation unit adapted to generate a performance model of the automated response system from the logs of contact activity; and an analysis unit adapted to analyze the logs of contact activity, the determined routing information, the at least one effectiveness quantity, and the performance model to determine a performance value of the automated response system, wherein the performance value is used to monitor the automated response system.

29. A system for monitoring performance of an automated response system used by an automated response processing center, a contact from a contactor to the contact processing center including an initial automated portion of the contact, and, at the contactor's option, an agent-contactor dialog portion of the contact, said system being operable to:

generate logs of contact activity within the automated response system for a plurality of contacts;

determine, from the logs of contact activity, routing information related to the plurality of contacts within the automated response system, including routing of contacts out of the automated response system to an agent;

note, in the logs of contact activity, predetermined significant activity in agent-contactor dialog portions of contacts routed to an agent;

determine at least one effectiveness quantity by comparing a reason for a contactor implied from the routing information related to the contact to a true intention of the contactor determined from the agent-caller dialog portion of the contact;

generate a performance model of the automated response system from the logs of contact activity; and analyze the logs of contact activity, the determined routing information, the at least one effectiveness quantity, and the performance model to determine a performance value of the automated response system, wherein the performance value is used to monitor the automated response system.

30. A computer program product stored in a computer readable medium embodying a program for implementing a method of monitoring performance of an automated response system used by an automated contact processing center, a contact from a contactor to the contact processing center including an initial automated portion of the contact, and, at the contactor's option, an agent-contactor dialog portion of the contact, said program product comprising:

code for generating logs of contact activity within the automated response system for a plurality of contacts;

code for determining, from the logs of contact activity, routing information related to the plurality of contacts within the automated response system, including routing of contacts out of the automated response system to an agent;

code for noting, in the logs of contact activity, predetermined significant activity in agent-contactor dialog portions of contacts routed to an agent;

code for determining at least one effectiveness quantity by comparing a reason for a contact implied from the routing information related to the contact to a true intention of the contactor determined from the agent-caller dialog portion of the contact;

code for generating a performance model of the automated response system from the logs of contact activity; and code for analyzing the logs of contact activity, the determined routing information, the at least one effectiveness quantity, and the performance model to determine a performance value of the automated response system, wherein the performance value is used to monitor the automated response system.

* * * * *